US012624137B2

(12) United States Patent
Zhang et al.

(10) Patent No.: US 12,624,137 B2
(45) Date of Patent: May 12, 2026

(54) **ETHYLENE INTERPOLYMER PRODUCTS HAVING A MELT FLOW-INTRINSIC VISCOSITY INDEX (*MFIVI*)**

(71) Applicant: NOVA CHEMICALS (INTERNATIONAL) S.A., Fribourg (CH)

(72) Inventors: Zengrong Zhang, Calgary (CA); Fazle Sibtain, Calgary (CA); Stephen Brown, Calgary (CA); Monika Kleczek, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 609 days.

(21) Appl. No.: 18/005,892

(22) PCT Filed: Jul. 23, 2021

(86) PCT No.: PCT/IB2021/056672

§ 371 (c)(1),
(2) Date: Jan. 18, 2023

(87) PCT Pub. No.: WO2022/043785

PCT Pub. Date: Mar. 3, 2022

(65) Prior Publication Data

US 2023/0279166 A1 Sep. 7, 2023

Related U.S. Application Data

(60) Provisional application No. 63/070,448, filed on Aug. 26, 2020.

(51) Int. Cl.
*C08F 210/16* (2006.01)
*C08F 4/659* (2006.01)

(52) U.S. Cl.
CPC ........ *C08F 210/16* (2013.01); *C08F 4/65908* (2013.01)

(58) Field of Classification Search
CPC C08F 210/16; C08F 2500/28; C08F 2500/29; C08F 2500/06
See application file for complete search history.

(56) References Cited

U.S. PATENT DOCUMENTS

| | | | |
|---|---|---|---|
| 2,993,882 A | 7/1961 | Ashby et al. | |
| 4,105,609 A | 8/1978 | Machon et al. | |
| 4,379,882 A | 4/1983 | Miyata | |
| 4,731,438 A | 3/1988 | Bernier | |
| 4,803,259 A | 2/1989 | Zboril et al. | |
| 5,206,075 A | 4/1993 | Hodgson, Jr. | |
| 5,376,439 A | 12/1994 | Hodgson et al. | |
| 6,180,730 B1 | 1/2001 | Sibtain et al. | |
| 6,870,010 B1 | 3/2005 | Lue et al. | |
| 8,846,188 B2 | 9/2014 | Fantinel et al. | |
| 2010/0152382 A1 * | 6/2010 | Jiang | C08F 10/06 525/53 |
| 2018/0305531 A1 | 10/2018 | Zhang et al. | |
| 2018/0305532 A1 * | 10/2018 | Zhang | C08L 23/0815 |
| 2019/0135958 A1 | 5/2019 | Kazemi et al. | |
| 2019/0135959 A1 * | 5/2019 | Kazemi | C08J 5/18 |
| 2019/0135960 A1 | 5/2019 | Kazemi et al. | |
| 2023/0174756 A1 | 6/2023 | Zhang et al. | |
| 2023/0348703 A1 | 11/2023 | Zhang et al. | |

FOREIGN PATENT DOCUMENTS

| | | |
|---|---|---|
| CN | 102216350 | 10/2011 |
| CN | 102245696 | 11/2011 |
| CN | 110831986 | 2/2020 |
| WO | WO-2010/075111 A2 | 7/2010 |
| WO | WO-2019/092524 A1 | 5/2019 |

OTHER PUBLICATIONS

ASTM D1003-13 Standard Test methods for Haze and Luminous transmittance of Transparent plastics—Copyright ASTM International—Current edition approved Nov. 15, 2013. Published Nov. 2013. Originally approved in 1949. Last previous edition approved in 2011 as D1003-1 (pp. 1-7).

ASTM D1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10 (pp. 1-16).

ASTM D1525-07—Standard Test Method for Vicat Softening Temperature of Plastics—Copyright ASTM International—Current edition approved Mar. 1, 2007. Published Mar. 2007. Originally approved in 1958. Last previous edition approved in 2006 as D1525-06 (pp. 1-9).

(Continued)

*Primary Examiner* — Robert C Boyle
(74) *Attorney, Agent, or Firm* — Fish & Richardson P.C.

(57) ABSTRACT

This disclosure relates to ethylene interpolymer products comprising a Melt Flow-Intrinsic Viscosity Index value, MFIVI, of from ≥0.05 to ≤0.80; a first derivative of a melt flow distribution function, formula (I) of form ≥−1.85 to ≤−1.51; an unsaturation ratio, UR, of from >0.06 to ≤0.60; and a residual catalytic metal of from ≥0.03 to ≤5 ppm of hafnium. Ethylene interpolymer products comprise at least two ethylene interpolymers. Ethylene interpolymer products are characterized by a melt index ($I_2$) from 0.3 to 500 dg/minute, a density from 0.855 to 0.975 g/cc and from 0 to 25 mole percent of one or more a-olefins. Ethylene interpolymer products have polydispersity, $M_w/M_n$, from 1.7 to 25; and $CDBI_{50}$ values from 1% to 98%. These ethylene interpolymer products have utility in flexible and rigid applications.

$$\frac{d\text{Log}(1/I_n)}{d\text{Log(loading)}} \quad (I)$$

11 Claims, 7 Drawing Sheets

(56) References Cited

OTHER PUBLICATIONS

ASTM D1709-09—Standard Test Methods for Impact Resistance of Plastic Film by the Free-Falling Dart Method Copyright ASTM International—Current edition approved May 1, 2009. Published Jun. 2009. Originally approved in 1959. Last previous edition approved in 2008 as D1709-08 (pp. 1-9).
ASTM D1922-09—Standard Test Method for Propagation Tear Resistance of Plastic Film and Thin Sheeting by Pendulum Method—Current edition approved May 1, 2009. Published Jun. 2009. Originally approved in 1961. Last previous edition approved in 2008 as D1922-08. (pp. 1-7).
ASTM D2457-13; Standard Test Method for Specular Gloss of Plastic Films and Solid Plastics; Current edition approved Apr. 1, 2013. Published Apr. 2013. Originally approved in 1965. Last previous edition approved in 2008 as D2457-08. (pp. 1-6).
ASTM D2582-09—Standard Test Method for Puncture-Propagation Tear Resistance of Plastic Film and Thin Sheeting Copyright ASTM International—Current edition approved May 1, 2009. Published Jun. 2009. Originally approved in 1967. Last previous edition approved in 2008 as D2582-08 (pp. 1-5).
ASTM D3124-98; Standard Test Method for Vinylidene Unsaturation in Polyethylene by infrared Spectrophotometry; Current Edition approved Feb. 1, 2011. Published Mar. 2011. Originally approved in 1972. Last previous edition approved in 2003 as D3124-98. (pp. 1-4).
ASTM D4703-16—Standard Test Method for Compression Molding Thermoplastic Materials into Test Specimens, Plaques, or Sheets—Copyright ASTM International—Current edition approved Apr. 1, 2016. Published Apr. 2016. Originally approved in 1991. Last previous edition approved in 2010 as D4703-10 (pp. 1-16).
ASTM D5748-95—Standard Test Method for Protrusion Puncture Resistance of Stretch Wrap Film—Copyright ASTM International—Current edition approved Apr. 1, 2012. Published May 2012. Originally approved in 1995. Last previous edition approved in 2007 as D5748-95 (pp. 1-4).
ASTM D6248-98—Standard Test Method for Vinyl and Trans Unsaturation in Polyethylene by Infrared Spectrophotometry - Copyright ASTM International—Current edition approved Apr. 10, 1998. Published Feb. 1999. (pp. 1-3).
ASTM D6474-12—Standard Test Method for Determining Molecular Weight Distribution and Molecular Weight Averages of Polyolefins by High Temperature Gel Permeation Chromatography—Current edition approved Dec. 15, 2012. Published Dec. 2012. Originally approved in 1999. Last previous edition approved in 2006 as D6474-99 (pp. 1-6).
ASTM D648-07—Standard Test Method for Deflection Temperature of Plastics Under Flexural Load in the Edgewise Position—Current edition approved Mar. 1, 2007. Published Mar. 2007. Originally approved in 1941. Last previous edition approved in 2006 as D648-06 (pp. 1-14).
ASTM D6645-01—Standard Test Method for Methyl (Comonomer) Content in Polyethylene by Infrared Spectrophotometry—Copyright ASTM International—Current edition approved Jan. 1, 2010. Published Jan. 2010. Originally approved in 2001. Last previous edition approved in 2001 as D6645-01 (pp. 1-4).
ASTM D790-10—Standard Test Method for Flexural Properties of Unreinforced and Reinforced Plastics and Electrical Insulating Materials—Copyright ASTM International—Current edition approved Apr. 1, 2010. Published Apr. 2010. Originally approved in 1970. Last previous edition approved in 2007 as D790-07 (pp. 1-11).
ASTM D792-13—Standard Test Methods for Density and Specific Gravity (Relative Density) of Plastics by Displacement—Copyright ASTM International—Current edition approved Nov. 1, 2013. Published Nov. 2013. Originally approved in 1944. Last previous edition approved in 2008 as D792-08 (pp. 1-6).
ASTM D882-12—Standard Test Method for Tensile Properties of thin Plastic Sheeting—Copyright ASTM International Current edition approved Aug. 1, 2012. Published Sep. 2012. Originally approved in 1946. Last previous edition approved in 2010 as D882-10 (pp. 1-11).
Beer et al., High Molecular Weight Tail and Long-Chain Branching in SRM 1476 Polyethylene, J. Appl. Polym. Sci., vol. 73, pp. 2807-2812 (1999).
Bird et al., "Dynamics of Polymer Liquids. vol. 1: Fluid Mechanics", Wiley-Interscience Publications, 1987, pp. 169-175.
Carreau-Yasuda model, K. Yasuda PHD Thesis, IT Cambridge (1979).
Deslauriers, P. et al., Quantifying Short Chain Branching Microstructures in Ethylene 1-olefin Copolymers using Size Exclusion Chromatography and Fourier Transform Infrared Spectroscopy (SEC—FTIR), Polymer vol. 43, pp. 159-170 (2002).
Graessley et al., "Effect of Long Branches on the Flow Properties of Polymers", Acc. Chem. Res., vol. 10, 1977, pp. 332-339.
International Search Report and Written Opinion of the International Searching Authority issued in PCT Application No. PCT/IB2021/056672, mailed Oct. 25, 2021.
Markovitz et al., "Superposition in Rheology", J. Polym. Sci., Polymer Symposium Series 50, 1975, pp. 431-456.
Randall et al., "A Review of High Resolution Liquid 13Carbon Nuclear Magnetic Resonance Characterizations of Ethylene-Based Polymers", JMS—Rev. Macromol. Chem. Phys., 1989, pp. 201-317.
Wild et al., "Determination of Branching Distributions in Polyethylene and Ethylene Copolymers", J. Polym. Sci., Part B, Polym. Phys., vol. 20 (3), pp. 441-455, 1982.
Wood-Adams, Paula M. and Dealy, John M.; Degrood, A. Willem and Redwine, O. David; Effect of Molecular Structure on the Linear Viscoelastic Behavior of Polyethylene; Macromolecules 2000, vol. 33. pp. 7489-7499.
Yau et al., "Analytical and Polymer Science, TAPPI Polymers, Laminations, and Coatings Conference Proceedings", Westin Hotel in Chicago, 2000, vol. 2, pp. 699-707.
Yau et al., "Application of Triple-Detector Size Exclusion Chromatography (On-Line Differential Refractometer, Viscometer and Light Scattering Detectors) for the Characterization of Brominated Polystyrene", Int. J. Polym. Anal. Charact., 1996, pp. 151-171.
CN Office Action in Chinese Appln. No. 202180033573.2, dated Jun. 12, 2023, 13 pages (with English translation).
International Search Report and Written Opinion mailed Jul. 27, 2021 in corresponding international application PCT/IB2021/053844, 12 pages.
Japanese Office Action in Japanese Appln. No. 2022-567540, mailed on Mar. 25, 2025, 5 pages, with English Translation.

* cited by examiner

ETHYLENE INTERPOLYMER PRODUCTS HAVING A MELT FLOW-INTRINSIC VISCOSITY INDEX (*MFIVI*)

CROSS-REFERENCE TO RELATED APPLICATIONS

This application is a U.S. National Phase Application under 35 U.S.C. § 371 of International Application No. PCT/IB2021/056672, filed on Jul. 23, 2021, which in turn claims priority to and the benefit of U.S. Provisional Patent Application No. 63/070,448, filed Aug. 26, 2020, both of which are incorporated herein by reference in their entirety.

BACKGROUND ART

Solution polymerization processes are typically carried out at temperatures that are above the melting point of the ethylene homopolymer or copolymer produced. In a typical solution polymerization process, catalyst components, solvent, monomers and hydrogen are fed under pressure to one or more reactors.

For ethylene polymerization, or ethylene copolymerization, reactor temperatures can range from 80° C. to 300° C. while pressures generally range from 3 MPag to 45 MPag. The ethylene homopolymer or copolymer produced remains dissolved in the solvent under reactor conditions. The residence time of the solvent in the reactor is relatively short, for example, from 1 second to 20 minutes. The solution process can be operated under a wide range of process conditions that allow the production of a wide variety of ethylene polymers. Post reactor, the polymerization reaction is quenched to prevent further polymerization, by adding a catalyst deactivator. Optionally, the deactivated solution may be passivated by adding an acid scavenger. The deactivated solution, or optionally the passivated solution, is then forwarded to polymer recovery where the ethylene homopolymer or copolymer is separated from process solvent, unreacted residual ethylene and unreacted optional α-olefin(s).

In solution polymerization there is a need for improved processes that produce ethylene interpolymers at higher production rates, i.e. the pounds of ethylene interpolymer produced per hour is increased. Higher production rates increase the profitability of the solution polymerization plant. The catalyst formulations and solution polymerization processes disclosed herein satisfy this need.

In solution polymerization there is also a need to increase the molecular weight of the ethylene interpolymer produced at a given reactor temperature. Given a specific catalyst formulation, it is well known to those of ordinary experience that polymer molecular weight increases as reactor temperature decreases. However, decreasing reactor temperature can be problematic when the viscosity of the solution becomes too high. As a result, in solution polymerization there is a need for catalyst formulations that produce high molecular weight ethylene interpolymers at high reactor temperatures (or lower reactor viscosities). The catalyst formulations and solution polymerization processes disclosed herein satisfy this need.

In the solution polymerization process there is also a need for catalyst formulations that are very efficient at incorporating one or more α-olefins into a propagating macromolecular chain. In other words, at a given [α-olefin/ethylene] weight ratio in a solution polymerization reactor, there is a need for catalyst formulations that produce lower density ethylene/α-olefin copolymers. Expressed alternatively, there is a need for catalyst formulations that produce an ethylene/α-olefin copolymer, having a specific density, at a lower [α-olefin/ethylene] weight ratio in the reactor feed. Such catalyst formulations efficiently utilize the available α-olefin and reduce the amount of α-olefin in solution process recycle streams.

The catalyst formulations and solution process disclosed herein, produce unique ethylene interpolymer products that have desirable properties in a variety of end-use applications. One non-limiting end-use application includes packaging films containing the disclosed ethylene interpolymer products. Non-limiting examples of desirable film properties include improved optical properties, lower seal initiation temperature and improved hot tack performance. Films prepared from the ethylene interpolymer products, disclosed herein, have improved properties.

SUMMARY OF DISCLOSURE

In this disclosure ethylene interpolymer products are disclosed comprising at least two ethylene interpolymers, wherein the ethylene interpolymer product has: a dimensionless Melt Flow-Intrinsic Viscosity Index value, MFIVI, of from ≥0.05 to ≤0.80, a first derivative of a melt flow distribution function, $$\frac{d\mathrm{Log}(1/I_n)}{d\mathrm{Log}(\mathrm{loading})}$$

at a loading of 4000 g, of from ≥−1.85 to ≤−1.51; a residual catalytic metal of from ≥0.03 to ≤5 ppm of hafnium and a dimensionless unsaturation ratio, UR, of from >0.06 to ≤0.60. The ethylene interpolymer product may have a melt index ($I_2$) from 0.3 to 500 dg/minute, a density from 0.855 to 0.975 g/cc and contain from 0 to 25 mole percent of one or more α-olefins. Suitable α-olefins include one or more $C_3$ to $C_{10}$ α-olefins. Embodiments of the ethylene interpolymer product may have a polydispersity, $M_w/M_n$, from 1.7 to 25, where $M_w$ and $M_n$ are the weight and number average molecular weights, respectively, as determined by conventional size exclusion chromatography (SEC). Embodiments of the ethylene interpolymer products may have a $CDBI_{50}$ from 1% to 98%, where $CDBI_{50}$ is measured using CTREF.

Additional embodiments include the manufacture of said ethylene interpolymer products using a continuous solution polymerization process employing at least one bridged metallocene catalyst formulation comprising a component A defined by Formula (I)

(I)

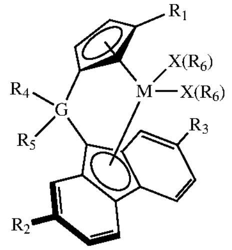

where M is a metal selected from titanium, hafnium and zirconium; G is the element carbon, silicon, germanium, tin or lead; X represents a halogen atom, $R_6$ groups are independently selected from a hydrogen atom, a $C_{1-20}$ hydrocarbyl radical, a $C_{1-20}$ alkoxy radical or a $C_{6-10}$ aryl oxide radical, these radicals may be linear, branched or cyclic or further substituted with halogen atoms, $C_{1-10}$ alkyl radicals, $C_{1-10}$ alkoxy radicals, $C_{6-10}$ aryl or aryloxy radicals; $R_1$ represents a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms; $R_2$ and $R_3$ are independently selected from a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms; and $R_4$ and $R_5$ are independently selected from a hydrogen atom, a $C_{1-20}$ hydrocarbyl radical, a $C_{1-20}$ alkoxy radical a $C_{6-10}$ aryl oxide radical, or alkylsilyl radicals containing at least one silicon atom and $C_{3-30}$ carbon atoms.

Further embodiments include an improved continuous solution polymerization process where the improved process comprises: polymerizing ethylene and optionally at least one α-olefin, in a process solvent, in one or more reactors using a bridged metallocene catalyst to form the ethylene interpolymer product; where the improved process has an increased production rate, $PR^I$, defined by the following formula:

$$PR^I=100\times(PR^A-PR^C)/PR^C\geq 10\%$$

where $PR^A$ is the production rate of the improved process and $PR^C$ is a comparative production rate of a comparative continuous solution polymerization process where the bridged metallocene catalyst formulation has been replaced with an unbridged single site catalyst formulation.

Additional embodiments include a bridged metallocene catalyst formulation comprising: an alumoxane co-catalyst (component M); a boron ionic activator (component B); and optionally, a hindered phenol (component P). Non-limiting examples of components M, B and P include: methylalumoxane (MMAO-7), trityl tetrakis (pentafluoro-phenyl) borate and 2,6-di-tert-butyl-4-ethylphenol, respectively.

Other embodiments include an improved continuous solution polymerization process where an ethylene interpolymer product is formed by polymerizing ethylene, and optionally at least one α-olefin, in a process solvent, in one or more reactors, using a bridged metallocene catalyst formulation and the improved process is characterized by (a) and/or (b):

(a) the ethylene interpolymer product has at least a 10% improved (higher) weight average molecular weight, $M_w$, as defined by the following formula:

$$\%\ \text{Improved}\ M_w=100\times(M_w{}^A-M_w{}^C)/M_w{}^C\geq 10\%$$

where $M_w{}^A$ is a weight average molecular weight of the ethylene interpolymer product produced using the improved process and $M_w{}^C$ is a comparative weight average molecular weight of a comparative ethylene interpolymer product; where the comparative ethylene interpolymer product is produced in a comparative process by replacing the bridged metallocene catalyst formulation with an unbridged single site catalyst formulation;

(b) an [α-olefin/ethylene] weight ratio, employed in the improved process, is reduced (improved) by at least 70% as defined by the following formula:

$$\%\ \text{Reduced}\left[\frac{\alpha-\text{olefin}}{\text{ethylene}}\right]=$$

-continued $$100\times\left\{\frac{\left(\frac{\alpha-\text{olefin}}{\text{ethylene}}\right)^A-\left(\frac{\alpha-\text{olefin}}{\text{ethylene}}\right)^C}{\left(\frac{\alpha-\text{olefin}}{\text{ethylene}}\right)^C}\right\}\leq -70\%$$

where (α-olefin/ethylene)$^A$ represents the weight of the α-olefin added to the improved process divided by the weight of ethylene added to the improved process, where the ethylene interpolymer product having a target density is produced by a bridged metallocene catalyst formulation; and (α-olefin/ethylene)$^C$ represents a comparative weight ratio required to produce a comparative ethylene interpolymer product having the target density, where the comparative ethylene interpolymer product is synthesized in a comparative process by replacing the bridged metallocene catalyst formulation with an unbridged single site catalyst formulation.

Embodiments of the ethylene interpolymer products disclosed herein may comprise a first and a second ethylene interpolymer, synthesized using one or more bridged metallocene catalyst formulations comprising a component A defined by Formula (I). Additional embodiments of the ethylene interpolymer products disclosed herein may comprise a first and a third ethylene interpolymer, synthesized using one or more bridged metallocene catalyst formulations comprising a component A defined by Formula (I). Still further embodiments of the ethylene interpolymer products disclosed herein may comprise a first, a second and a third ethylene interpolymer, synthesized using one or more bridged metallocene catalyst formulations comprising a component A defined by Formula (I).

The first ethylene interpolymer may comprise from 5 to 100 wt. % of the ethylene interpolymer product. The second ethylene interpolymer may comprise from 0 to 95 wt. % of the ethylene interpolymer product. The third ethylene interpolymer may comprise from 0 to 30 wt. % of the ethylene interpolymer product. Weight percent, wt. %, is the weight of the first, the second or the third ethylene interpolymer, individually, divided by the total weight of the ethylene interpolymer product, melt index is measured according to ASTM D1238 (2.16 kg load and 190° C.) and density is measured according to ASTM D792.

The upper limit on the $CDBI_{50}$ of the ethylene interpolymer product may be 98%, in other cases 90% and in still other cases 85%. An ethylene interpolymer product with a $CDBI_{50}$ of 98% results when an α-olefin is not added to the continuous solution polymerization process; in these embodiments the ethylene interpolymer product is an ethylene homopolymer. The lower limit on the $CDBI_{50}$ of an ethylene interpolymer product may be 1%, in other cases 2% and in still other cases 3%; in these embodiments the ethylene interpolymers that comprise the ethylene interpolymer product have significantly different densities (or α-olefin contents).

The lower limit on the $M_w/M_n$ of the ethylene interpolymer product may be 1.8, in other cases 1.9 and in still other cases 2.0; in these embodiments, the weight average molecule weights, $M_w$'s, of the ethylene interpolymers that comprise the ethylene interpolymer product are similar. The upper limit on the $M_w/M_n$ of the ethylene interpolymer product may be 25, in other cases 20 and in still other cases 15; in these embodiments, the weight average molecule weights, $M_w$'s, of the ethylene interpolymers that comprise the ethylene interpolymer product are significantly different.

In this disclosure the amount of long chain branching in the ethylene interpolymer products is characterized by the Melt Flow-Intrinsic Viscosity Index (MFIVI), fully described below. Ethylene interpolymer products have MFIVI values ranging from ≥0.05 to ≤0.80 (dimensionless). The upper limit on the MFIVI of an ethylene interpolymer product may be 0.8, in other cases 0.7 and in still other cases 0.6. The lower limit on the MFIVI of an ethylene interpolymer product is ≥0.05.

Ethylene interpolymer products are further characterized by a first derivative of the melt flow distribution function $$\frac{d\text{Log}(1/I_n)}{d\text{Log(loading)}}$$

at a loading of 4000 g having values from ≥−1.85 to ≤−1.51. The lower limit on $$\frac{d\text{Log}(1/I_n)}{d\text{Log(loading)}}$$

at a loading of 4000 g value of the ethylene interpolymer product may be ≥−1.85, in other cases ≥−1.80 and in still other cases ≥−1.75. The upper limit on $$\frac{d\text{Log}(1/I_n)}{d\text{Log(loading)}}$$

at a loading of 4000 g value of the ethylene interpolymer product may be ≤−1.510, in other cases ≤−1.515 and in still other cases ≤−1.520.

In this disclosure, the Unsaturation Ratio 'UR' was used to characterize the degree of unsaturation in ethylene interpolymers. In some embodiments the upper limit on the UR of the ethylene interpolymer product may be ≤0.60, in other cases ≤0.55 and in still other cases ≤0.50 (dimensionless), and the lower limit on the UR of the ethylene interpolymer product may be >0.06, in other cases >0.062 and in still other cases >0.065.

In this disclosure the amount of residual catalytic metal in ethylene interpolymers was characterized by Neutron Activation Analysis 'NAA'. The disclosed ethylene interpolymer products are characterized by a residual catalytic metal comprising from ≥0.03 to ≤5 ppm of hafnium. The upper limit on the residual catalytic metal in the ethylene interpolymer product may be 5.0 ppm, in other cases 4.0 ppm and in still other cases 3.0 ppm of hafnium; and the lower limit on the residual catalytic metal in the ethylene interpolymer product may be 0.03 ppm, in other cases 0.09 ppm and in still other cases 0.15 ppm hafnium.

Non-limiting embodiments of manufactured articles include a film comprising at least one layer comprising an ethylene interpolymer product comprising at least two ethylene interpolymers; wherein the ethylene interpolymer product has: a Melt Flow-Intrinsic Viscosity Index value, MFIVI, of from ≥0.05 to ≤0.80; a first derivative of a melt flow distribution function, $$\frac{d\text{Log}(1/I_n)}{d\text{Log(loading)}}$$

at a loading of 4000 g, of from ≥−1.85 to ≤−1.51; a residual catalytic metal of from ≥0.03 to ≤5 ppm of hafnium; and a dimensionless unsaturation ratio, UR, of from >0.060 to ≤0.60. In other embodiments this film may have an Elmendorf MD tear strength that is 18% higher (improved) and a film haze that is 16% lower (improved); relative to a film prepared from Comparative Example 1.

Additional film embodiments include films where the at least one layer further comprises at least one second polymer; where the second polymer may be one or more ethylene polymers, one or more propylene polymers or a mixture of ethylene polymers and propylene polymers. Further embodiments include films having a total thickness from 0.5 mil to 10 mil. Other embodiments include multilayer films that have from 2 to 11 layers, where at least one layer comprises at least one ethylene interpolymer product.

BRIEF DESCRIPTION OF DRAWINGS

The following Figures are presented for the purpose of illustrating selected embodiments of this disclosure.

DESCRIPTION OF EMBODIMENTS

Definition of Terms

Figure 1:
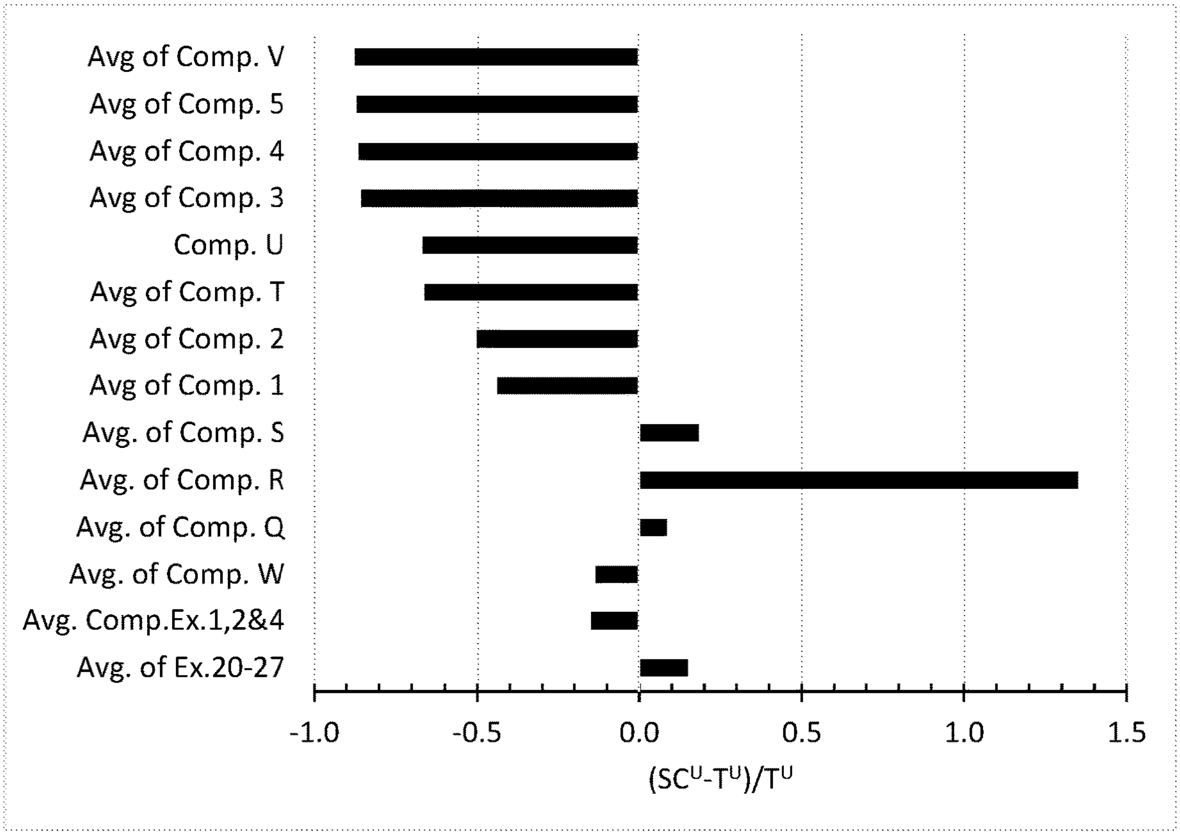
FIG. 1 compares average Unsaturation Ratio 'UR' values of: Examples 20 through 27, relative to Comparatives Q through V, Comparatives 1 through 5 and Comparative Examples 1, 2 & 4.

Other than in the examples or where otherwise indicated, all numbers or expressions referring to quantities of ingredients, extrusion conditions, etc. used in the specification and claims are to be understood as modified in all instances by the term 'about'. Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "$\alpha$-olefin" is used to describe a monomer having a linear hydrocarbon chain containing from 3 to 20 carbon atoms having a double bond at one end of the chain; an equivalent term is "linear $\alpha$-olefin".

As used herein, the term "ethylene polymer", refers to macromolecules produced from ethylene and optionally one or more additional monomers; regardless of the specific catalyst or specific process used to make the ethylene polymer. In the polyethylene art, the one or more additional monomers are frequently called "comonomer(s)" and often include $\alpha$-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

The term "ethylene interpolymer" refers to a subset of polymers within the "ethylene polymer" group that excludes polymers produced in high pressure polymerization processes; non-limiting examples of polymer produced in high pressure processes include LDPE and EVA (the latter is a copolymer of ethylene and vinyl acetate).

The term "heterogeneous ethylene interpolymers" refers to a subset of polymers in the ethylene interpolymer group that are produced using a heterogeneous catalyst formulation; non-limiting examples of which include Ziegler-Natta or chromium catalysts.

The term "homogeneous ethylene interpolymer" refers to a subset of polymers in the ethylene interpolymer group that are produced using homogeneous catalyst formulations. Typically, homogeneous ethylene interpolymers have narrow molecular weight distributions, for example Size Exclusion Chromatography (SEC) $M_w/M_n$ values of less than 2.8; $M_w$ and $M_n$ refer to weight and number average molecular weights, respectively. In contrast, the $M_w/M_n$ of heterogeneous ethylene interpolymers are typically greater than the $M_w/M_n$ of homogeneous ethylene interpolymers. In general, homogeneous ethylene interpolymers also have a narrow comonomer distribution, i.e. each macromolecule within the molecular weight distribution has a similar comonomer content. Frequently, the composition distribution breadth index "CDBI" is used to quantify how the comonomer is distributed within an ethylene interpolymer, as well as to differentiate ethylene interpolymers produced with different catalysts or processes. The "$CDBI_{50}$" is defined as the percent of ethylene interpolymer whose composition is within 50% of the median comonomer composition; this definition is consistent with that described in U.S. Pat. No. 5,206,075 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. Typically the $CDBI_{50}$ of homogeneous ethylene interpolymers are greater than about 70%. In contrast, the $CDBI_{50}$ of $\alpha$-olefin containing heterogeneous ethylene interpolymers are generally lower than the $CDBI_{50}$ of homogeneous ethylene interpolymers. A blend of two or more homogeneous ethylene interpolymers (that differ in comonomer content) may have a $CDBI_{50}$ less than 70%; in this disclosure such a blend may be referred to as a homogeneous blend or homogeneous composition. Similarly, a blend of two or more homogeneous ethylene interpolymers (that differ in weight average molecular weight ($M_w$)) may have a $M_w/M_n \geq 2.8$; in this disclosure such a blend may be referred to as a homogeneous blend or homogeneous composition.

In this disclosure, the term "homogeneous ethylene interpolymer" refers to both linear homogeneous ethylene interpolymers and substantially linear homogeneous ethylene interpolymers. In the art, linear homogeneous ethylene interpolymers are generally assumed to have no long chain branches or an undetectable amount of long chain branches; while substantially linear ethylene interpolymers are generally assumed to have greater than about 0.01 to about 3.0 long chain branches per 1000 carbon atoms. A long chain branch is macromolecular in nature, i.e. similar in length to the macromolecule that the long chain branch is attached to.

In this disclosure, the term 'homogeneous catalyst' is defined by the characteristics of the polymer produced by the homogeneous catalyst. More specifically, a catalyst is a homogeneous catalyst if it produces a homogeneous ethylene interpolymer that has a narrow molecular weight distribution (SEC $M_w/M_n$ values of less than 2.8) and a narrow comonomer distribution ($CDBI_{50}$>70%). Homogeneous catalysts are well known in the art. Two subsets of the homogeneous catalyst genus include unbridged metallocene catalysts and bridged metallocene catalysts. Unbridged metallocene catalysts are characterized by two bulky ligands bonded to the catalytic metal, a non-limiting example includes bis(isopropyl-cyclopentadienyl) hafnium dichloride. In bridged metallocene catalysts the two bulky ligands are covalently bonded (bridged) together, a non-limiting example includes diphenylmethylene (cyclopentadienyl) (2,7-di-t-butylfuorenyl) hafnium dichloride; wherein the diphenylmethylene group bonds, or bridges, the cyclopentadienyl and fluorenyl ligands together. Two additional subsets of the homogeneous catalyst genus include unbridged and bridged single site catalysts. In this disclosure, single site catalysts are characterized as having only one bulky ligand bonded to the catalytic metal. A non-limiting example of an unbridged single site catalyst includes cyclopentadienyl tri(tertiary butyl)phosphinimine titanium dichloride. A non-limiting example of a bridged single site catalyst includes [$C_5(CH_3)_4$—$Si(CH_3)_2$—N(tBu)] titanium dichloride, where the —$Si(CH_3)_2$ group functions as the bridging group.

Herein, the term "polyolefin" includes ethylene polymers and propylene polymers; non-limiting examples of propylene polymers include isotactic, syndiotactic and atactic propylene homopolymers, random propylene copolymers containing at least one comonomer (e.g. α-olefins) and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear, branched, or cyclic, aliphatic, olefinic, acetylenic and aryl (aromatic) radicals comprising hydrogen and carbon that are deficient by one hydrogen.

As used herein, an "alkyl radical" includes linear, branched and cyclic paraffin radicals that are deficient by one hydrogen radical; non-limiting examples include methyl (—$CH_3$) and ethyl (—$CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that comprise from 1 to 3 atoms selected from the group consisting of boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties that have replaced one or more hydrogen radicals in any position within the group; non-limiting examples of moieties include halogen radicals (F, Cl, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Non-limiting examples of substituted alkyls and aryls include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

Herein the term "R1" and its superscript form "$^{R1}$" refers to a first reactor in a continuous solution polymerization process; it being understood that R1 is different from the symbol $R^1$; the latter is used in chemical formula, e.g. representing a hydrocarbyl group. Similarly, the term "R2" and its' superscript form "$^{R2}$" refers to a second reactor, and; the term "R3" and it's superscript form "$^{R3}$" refers to a third reactor.

As used herein, the term "oligomers" refers to an ethylene polymer of low molecular weight, e.g., an ethylene polymer with a weight average molecular weight (Mw) of about 2000 to 3000 daltons. Other commonly used terms for oligomers include "wax" or "grease". As used herein, the term "light-end impurities" refers to chemical compounds with relatively low boiling points that may be present in the various vessels and process streams within a continuous solution polymerization process; non-limiting examples include, methane, ethane, propane, butane, nitrogen, $CO_2$, chloroethane, HCl, etc.

There is a need to improve the continuous solution polymerization process. For example, to increase the molecular weight of the ethylene interpolymer produced at a given reactor temperature. In addition, in solution polymerization there is a need for catalyst formulations that are very efficient at incorporating one or more α-olefins into the propagating macromolecular chain. Expressed in different manner, there is a need for catalyst formulations that produce an ethylene/α-olefin copolymer, having a specific density, at a lower (α-olefin/ethylene) ratio in the reactor feed. In addition, there is a need for ethylene interpolymer products that upon conversion into manufactured articles have improved properties.

In the embodiments disclosed herein, 'a bridged metallocene catalyst formulation' was employed in at least two solution polymerization reactors. This catalyst formulation included a bulky ligand-metal complex, 'Component A', defined by Formula (I).

(I)

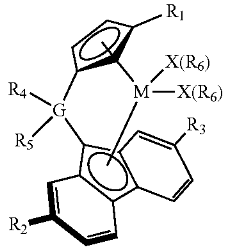

In Formula (I): non-limiting examples of M include Group 4 metals, i.e. titanium, zirconium and hafnium; non-limiting examples of G include Group 14 elements, carbon, silicon, germanium, tin and lead; X represents a halogen atom, fluorine, chlorine, bromine or iodine; the $R_6$ groups are independently selected from a hydrogen atom, a $C_{1-20}$ hydrocarbyl radical, a $C_{1-20}$ alkoxy radical or a $C_{6-10}$ aryl oxide radical (these radicals may be linear, branched or cyclic or further substituted with halogen atoms, $C_{1-10}$ alkyl radicals, $C_{1-10}$ alkoxy radicals, $C_{6-10}$ aryl or aryloxy radicals); $R_1$ represents a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms; $R_2$ and $R_3$ are independently selected from a hydrogen atom, a $C_{1-20}$ hydrocarbyl radical, a $C_{1-20}$ alkoxy radical, a $C_{6-10}$ aryl oxide radical or alkylsilyl radicals containing at least one silicon atom and $C_{3-30}$ carbon atoms, and; $R_4$ and $R_5$ are independently selected from a hydrogen atom, a $C_{1-20}$ hydrocarbyl radical, a $C_{1-20}$ alkoxy radical a $C_{6-10}$ aryl oxide radical, or alkylsilyl radicals containing at least one silicon atom and $C_{3-30}$ carbon atoms.

In the art, a commonly used term for the $X(R_6)$ group shown in Formula (I) is 'leaving group', i.e. any ligand that can be abstracted from Formula (I) forming a catalyst species capable of polymerizing one or more olefin(s). An equivalent term for the $X(R_6)$ group is an 'activatable ligand'. Further non-limiting examples of the $X(R_6)$ group shown in Formula (I) include weak bases such as amines, phosphines, ethers, carboxylates and dienes. In another embodiment, the two $R_6$ groups may form part of a fused ring or ring system.

Further embodiments of component A include structural, optical or enantiomeric isomers (meso and racemic isomers) and mixtures thereof of the structure shown in Formula (I). While not to be construed as limiting, two species of component A include: diphenylmethylene(cyclopentadienyl)(2,7-di-t-butylfuorenyl)hafnium dichloride having the molecular formula $[(2,7\text{-}tBu_2Flu)Ph_2C(Cp)HfCl_2]$; and diphenylmethylene(cyclopentadienyl)(2,7-di-t-butylfuorenyl)hafnium dimethyl having the molecular formula $[(2,7\text{-}tBu_2Flu)Ph_2C(Cp)HfMe_2]$.

Embodiments of the ethylene interpolymer product include: (i) an ethylene interpolymer product comprising a first and a second ethylene interpolymer synthesized using one or more bridged metallocene catalyst formulation(s); or (ii) an ethylene interpolymer product comprising a first and a third ethylene interpolymer synthesized using one or more bridged metallocene catalyst formulation(s); or (iii) an ethylene interpolymer product comprising a first, a second and a third ethylene interpolymer synthesized using one or more bridged metallocene catalyst formulation(s). Embodiments include the manufacture of the first, the second and the third ethylene interpolymer in a first, a second and a third reactor, respectively. The first and second reactors may be operated in series or parallel mode. In series mode the effluent from the first reactor flows directly into the second reactor. In contrast, in parallel mode the effluent from the first reactor by-passes the second reactor and the effluent from the first and second reactor are combined downstream of the second reactor.

In Comparative 1 samples disclosed herein, e.g. Comparative 1a and 1b, 'an unbridged single site catalyst formulation' was employed in two solution polymerization reactor. This catalyst formulation included a bulky ligand-metal complex, hereinafter 'Component C', defined by Formula (II):

$$(L^A)_a M(PI)_b(Q)_n \quad \text{(II)}$$

In Formula (II): $(L^A)$ represents a bulky ligand; M represents a metal atom; PI represents a phosphinimine ligand; Q represents a leaving group; a is 0 or 1; b is 1 or 2; (a+b)=2; n is 1 or 2; and the sum of (a+b+n) equals the valance of the metal M. Non-limiting examples of M in Formula (II) include Group 4 metals, titanium, zirconium and hafnium.

Non-limiting examples of the bulky ligand $L^A$ in Formula (II) include unsubstituted or substituted cyclopentadienyl ligands or cyclopentadienyl-type ligands, heteroatom substituted and/or heteroatom containing cyclopentadienyl-type ligands. Additional non-limiting examples include, cyclopentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of n-bonding to the metal M, such embodiments include both $\eta^3$-bonding and $\eta^5$-bonding to the metal M. In other embodiments, $L^A$ may comprise one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

The phosphinimine ligand, PI, is defined by Formula (III):

$$(R^p)_3P{=}N{-} \quad \text{(III)}$$

wherein the $R^p$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula $-Si(R^s)_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula $-Ge(R^G)_3$, wherein the $R^G$ groups are defined as $R^s$ is defined in this paragraph.

The leaving group Q is any ligand that can be abstracted from Formula (II) forming a catalyst species capable of polymerizing one or more olefin(s). In some embodiments, Q is a monoanionic labile ligand having a sigma bond to M. Depending on the oxidation state of the metal, the value for n is 1 or 2 such that Formula (II) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, $C_{1-10}$ alkyl radicals, $C_{1-10}$ alkoxy radicals, $C_{6-10}$ arly or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

Further embodiments of Component C include structural, optical or enantiomeric isomers (meso and racemic isomers) and mixtures thereof of the bulky ligand-metal complex shown in Formula (II).

While not to be construed as limiting, two species of component C include: cyclopentadienyl tri(tertiary butyl) phosphinimine titanium dichloride having the molecular formula $[Cp[(t\text{-}Bu)_3PN]TiCl_2]$; and cyclopentadienyl tri (isopropyl)phosphinimine titanium dichloride having the molecular formula $[Cp[(isopropyl)_3PN]TiCl_2]$.

The bridged metallocene catalyst formulation contains a component A (defined above), a component $M^A$, a component $B^A$ and a component $P^A$. Components M, B and P are defined below and the superscript "$^A$" denotes that fact that the respective component was part of the catalyst formulation containing component A, i.e. the bridged metallocene catalyst formulation.

In this disclosure Comparative ethylene interpolymer products were prepared by employing an unbridged single site catalyst formulation. In these Comparative samples, the unbridged single site catalyst formulation replaced the bridged metallocene catalyst formulation. The unbridged single site catalyst formulation contains a component C (defined above), a component $M^C$, a component $B^C$ and a component $P^C$. Components M, B and P are defined below and the superscript "$^C$" denoted that fact that the respective component was part of the catalyst formulation containing component C, i.e. the unbridged single site catalyst formulation.

The catalyst components M, B and P were independently selected for each catalyst formulation. To be more clear: components $M^A$ and $M^C$ may, or may not, be the same chemical compound; components $B^A$ and $B^C$ may, or may not, be the same chemical compound; and components $P^A$ and $P^C$ may, or may not, be the same chemical compound. Further, catalyst activity was optimized by independently adjusting the mole ratios of the components in each catalyst formulation.

Components M, B and P were not particularly limited, i.e. a wide variety of components can be used as described below.

Component M functioned as a co-catalyst that activated component A or component C, into a cationic complex that effectively polymerized ethylene, or mixtures of ethylene and α-olefins, producing high molecular weight ethylene interpolymers. In the bridged metallocene catalyst formulation and the unbridged single site catalyst formulation the respective component M was independently selected from a variety of compounds and those skilled in the art will understand that the embodiments in this disclosure are not limited to the specific chemical compound disclosed. Suitable compounds for component M included an alumoxane co-catalyst (an equivalent term for alumoxane is aluminoxane). Although the exact structure of an alumoxane co-catalyst was uncertain, subject matter experts generally agree that it was an oligomeric species that contain repeating units of the general Formula (IV):

$$(R)_2AlO—(Al(R)—O)_n—Al(R)_2 \quad (IV)$$

where the R groups may be the same or different linear, branched or cyclic hydrocarbyl radicals containing 1 to 20 carbon atoms and n is from 0 to about 50. A non-limiting example of an alumoxane was methyl aluminoxane (or MMAO-7) wherein each R group in Formula (IV) is a methyl radical.

Component B was an ionic activator. In general, ionic activators are comprised of a cation and a bulky anion; wherein the latter is substantially non-coordinating.

In the bridged metallocene catalyst formulation and the unbridged single site catalyst formulation the respective component B was independently selected from a variety of compounds and those skilled in the art will understand that the embodiments in this disclosure are not limited to the specific chemical compound disclosed. Non-limiting examples of component B were boron ionic activators that are four co-ordinate with four ligands bonded to the boron atom. Non-limiting examples of boron ionic activators included the following Formulas (V) and (VI) shown below:

$$[R^5]^+[B(R^7)_4]^- \quad (V)$$

where B represented a boron atom, $R^5$ was an aromatic hydrocarbyl (e.g. triphenyl methyl cation) and each $R^7$ was independently selected from phenyl radicals which were unsubstituted or substituted with from 3 to 5 substituents selected from fluorine atoms, $C_{1-4}$ alkyl or alkoxy radicals which were unsubstituted or substituted by fluorine atoms; and a silyl radical of formula $—Si(R^9)_3$, where each $R^9$ was independently selected from hydrogen atoms and $C_{1-4}$ alkyl radicals; and compounds of formula (VI):

$$[(R^8)_tZH]^+[B(R^7)_4]^- \quad (VI)$$

where B was a boron atom, H was a hydrogen atom, Z was a nitrogen or phosphorus atom, t was 2 or 3 and $R^8$ was selected from $C_{1-8}$ alkyl radicals, phenyl radicals which were unsubstituted or substituted by up to three $C_{1-4}$ alkyl radicals, or one $R^8$ taken together with the nitrogen atom may form an anilinium radical and $R^7$ was as defined above in Formula (VI).

In both Formula (V) and (VI), a non-limiting example of $R^7$ was a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators included: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6- tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators included N,N-dimethylanilinium tetrakispentafluorophenyl borate, and triphenylmethylium tetrakispentafluorophenyl borate.

Component P is a hindered phenol and is an optional component in the respective catalyst formulation. In the bridged metallocene catalyst formulation and the unbridged single site catalyst formulation the respective component P was independently selected from a variety of compounds and those skilled in the art will understand that the embodiments in this disclosure are not limited to the specific chemical compound disclosed. Non-limiting example of hindered phenols included butylated phenolic antioxidants, butylated hydroxytoluene, 2,4-di-tertiarybutyl-6-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

As fully described below, a highly active bridged metallocene catalyst formulation was produced by optimizing the quantity and mole ratios of the four components in the formulation; i.e., component A, component $M^A$, component $B^A$ and optionally component $P^A$. Where highly active means a very large amount of ethylene interpolymer is produced from a very small amount of catalyst formulation. Similarly, a highly active unbridged single site catalyst formulation (comparative catalyst formulation) was produced by optimizing the quantity and mole ratios of the four components in the formulation; i.e., component C, component $M^C$, component $B^C$ and optionally component $P^C$.

In this disclosure, the bridged metallocene catalyst formulation produced ethylene interpolymer products having a unique unsaturation ratio, UR.

Table 1 discloses the amount of Internal, Side Chain and Terminal unsaturations per 100 carbons (1000) in Examples 20-27 of this disclosure; specifically, the amount of trans-vinylene, vinylidene and terminal vinyl groups as measured according to ASTM D3124-98 and ASTM D6248-98. Table 1 also discloses the dimensionless ‘Unsaturation Ratio’, ‘UR’, as defined by the following equation:

$$UR=(SC^U-T^U)/T^U \qquad \text{Eq.(UR)}$$

where $SC^U$ are the side chain unsaturations and $T^U$ are the terminal unsaturations. Examples 20-27 have an average UR value of 0.155. Table 1 also discloses the amount of Internal, Side Chain and Terminal unsaturations per 100 carbons (1000) in Comparative ethylene interpolymers. Graphically, FIG. 1 compares average UR values.

Comparative Q were commercial products called QUEO™ available from Borealis, Vienna, Austria. In Table 1, Comparative Q1 (i.e. Comp.Q1) was QUEO 0201, Comparative Q2 was QUEO 8201, Comparative Q3 was QUEO 0203 and Comparative Q4 was QUEO 1001. QUEO products are ethylene/1-octene copolymers, believed to be produced in a solution polymerization process employing one reactor and a metallocene catalyst formulation. In Table 1, the average UR value of Comparative R is the average of 7-samples of commercial products called AFFINITY® available from The Dow Chemical Company, Midland, Michigan; specifically, AFFINITY PL1880 (3-samples), AFFINITY PF1140, AFFINITY PF1142 and AFFINITY PL1881. The AFFINITY samples were ethylene/1-octene copolymers believed to be produced in a solution polymerization process employing one reactor and a single site catalyst formulation. In Table 1, the average UR of Comparative S is the average of 5-samples of commercial products called ENABLE® available from ExxonMobil Chemical Company, Spring, Texas; specifically, ENABLE 27-03CH (3-samples) and ENABLE 20-05 (2-samples). ENABLE products were ethylene/1-hexene copolymers, believed to be produced in a gas phase process employing one reactor and a metallocene catalyst formulation. In Table 1, the average UR of Comparative T is the average of 48-samples of commercial products called EXCEED® available from ExxonMobil Chemical Company, Spring, Texas; specifically, EXCEED 1018 (26-samples), EXCEED 1023 (4-samples), EXCEED 1015 (3-samples), EXCEED 4518 (3-samples), EXCEED 3518(4-samples), Exceed 1012 (3-samples), EXCEED 1318CA (2-samples), EXCEED 3812, EXCEED 1023DA and EXCEED 2718CB. EXCEED products were ethylene/1-hexene copolymers believed to be produced in a gas phase process employing one reactor and a metallocene catalyst formulation. Comparative U, having a UR value of −0.667, was a commercial product called ELITE® AT 6202 available from The Dow Chemical Company, Midland, Michigan ELITE AT 6202 was an ethylene/1-hexene copolymer, believed to be produced in a dual reactor solution process employing at least one homogeneous catalyst formulation. In Table 1, the average UR of Comparative V is the average of 25-samples of commercial products called ELITE available from The Dow Chemical Company, Midland, Michigan; specifically, ELITE 5400 (12-samples), ELITE 5100 (4-samples), ELITE 5110 (2-samples), ELITE 5230 (2-samples), ELITE 5101 and ELITE 5500. ELITE products were ethylene/1-octene copolymers believed to be produced in a solution polymerization process employing a single site catalyst formulation in a first reactor and a batch Ziegler-Natta catalyst formulation in a second reactor. In Table 1, the average UR of Comparative 1 is the average of 61-samples of a commercial product called SURPASS® FPs117 available from NOVA Chemicals Corporation, Calgary, Alberta. SURPASS FPs117 was an ethylene/1-octene copolymer produced in a solution polymerization process employing a single site catalyst formulation. In Table 1, the average UR of Comparative 2 is an average of 3-samples of an experimental product manufactured by NOVA Chemicals Corporation, Calgary, Alberta. Comparative 2a, 2b and 2c were ethylene/1-octene copolymers (about 0.917 g/cc and about 1.0 $I_2$) produced in a solution polymerization process employing a bridged metallocene catalyst formulation in a first reactor and an unbridged single site catalyst formulation in a second reactor. In Table 1, the average UR of Comparative 3 is the average of 4-samples of an experimental product manufactured by NOVA Chemicals Corporation, Calgary, Alberta. Comparative 3a, 3b, 3c and 3d were ethylene/1-octene copolymers (about 0.917 g/cc and about 1.0 $I_2$) produced in a solution polymerization process employing a bridged metallocene catalyst formulation in a first reactor and an in-line Ziegler-Natta catalyst formulation in a second reactor. In Table 1, the average UR of Comparative 4 is the average of 21-samples of commercial products called SURPASS available from NOVA Chemicals Corporation, Calgary, Alberta; specifically, SURPASS SPs116 (6-samples), SURPASS SPsK919 (5-samples), SURPASS VPsK114

(3-samples) and SURPASS VPsK914 (7-samples) were ethylene/1-octene copolymers produced in a solution polymerization process employing a single site catalyst formulation in a first reactor and an in-line Ziegler-Natta catalyst formulation in a second reactor. In Table 1, the average UR of Comparative 5 is the average of 137-samples of a commercial product called SCLAIR® FP120 available from NOVA Chemicals Corporation, Calgary, Alberta. FP120 was an ethylene/1-octene copolymer produced in a solution polymerization process employing an in-line Ziegler-Natta catalyst formulation. Table 1 documents the UR value of Comparative Examples 1, 2 and 4, which have an average UR value of −0.147 as shown in FIG. 1.

LCB is a structural feature in polyethylenes that is well known to those of ordinary skill in the art. Traditionally, there are three methods to quantify the amount of LCB, namely, nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res. 1977, 10, 332-339. A long chain branch is macromolecular in nature, i.e. long enough to be seen in an NMR spectra, triple detector SEC experiments or rheological experiments. A limitation with LCB analysis via NMR is that it cannot distinguish branch length for branches equal to or longer than six carbon atoms (thus, NMR cannot be used to characterize LCB in ethylene/1-octene copolymers, which have hexyl groups as side branches). The triple detection SEC method measures the intrinsic viscosity ([η]) (see W. W. Yau, D. Gillespie, Analytical and Polymer Science, TAPPI Polymers, Laminations, and Coatings Conference Proceedings, Chicago 2000; 2: 699 or F. Beer, G. Capaccio, L. J. Rose, J. Appl. Polym. Sci. 1999, 73: 2807 or P. M. Wood-Adams, J. M. Dealy, A. W. deGroot, O. D. Redwine, Macromolecules 2000; 33: 7489). By referencing the intrinsic viscosity of a branched polymer ($[\eta]_b$) to that of a linear one ($[\eta]_l$) at the same molecular weight, the viscosity branching index factor g' ($g'=[\eta]_b/[\eta]_l$) was used for branching characterization. However, both short chain branching (SCB) and long chain branching (LCB) make contribution to the intrinsic viscosity ([η]), effort was made to isolate the SCB contribution for ethylene/1-butene and ethylene/1-hexene copolymers but not ethylene/1-octene copolymers (see Lue et al., U.S. Pat. No. 6,870,010 B1).

In this disclosure a new method was developed to quantify the amount of long chain branching in ethylene/α-olefin interpolymers. This new method correlates the melt flow index (MI) and intrinsic viscosity (IV) of the resin of interest and defines a new parameter called the Melt Flow-Intrinsic Viscosity Index (MFIVI) to quantify the degree of LCB in the resin. In this new method, the impacts of molar mass, molar mass distribution, bimodality in molar mass distribution, comonomer type and content were removed; allowing one to quantify the amount of long chain branching in different ethylene interpolymers.

The Melt Flow-Intrinsic Viscosity Index (MFIVI) is defined by the following equation, Eq.1:

$$MFIVI = \left( \frac{1.9507 \times \left( \frac{f_{bimodality} \times f_{comonmer}}{I_f} \right)^{0.21678}}{IV + 3.0122 \times 10^{-6} \times (\text{Comonomer Wt\%}) \times M_v^{0.725}} \right) - 1 \qquad \text{Eq. 1}$$

The various parameters in Eq.1 are fully described in the following paragraphs.

The $f_{bimodality}$ parameter in Eq.1 is defined by Eq.(2):

$$f_{bimodality}=10^{(-0.94831 \times Log(Pd) - 0.94322 \times Cf - 0.71879)} \qquad \text{Eq.2}$$

In Eq.(2) the Pd parameter represents the polydispersity of the ethylene interpolymer of interest, where Pd is the conventional polydispersity as measured by Size Exclusion Chromatographs (SEC), i.e., $Pd=M_w/M_n$, where $M_w$ and $M_n$ are the weight and number average molecular weights, respectively.

The parameter $C_f$, in Eq.2, is a Correction Factor for the ethylene interpolymer of interest and is determined according to the following two step procedure, i.e. steps (i) and (ii).

In step (i) the melt flow distribution function, $Log(1/I_n)$, as defined by Eq.(3), is determined for the ethylene interpolymer of interest.

$$Log(1/I_n)=\beta_0+\beta_1 \times Log(loading)+\beta_2 \times (Log(loading))^2 \qquad \text{Eq.3}$$

Figure 2:
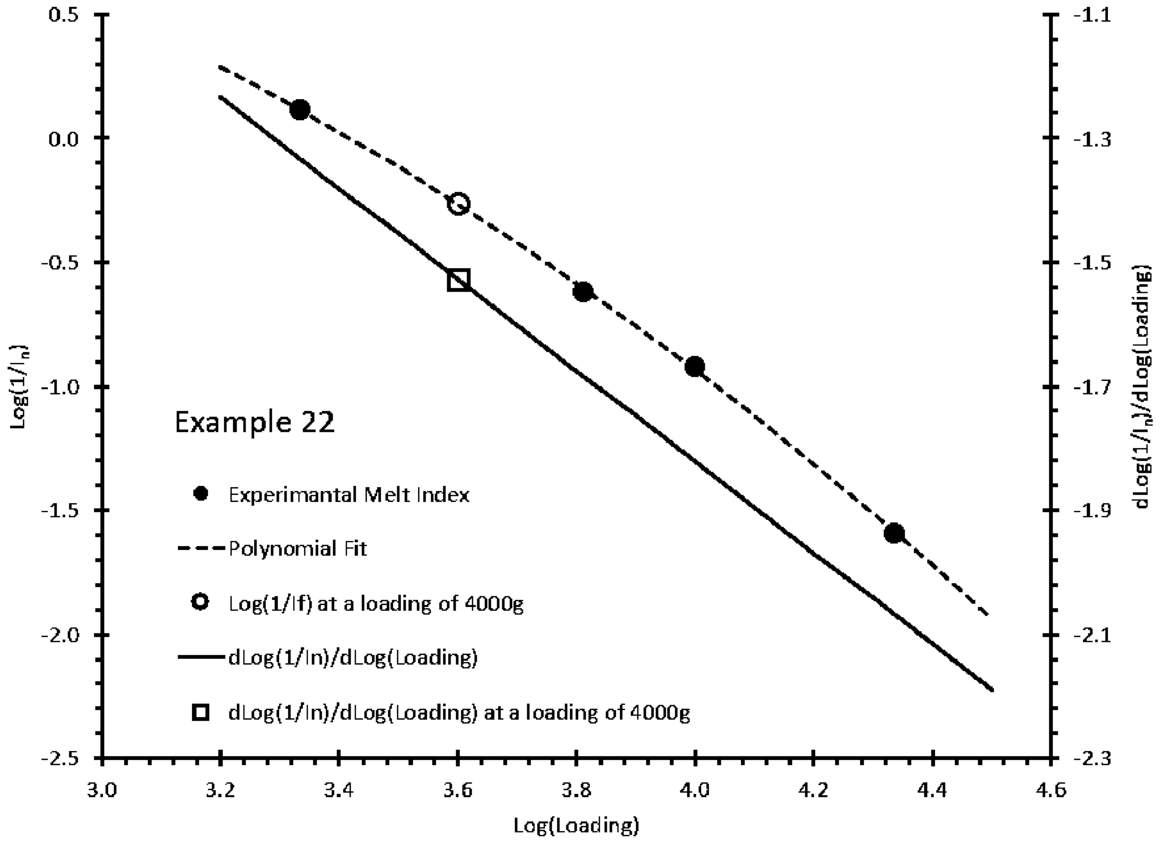
FIG. 2 illustrates how to determine the melt flow distribution function, the first derivative of the melt flow distribution function, $I_f$ (open circle symbol) and $C_f$ (open square symbol) using Example 22 as an illustrative example.

The melt flow distribution function is determined by plotting Log $(I/I_n)$ versus Log(loading), where $I_n$ is the measured melt index of the ethylene interpolymer of interest at loadings of 21600, 10000, 6480 and 2160 grams (measured according to ASTM D1238 at 190° C.). The dotted curve in FIG. 2 illustrates the melt flow distribution function of Example 22, having $\beta_2$, $\beta_1$ and $\beta_0$ values of −0.3673, 1.1166 and 0.4747, respectively; this polynomial fit has a least squares $R^2$ value of 0.9951. Table 2 documents the melt flow distribution functions of ethylene interpolymer product Examples 20-27, Comparative Q1-Q4 and Comparative W1 and W2; as well as Comparative Examples 1 and 2.

In step (ii) the first derivative of the melt flow distribution function was calculated according to Eq.4:

$$\frac{d\text{Log}(1/I_n)}{d\text{Log(loading)}} = \beta_1 + 2 \times \beta_2 \times \text{Log(loading)} \qquad \text{Eq. 4}$$

The solid line in FIG. 2 illustrates the first derivative of the melt flow distribution function of Example 22 (Eq.4). The correction factor $C_f$ (in Eq.2) is the value of the first derivative (Eq.4) at a loading of 4000 g. In the case of Example 22, the $C_f$ value was −1.529, as shown by the open square symbol in FIG. 2 (Log(4000)=3.6021). Table 3B documents $C_f$ values of ethylene interpolymer product Examples 20-27, Comparative 1a, Comparative Q1, Q3 and Q4 and Comparative W1 and W2; as well as Comparative Examples 1 and 2.

The ethylene interpolymer products of this disclosure are characterized by a first derivative of the melt flow distribution function $$\frac{d\text{Log}(1/I_n)}{d\text{Log(loading)}}$$

at a loading of 4000 g having values from ≥−1.85 to ≤−1.51.

Returning to Eq.1 and the parameter $I_f$; the $I_f$ parameter represents a fitted melt index. The open circle symbol in FIG. 2 illustrates the $I_f$ value of Example 22, i.e. 1.857 as shown in Table 3B. To be more general, for any ethylene interpolymer of interest the $I_f$ value is determined by the value of the melt flow distribution function (Eq.3) at a loading of 4000 g. Table 3B documents the $I_f$ values of ethylene interpolymer product Examples 20-27, Comparative 1a, Comparative Q1, Q3 and Q4, Comparative W1 and W2; as well as Comparative Examples 1 and 2.

In Eq.1 the parameter Comonomer Wt % is the weight percent of comonomer in the ethylene interpolymer of interest as measured by FTIR according to ASTM D6645. Table 3B documents the Comonomer Wt % values of ethylene interpolymer product Examples 20-27, Comparative 1a, Comparative Q1, Q3 and Q4, Comparative W1 and W2; as well as Comparative Examples 1 and 2.

Turning to the parameter $f_{comonomer}$ that appears in Eq.1. The $f_{comonomer}$ value used in Eq.1 is determined by the Comonomer Wt % value, specifically: if Comonomer Wt % is >14.95%, the $f_{comonomer}$ value used in Eq.1 is determined by Eq.5; if Comonomer Wt % is ≤14.95%, the $f_{comonomer}$ value used in Eq.1 is determined by Eq.6.

$$f_{comonomer}=10^{(0.018790\times(comonomer\ Wt\ \%)-0.28053)} \quad \text{Eq.5}$$

$$f_{comonomer}=1 \quad \text{Eq.6}$$

Finally, the IV and $M_v$ parameters in Eq.1 represent the intrinsic viscosity and viscosity average molar mass, respectively, of the ethylene interpolymer of interest as determined by 3D-SEC. The 3D-SEC procedure is fully described in this disclosure. Table 3B documents the IV and $M_v$ values of ethylene interpolymer product Examples 20-27, Comparative 1a, Comparative Q1, Q3 and Q4, Comparative W1 and W2; as well as Comparative Examples 1 and 2.

Figure 3:
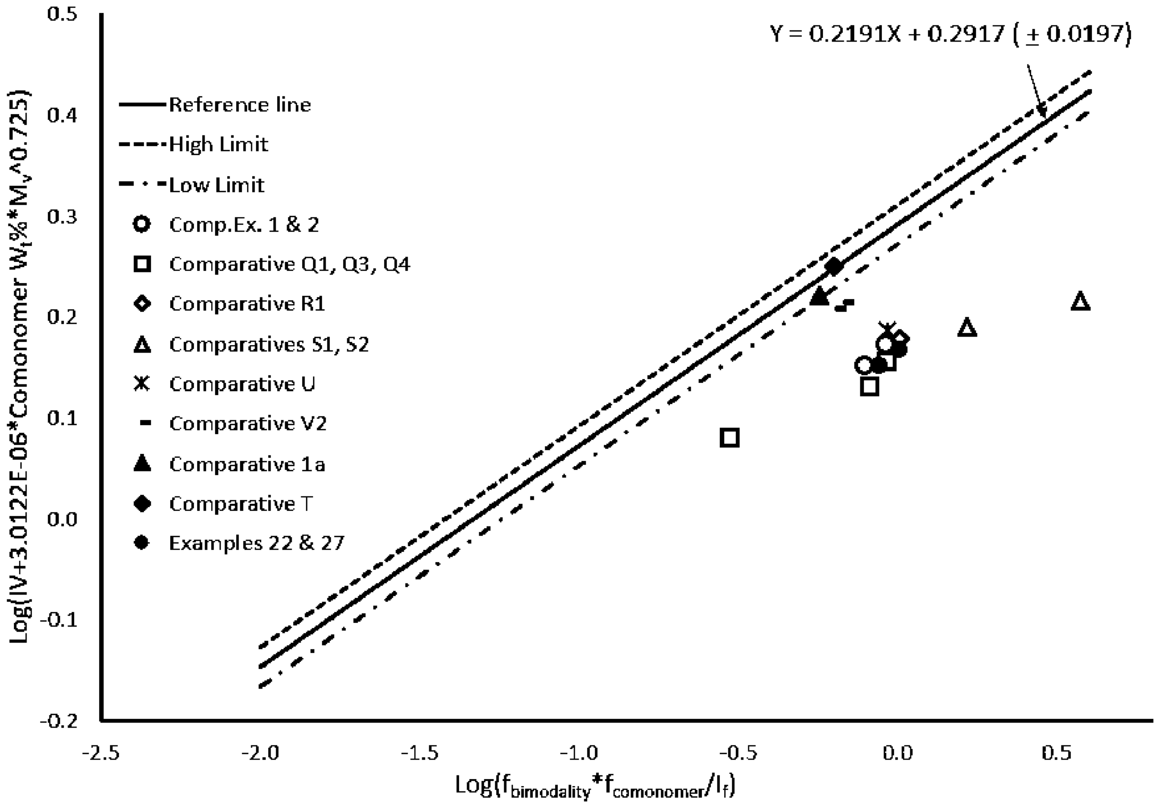
FIG. 3 illustrates how to determine the Melt Flow-Intrinsic Viscosity Index (MFIVI). Ethylene interpolymers that do not have long chain branching (LCB), or undetectable LCB, fall on the reference line. Deviation from the reference line indicates the presence of LCB.

FIG. 3 illustrates the calculation of Melt Flow-Intrinsic Viscosity Index (MFIVI) as defined in Eq.1. MFIVI allows one to quantify the degree of long chain branching (LCB) in an ethylene interpolymer. In FIG. 3, the term $$\mathrm{Log}\left(\frac{f_{bimodality}\times f_{comonomer}}{I_f}\right),$$

as defined above, was plotted on the abscissa (X); and the term Log(IV+3.0122×$10^{-6}$×(Comonomer Wt %)×$M_v^{0.725}$), as defined above, was plotted on the ordinate (Y). Ethylene interpolymers having no LCB (or undetectable LCB) are defined by the reference line window shown in FIG. 3, i.e. Y=0.2191X+0.2917(±0.0197); more specifically, the solid line defined by the linear relationship Y=0.2191X+0.2917 and the upper dashed line (Y=0.2191X+0.3114) and the lower dash-dot line (Y=0.2191X+0.2720). This reference window represents 45 ethylene interpolymers that did not contain long chain branching. To improve the clarity of FIG. 3, most reference resins were not plotted in FIG. 3; rather, the reference resins are disclosed in Table 3A. Reference resins had $M_w/M_n$ values ranging from 1.97 to 13.5, contained $C_8$, or $C_6$, or $C_4$ α-olefin or no α-olefin and were produced in solution, gas phase or slurry processes using Ziegler-Natta, homogeneous and mixed (Ziegler-Natta+homogeneous) catalyst formulations.

In this disclosure, resins having no LCB (or undetectable LCB) were characterized by MFIVI values <0.05, as evidenced by Table 3A; wherein reference resins had MFIVI values ranging from −0.042 to 0.043. Two reference resins were plotted in FIG. 3: Comparative 1a (filled triangle symbol), MFIVI=0.037 (Table 3B); and Comparative T (filled diamond), MFIVI=−0.005 (Table 3B). Comparative 1a was an ethylene/1-octene interpolymer produced using an unbridged single site catalyst formulation in solution dual reactor process commercially available as SURPASS FPs117-C NOVA Chemicals Corporation, Calgary, Alberta. Comparative T was EXCEED 1018 available from ExxonMobil Chemical Company, Spring, Texas; an ethylene/1-hexene interpolymer produced using a single site catalyst formulation in a gas phase process. Table 3B discloses the MFIVI values of Comparatives R1, S1, S2, U, V2a, V2b and T; as well as the values of the various parameters required to calculate MFIVI.

The ethylene interpolymer products of this disclosure where characterized by the presence of long chain branching; specifically, the ethylene interpolymer products of this disclosure were characterized by a MFIVI value of from 0.05 to ≤0.80.

As shown in Table 3B ethylene interpolymer product Examples 20-27 contained long chain branching as evidenced by MFIVI values ranging from 0.315 (Example 20) to 0.342 (Example 27). Example 22 and Example 27 are plotted in FIG. 3 (filled circles); these ethylene interpolymer products deviated significantly from the reference line demonstrating the presence of LCB. The solution polymerization process conditions used to manufacture Examples 20, 22 and 26 are shown in Table 5A and Table 5B.

As shown in Table 3B, Comparatives Q1, Q3 and Q4 contained long chain branching, as evidenced by MFIVI values 0.05 and the significant deviation from the reference in FIG. 3 (open squares). Comparative Q were commercial products available from Borealis, Vienna, Austria; specifically Comparative Q1 was QUEO 0201, Comparative Q3 was QUEO 0203 and Comparative Q4 was QUEO 1001. Although the MFIVI values of Comparatives W1 and W2 were not determined, these samples contained long chain branching (i.e. MFIVI values ≥0.05); Comparative W1 and W2 were samples of EXACT® 201 and EXACT 201 HS, respectively, commercially available from ExxonMobil Chemical Company, Spring, Texas Additional comparatives samples are shown in Table 3B. Comparative R1 contained LCB, as evidenced by MFIVI=0.298, and deviated significantly from the reference line in FIG. 3 (open diamond). Comparative R1 was a commercial product called AFFINITY PL1880G available from The Dow Chemical Company, Midland Michigan Comparative S1 and S2 contained LCB, having MFIVI values of 0.403 and 0.582, respectively, and deviated significantly from the reference line (FIG. 3, open triangle). Long chain branched Comparative S1 and S2 were commercial products called ENABLE available from ExxonMobil Chemical Company, Spring Texas; specifically ENABLE 20-05HH and ENABLE 27-03, respectively. Comparative U contained LCB, MFIVI=0.249, and deviated significantly from the reference line in FIG. 3. Comparative U was a commercial product coded ELITE AT 6202 available from The Dow Chemical Company, Midland, Michigan. Comparative V2a and V2b contained LCB as evidenced by MFIVI values of 0.102 and 0.099, respectively, and deviated significantly from the reference line in FIG. 3 (dash symbol). Comparative V2a and V2b were two samples of a commercial product called ELITE 5100G available from The Dow Chemical Company, Midland, Michigan As shown in Table 3B, Comparative Example 1 and Comparative Example 2 contained LCB, having MFIVI values of 0.293 and 0.313, respectively.

Figure 4:
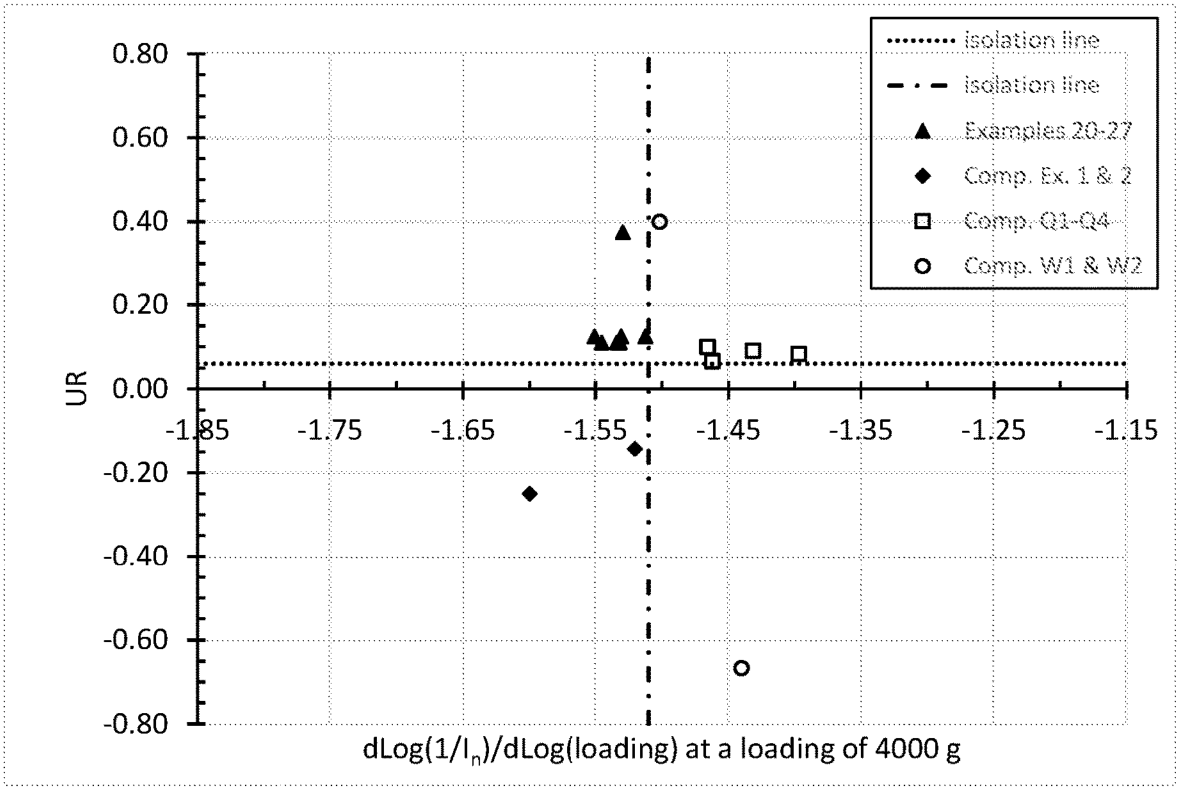
FIG. 4 compares the sum of unsaturation ratio and the first derivative of the melt flow distribution function at a loading of 4000 g for ethylene interpolymer product Examples 20-27, relative to Comparatives Q1-Q4, W1 and W2 and Comparative Examples 1 and 2.

FIG. 4 plots UR values (ordinate) as a function of the first derivative of the melt flow distribution function $$\frac{d\mathrm{Log}(1/I_n)}{d\mathrm{Log}(\mathrm{loading})}$$

at a loading of 4000 g (abscissa) for various ethylene interpolymers. As shown in FIG. 4 the ethylene interpolymer products of this disclosure, Examples 20-27 appear in a unique quadrant (upper left). More specifically, the ethylene interpolymer products of this disclosure are characterized by a first derivative of the melt flow distribution function $$\frac{d\mathrm{Log}(1/I_n)}{d\mathrm{Log(loading)}}$$

at a loading of 4000 g having values from ≥−1.85 to ≤−1.51 and an unsaturation ratio, UR, of from >0.06 to ≤0.60. Previously disclosed Comparative Examples 1 and 2 are located in the lower left quadrant, having negative UR values; Comparative Q1-Q4 are located in the upper right quadrant; and Comparatives W1 and W2 have $$\frac{d\mathrm{Log}(1/I_n)}{d\mathrm{Log(loading)}}$$

at a loading of 4000 g values greater than −1.51. The ethylene interpolymers of this disclosure are also characterized by a Melt Flow-Intrinsic Visclosity Index, MFIVI, of from ≥0.05 to ≤0.80 and a residual catalytic metal of from 0.03 to 5 ppm of hafnium.

Solution Polymerization Process

Figure 5:
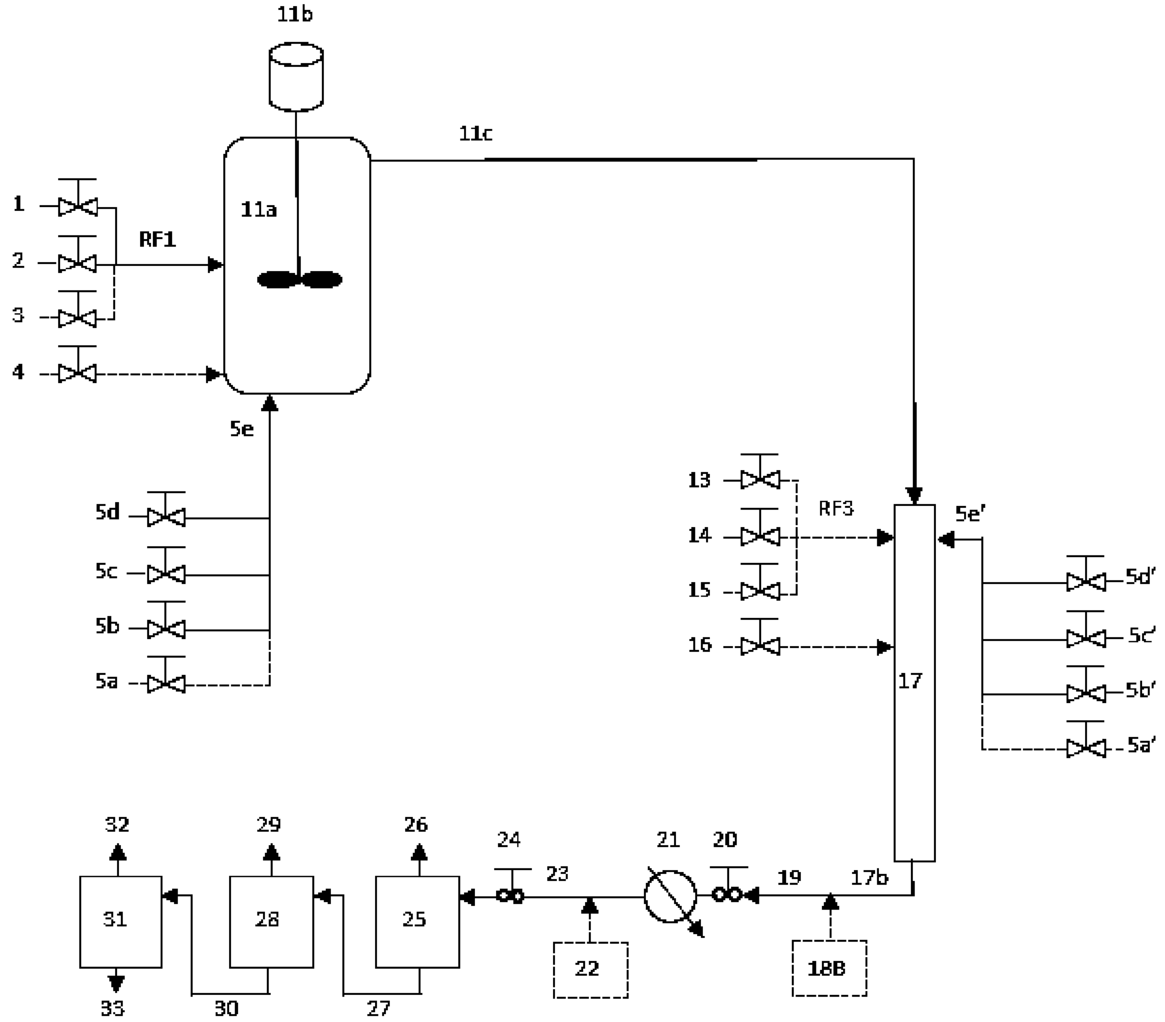
FIG. 5 illustrates embodiments of a continuous solution polymerization process employing one CSTR reactor (vessel 11*a*) and one tubular reactor (vessel 17).
Figure 6:
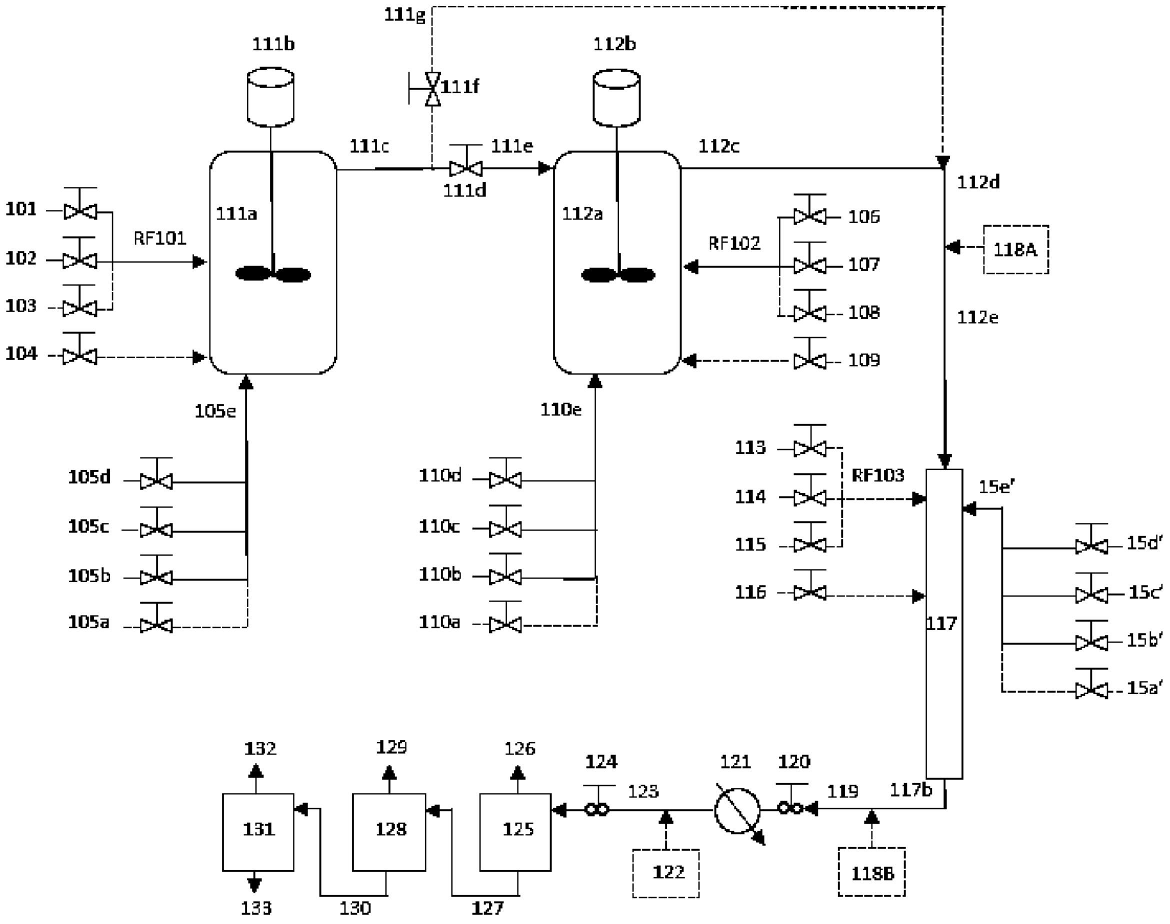
FIG. 6 illustrates embodiments of a continuous solution polymerization process employing two CSTR reactors (vessels 111*a* and 112*a*) and one tubular reactor (vessel 117). The two CSTR may be operated in series or parallel modes.

Embodiments of the continuous solution polymerization process are shown in FIG. 5 and FIG. 6; these figures are not to be construed as limiting, it being understood, that embodiments are not limited to the precise arrangement of, or number of, vessels shown. In brief, FIG. 5 illustrates one continuously stirred tank reactor (CSTR) followed by an optional tubular reactor and FIG. 6 illustrates two CSTRs followed by a tubular reactor. The dotted lines in FIGS. 5 and 6 illustrate optional features of the continuous polymerization process. In this disclosure, equivalent terms for tubular reactor 17 (FIG. 5) or 117 (FIG. 6) were the 'third reactor' or 'R3'. A third ethylene interpolymer may or may not be produced in reactor 117; to be more clear, a third ethylene interpolymer is not produced in reactor 117 if a catalyst deactivator is added upstream of reactor 117 from tank 118A.

In FIG. 5 process solvent 1, ethylene 2 and optional α-olefin 3 are combined to produce reactor feed stream RF1 which flows into reactor 11*a*. It is not particularly important that combined reactor feed stream RF1 be formed; i.e. reactor feed streams can be combined in all possible combinations, including an embodiment where streams 1 through 3 are independently injected into reactor 11*a*. Optionally hydrogen may be injected into reactor 11*a* through stream 4; hydrogen is generally added to control the molecular weight of the first ethylene interpolymer produced in reactor 11*a*. Reactor 11*a* is continuously stirred by stirring assembly 11*b* which includes a motor external to the reactor and an agitator within the reactor.

A bridged metallocene catalyst formulation is injected into reactor 11*a* via stream 5*e*. Catalyst component streams 5*d*, 5*c*, 5*b* and optional 5*a* refer to the ionic activator (Component B), the bulky ligand-metal complex (Component A), the alumoxane co-catalyst (Component M) and optional hindered phenol (Component P), respectively. The catalyst component streams can be arranged in all possible configurations, including an embodiment where streams 5*a* through 5*d* are independently injected into reactor 11*a*. Each catalyst component is dissolved in a catalyst component solvent. Catalyst component solvents, for Components A, B, M and P may be the same or different. Catalyst component solvents are selected such that the combination of catalyst components does not produce a precipitate in any process stream; for example, precipitation of a catalyst component in stream 5*e*. In this disclosure, the term 'first homogeneous catalyst assembly' refers the combination of streams 5*a* through 5*e* and the flow controllers and tanks (not shown in FIG. 5) that function to deliver the bridged metallocene catalyst formulation to the first reactor 11*a*. The optimization of the bridged metallocene catalyst formulation is described below.

Reactor 11*a* produces a first exit stream, stream 11*c*, containing the first ethylene interpolymer dissolved in process solvent, as well as unreacted ethylene, unreacted α-olefins (if present), unreacted hydrogen (if present), active catalyst, deactivated catalyst, residual catalyst components and other impurities (if present). The first exit stream, stream 11*c*, enters tubular reactor 17.

The term "tubular reactor" is meant to convey its conventional meaning, namely a simple tube; wherein the length/diameter (L/D) ratio is at least 10/1. The following reactor feed streams are injected into tubular reactor 17; process solvent 13, ethylene 14 and α-olefin 15. As shown in FIG. 5, streams 13, 14 and 15 may be combined forming reactor feed stream RF3 and the latter is injected into reactor 17. It is not particularly important that stream RF3 be formed; i.e. reactor feed streams can be combined in all possible combinations. Optionally hydrogen may be injected into reactor 17 through stream 16. A bridged metallocene catalyst formulation is injected into reactor 17 via stream 5*e*' Catalyst component streams 5*d*', 5*c*', 5*b*' and optional 5*a*' refer to the ionic activator (Component B), the bulky ligand-metal complex (Component A), the alumoxane co-catalyst (Component M) and optional hindered phenol (Component P), respectively. The term 'third homogeneous catalyst assembly' refers the combination of streams 5*a*' through 5*e*' and the flow controllers and tanks (not shown in FIG. 5) that function to deliver the bridged metallocene catalyst formulation to reactor 17. Although not shown in FIG. 5, optionally, reactor 17 may be supplied with catalyst from the first homogeneous catalyst assembly, i.e. a portion of the bridged metallocene catalyst formulation formed in the first homogeneous catalyst assembly may be supplied to reactor 11*a* and the remaining portion may be supplied to reactor 17.

In reactor 17*a* third ethylene interpolymer is formed. The third ethylene interpolymer may be formed using a variety of operational modes, non-limiting examples include: (a) residual ethylene, residual optional α-olefin and residual active catalyst entering reactor 17 react to form the third ethylene interpolymer, or; (b) fresh process solvent 13, fresh ethylene 14 and optional fresh α-olefin 15 are added to reactor 17 and the residual active catalyst entering reactor 17 forms the third ethylene interpolymer, or; (c) a fresh catalyst formulation is added to reactor 17 to polymerize residual ethylene and residual optional α-olefin to form the optional third ethylene interpolymer, or; (d) fresh process solvent 13, ethylene 14, optional α-olefin 15 and a fresh catalyst formulation are added to reactor 17 to form the third ethylene interpolymer.

Reactor 17 effluent exits via exit stream 17*b*. Catalyst deactivator from tank 18B is added to reactor exit stream 17*b* forming a deactivated solution stream 19. The deactivated solution passes through pressure let down device 20 and heat exchanger 21. Optionally, a passivator may be added via tank 22 forming a passivated solution, stream 23. Stream 23 passes through pressure let down device 24 and enters a first vapor/liquid separator 25; hereinafter, "V/L" is equivalent to vapor/liquid. Two streams are formed in the first V/L separator: a first bottom stream 27 comprising a solution that is ethylene interpolymer rich and also contains residual ethylene, residual optional α-olefins and catalyst residues; and a first gaseous overhead stream 26 comprising ethylene, process solvent, optional α-olefins, optional hydrogen, oligomers and light-end impurities if present.

The first bottom stream enters a second V/L separator 28. In the second V/L separator two streams are formed: a second bottom stream 30 comprising a solution that is richer in ethylene interpolymer product and leaner in process solvent relative to the first bottom stream 27; and a second gaseous overhead stream 29 comprising process solvent, optional α-olefins, ethylene, oligomers and light-end impurities if present.

The second bottom stream 30 flows into a third V/L separator 31. In the third V/L separator two streams are formed: a product stream 33 comprising an ethylene interpolymer product, deactivated catalyst residues and less than 5 weight % of residual process solvent; and a third gaseous overhead stream 32 comprised essentially of process solvent, optional α-olefins and light-end impurities if present.

Embodiments also include the use of one or more V/L separators operating at reduced pressure, i.e. the operating pressure is lower than atmospheric pressure and/or embodiments where heat is added during the devolatilization process, i.e. one or more heat exchangers are employed upstream of, or within, one or more of the V/L separators. Such embodiments facilitate the removal of residual process solvent and comonomer such that the residual volatiles in ethylene interpolymer products are less than 500 ppm.

Product stream 33 proceeds to polymer recovery operations. Non-limiting examples of polymer recovery operations include one or more gear pump, single screw extruder or twin screw extruder that forces the molten ethylene interpolymer product through a pelletizer. Other embodiments include the use of a devolatilizing extruder, where residual process solvent and optional α-olefin may be removed such that the volatiles in the ethylene interpolymer product is less than 500 ppm. Once pelletized the solidified ethylene interpolymer product is typically transported to a product silo.

The first, second and third gaseous overhead streams shown in FIG. 5 (streams 26, 29 and 32, respectively) are sent to a distillation column where solvent, ethylene and optional α-olefin are separated for recycling, or; the first, second and third gaseous overhead streams are recycled to the reactors, or; a portion of the first, second and third gaseous overhead streams are recycled to the reactors and the remaining portion is sent to a distillation column.

FIG. 6 illustrates an embodiment of a continuous solution polymerization process employing two CSTR reactors and an optional tubular reactor. Process solvent 101, ethylene 102 and optional α-olefin 103 are combined to produce reactor feed stream RF101 which flows into reactor 111*a*. Optionally hydrogen may be injected into reactor 111*a* through stream 104. Reactor 111*a* is continuously stirred by stirring assembly 111*b*.

A first bridged metallocene catalyst formulation is injected into reactor 111*a* via stream 105*e*. Catalyst component streams 105*d*, 105*c*, 105*b* and optional 105*a* contain the ionic activator (Component $B^1$, where the superscript '¹' denotes the first reactor), the bulky ligand-metal complex (Component $A^1$), the alumoxane co-catalyst (Component $M^1$) and optional hindered phenol (Component $P^1$), respectively. Each catalyst component is dissolved in a catalyst component solvent. Catalyst component solvents, for Components $A^1$, $B^1$, $M^1$ and $P^1$ may be the same or different. In FIG. 6, the first homogeneous catalyst assembly refers the combination of streams 105*a* through 105*e*, flow controllers and tanks that functions to deliver the active bridged metallocene catalyst formulation to reactor 111*a*.

Reactor 111*a* produces a first exit stream, stream 111*c*, containing the first ethylene interpolymer dissolved in process solvent. FIG. 6 includes two embodiments where reactors 111*a* and 112*a* can be operated in series or parallel modes. In series mode 100% of stream 111*c* (the first exit stream) passes through flow controller 111*d* forming stream 111*e* which enters reactor 112*a*. In contrast, in parallel mode 100% of stream 111*c* passes through flow controller 111*f* forming stream 111*g*. Stream 111*g* by-passes reactor 112*a* and is combined with stream 112*c* (the second exit stream) forming stream 112*d* (the third exit stream).

Fresh reactor feed streams are injected into reactor 112*a*; process solvent 106, ethylene 107 and optional α-olefin 108 are combined to produce reactor feed stream RF102. It is not important that stream RF102 is formed; i.e. reactor feed streams can be combined in all possible combinations, including independently injecting each stream into the reactor. Optionally hydrogen may be injected into reactor 112*a* through stream 109 to control the molecular weight of the second ethylene interpolymer. Reactor 112*a* is continuously stirred by stirring assembly 112*b* which includes a motor external to the reactor and an agitator within the reactor.

As shown in FIG. 6, a second bridged metallocene catalyst formulation is injected into reactor 112*a* through stream 110*e* and a second ethylene interpolymer is formed in reactor 112*a*. Catalyst component streams 110*d*, 110*c*, 110*b* and 110*a* contain the ionic activator Component $B^2$ (where the superscript '²' denotes the second reactor), the bulky ligand-metal complex (Component $A^2$), the alumoxane co-catalyst (Component $M^2$) and optional hindered phenol (Component $P^2$), respectively. The catalyst component streams can be arranged in all possible configurations, including an embodiment where streams 110*a* through 110*d* are independently injected into reactor 111*a*. Each catalyst component is dissolved in a catalyst component solvent.

Formula (I) defines the genus of catalyst Component A; however, Component $A^2$ employed in reactor 112*a* may be the same, or different, relative to catalyst Component $A^1$ employed in reactor 111*a*. Similarly, the chemical composition of catalyst Components $B^2$ and $B^1$, catalyst Components $M^2$ and $M^1$ and catalysts Component $P^2$ and $P^1$ may be the same, or different. In this disclosure, the term 'second homogeneous catalyst assembly' refers the combination of streams 110*a* through 110*e*, flow controllers and tanks that functions to deliver the second bridged metallocene catalyst formulation to the second reactor, reactor 112*a* in FIG. 6. The optimization of the first and second bridged metallocene catalyst formulation is described below.

Although not shown in FIG. 6, an additional embodiment includes the splitting of stream 105*e* into two streams, such that a portion of steam 105*e* is injected into reactor 111*a* and the remaining portion of stream 105*e* is injected into reactor 112*a*. In other words, the catalyst source for reactor 112*a* is the first homogeneous catalyst assembly.

If reactors 111*a* and 112*a* are operated in a series mode, the second exit stream 112*c* contains the second ethylene interpolymer and the first ethylene interpolymer dissolved in process solvent; as well as unreacted ethylene, unreacted α-olefins (if present), unreacted hydrogen (if present), active catalysts, deactivated catalysts, catalyst components and other impurities (if present). Optionally the second exit stream 112*c* is deactivated by adding a catalyst deactivator A from catalyst deactivator tank 118A forming a deactivated solution A, stream 112*e*; in this case, FIG. 6 defaults to a dual CSTR reactor solution process. If the second exit stream 112*c* is not deactivated the second exit stream enters tubular reactor 117.

If reactors 111*a* and 112*a* are operated in parallel mode, the second exit stream 112*c* contains the second ethylene interpolymer dissolved in process solvent. The second exit stream 112*c* is combined with stream 111*g* forming a third exit stream 112*d*, the latter contains the second ethylene interpolymer and the first ethylene interpolymer dissolved in process solvent. Optionally the third exit stream 112*d* is deactivated by adding catalyst deactivator A from catalyst deactivator tank 118A forming deactivated solution A, stream 112*e*. If the third exit stream 112*d* is not deactivated the third exit stream 112*d* enters tubular reactor 117.

Optionally, one or more of the following reactor feed streams may be injected into tubular reactor 117; process solvent 113, ethylene 114 and α-olefin 115. As shown in FIG. 6, streams 113, 114 and 115 may be combined forming reactor feed stream RF103 and injected into reactor 117. It is not particularly important that stream RF103 be formed; i.e. reactor feed streams can be combined in all possible combinations. Optionally hydrogen may be injected into reactor 117 through stream 116.

Optionally, a bridged metallocene catalyst formulation may be injected into reactor 117 via stream 15*e*'. Catalyst component streams 15*d*', 15*c*', 15*b*' and optional 15*a*' refer to the ionic activator (Component B), the bulky ligand-metal complex (Component A), the alumoxane co-catalyst (Component M) and optional hindered phenol (Component P), respectively. In FIG. 6, a third homogeneous catalyst assembly refers the combination of streams 15*a*' through 15*e*' and the flow controllers and tanks (not shown in FIG. 6) that function to deliver the bridged metallocene catalyst formulation to reactor 117. Although not shown in FIG. 6, optionally, reactor 117 may be supplied with catalyst from the first homogeneous catalyst assembly or the second homogeneous catalyst assembly.

The third ethylene interpolymer may, or may not, form in reactor 117. A third ethylene interpolymer will not form if catalyst deactivator A is added upstream of reactor 117 via catalyst deactivator tank 118A. A third ethylene interpolymer will be formed if catalyst deactivator B is added downstream of reactor 117 via catalyst deactivator tank 118B. The optional third ethylene interpolymer produced in reactor 117 may be formed using a variety of operational modes, as described above; with the proviso that catalyst deactivator A is not added upstream of reactor 117.

In series mode, Reactor 117 produces a third exit stream 117*b* containing the first ethylene interpolymer, the second ethylene interpolymer and optionally a third ethylene interpolymer. As shown in FIG. 6, catalyst deactivator B may be added to the third exit stream 117*b* via catalyst deactivator tank 118B producing a deactivated solution B, stream 119; with the proviso that catalyst deactivator B is not added if catalyst deactivator A was added upstream of reactor 117. As discussed above, if catalyst deactivator A was added, deactivated solution A (stream 112*e*) is equivalent to stream 117*b* that exits tubular reactor 117.

In parallel mode, reactor 117 produces a fourth exit stream 117*b* containing the first ethylene interpolymer, the second ethylene interpolymer and optionally a third ethylene interpolymer (as discussed above, in parallel mode, stream 112*d* is the third exit stream). As shown in FIG. 6, in parallel mode, catalyst deactivator B is added to the fourth exit stream 117*b* via catalyst deactivator tank 118B producing a deactivated solution B, stream 119; with the proviso that catalyst deactivator B is not added if catalyst deactivator A was added upstream of reactor 117.

In FIG. 6, deactivated solution A (stream 112*e*) or B (stream 119) passes through pressure let down device 120 and heat exchanger 121. Optionally a passivator may be added via tank 122 forming a passivated solution 123.

Deactivated solution A, deactivated solution B or passivated solution 123 pass through pressure let down device 124 and enter a first V/L separator 125. Two streams are formed in the first V/L separator: a first bottom stream 127 comprising a solution that is rich in ethylene interpolymers; and a first gaseous overhead stream 126 rich in ethylene, solvent, optional α-olefins and optional hydrogen.

The first bottom stream enters a second V/L separator 128. In the second V/L separator two streams are formed: a second bottom stream 130 comprising a solution that is richer in ethylene interpolymer and leaner in process solvent relative to the first bottom stream 127; and a second gaseous overhead stream 129.

The second bottom stream 130 flows into a third V/L separator 131. In the third V/L separator two streams are formed: a product stream 133 comprising an ethylene interpolymer product, deactivated catalyst residues and less than 5 weight % of residual process solvent; and a third gaseous overhead stream 132. Product stream 133 proceeds to polymer recovery operations.

Other embodiments include the use of one or more V/L separators operating at reduced pressure, i.e. the operating pressure is lower than atmospheric pressure and/or embodiments where heat is added during the devolatilization process, i.e. one or more heat exchangers are employed upstream of, or within, one or more of the V/L separators. Such embodiments facilitate the removal of residual process solvent and comonomer such that the residual volatiles in ethylene interpolymer products are less than 500 ppm.

Product stream 133 proceeds to polymer recovery operations. Non-limiting examples of polymer recovery operations include one or more gear pump, single screw extruder or twin screw extruder that forces the molten ethylene interpolymer product through a pelletizer. Other embodiments include the use of a devolatilizing extruder, where residual process solvent and optional α-olefin may be removed such that the volatiles in the ethylene interpolymer product is less than 500 ppm. Once pelletized the solidified ethylene interpolymer product is typically transported to a product silo.

A highly active bridged metallocene catalyst formulation was produced by optimizing the proportion of each of the four catalyst components: Component A, Component M, Component B and Component P. The term "highly active" means the catalyst formulation is very efficient in converting olefins to polyolefins. In practice the optimization objective is to maximize the following ratio: (pounds of ethylene interpolymer product produced) per (pounds of catalyst consumed). In the case of a single CSTR, the quantity of the bulky ligand-metal complex, Component A, added to reactor R1 was expressed as the parts per million (ppm) of Component A in the total mass of the solution in R1, i.e. "R1 catalyst (ppm)" as recited in Table 8A. The upper limit on the ppm of Component A may be 5, in some cases 3 and is other cases 2. The lower limit on the ppm of Component A may be 0.02, in some cases 0.05 and in other cases 0.1. In the case of two CSTRs, the quantity of Component A added to R1 and R2 was controlled and expressed as the parts per million (ppm) of Component A in R1 and R2, optionally the quantity of Component A added to R3 was controlled and expressed as the parts per million (ppm) of Component A in R3.

The proportion of Catalyst component B, the ionic activator, added to R1 was optimized by controlling the (ionic activator)/(Component A) molar ratio, ([B]/[A]), in the R1 solution. The upper limit on the R1 ([B]/[A]) may be 10, in some cases 5 and in other cases 2. The lower limit on R1 ([B]/[A]) may be 0.3, in some cases 0.5 and in other cases 1.0. The proportion of catalyst Component M was optimized by controlling the (alumoxane)/(Component A) molar ratio, ([M]/[A]), in the R1 solution. The alumoxane co-catalyst was generally added in a molar excess relative to Component A. The upper limit on R1 ([M]/[A]), may be 300, in some cases 200 and is other cases 100. The lower limit on R1 ([M]/[A]), may be 1, in some cases 10 and in other cases 30. The addition of catalyst Component P (the hindered phenol) to R1 is optional. If added, the proportion of Component P was optimized by controlling the (hindered phenol)/(alumoxane), ([P]/[M]), molar ratio in R1. The upper limit on R1 ([P]/[M]) may be 1, in some cases 0.75 and in other cases 0.5. The lower limit on R1 ([P]/[M]) may be 0.0, in some cases 0.1 and in other cases 0.2.

In embodiments employing two CSTR's and two homogeneous catalyst assemblies a second bridged metallocene catalyst formulation may be prepared independently of the first bridged metallocene catalyst formulation and optimized as described above. Optionally, a bridged metallocene catalyst formulation may be employed in the tubular reactor and optimized as described above.

In the continuous solution processes embodiments shown in FIGS. 5 and 6*a* variety of solvents may be used as the process solvent; non-limiting examples include linear, branched or cyclic $C_5$ to $C_{12}$ alkanes. Non-limiting examples of α-olefins include 1-propene, 1-butene, 1-pentene, 1-hexene, 1-octene, 1-nonene and 1-decene. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g. pentane, methyl pentane, hexane, heptane, octane, cyclohexane, methylcyclohexane, hydrogenated naphtha or combinations thereof. Non-limiting examples of aromatic catalyst component solvents include benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

It is well known to individuals experienced in the art that reactor feed streams (solvent, monomer, α-olefin, hydrogen, catalyst formulation, etc.) must be essentially free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene and α-olefins, etc.

Referring to the first reactor shown in FIG. 5, or the first and second reactors shown in FIG. 6, any combination of the feed streams may be heated or cooled: more specifically, streams 1-4 in FIG. 5 and streams 101-104 and 106-109 in FIG. 6. The upper limit on reactor feed stream temperatures may be 90° C.; in other cases 80° C. and in still other cases 70° C. The lower limit on reactor feed stream temperatures may be 20° C.; in other cases 35° C. and in still other cases 50° C.

Any combination of the streams feeding the tubular reactor may be heated or cooled; for example, streams 13 to 16 in FIG. 5 and streams 113 to 116 in FIG. 6. In some cases, tubular reactor feed streams are tempered, i.e. the tubular reactor feed streams are heated to at least above ambient temperature. The upper temperature limit on the tubular reactor feed streams in some cases are 200° C., in other cases 170° C. and in still other cases 140° C.; the lower temperature limit on the tubular reactor feed streams in some cases are 60° C., in other cases 90° C. and in still other cases 120° C.; with the proviso that the temperature of the tubular reactor feed streams are lower than the temperature of the process stream that enters the tubular reactor.

The operating temperature of the solution polymerization reactors, e.g. vessels 111*a* (R1) and 112*a* (R2)) in FIG. 6 can vary over a wide range. For example, the upper limit on reactor temperatures in some cases may be 300° C., in other cases 280° C. and in still other cases 260° C.; and the lower limit in some cases may be 80° C., in other cases 100° C. and in still other cases 125° C. The second reactor, reactor 112*a* (R2), is operated at a higher temperature than the first reactor 111*a* (R1). The maximum temperature difference between these two reactors ($T^{R2}-T^{R1}$) in some cases is 120° C., in other cases 100° C. and in still other cases 80° C.; the minimum ($T^{R2}-T^{R1}$) in some cases is 1° C., in other cases 5° C. and in still other cases 10° C. The optional tubular reactor, reactor 117 (R3), may be operated in some cases 100° C. higher than $R_2$; in other cases 60° C. higher than R2, in still other cases 10° C. higher than R2 and in alternative cases 0° C. higher, i.e. the same temperature as R2. The temperature within optional R3 may increase along its length. The maximum temperature difference between the inlet and outlet of R3 in some cases is 100° C., in other cases 60° C. and in still other cases 40° C. The minimum temperature difference between the inlet and outlet of R3 is in some cases may be 0° C., in other cases 3° C. and in still other cases 10° C. In some cases R3 is operated an adiabatic fashion and in other cases R3 is heated.

The pressure in the polymerization reactors should be high enough to maintain the polymerization solution as a single phase solution and to provide the upstream pressure to force the polymer solution from the reactors through a heat exchanger and on to polymer recovery operations. Referring to the embodiments shown in FIGS. 5 and 6, the operating pressure of the solution polymerization reactors can vary over a wide range. For example, the upper limit on reactor pressure in some cases may be 45 MPag, in other cases 30 MPag and in still other cases 20 MPag; and the lower limit in some cases may be 3 MPag, in other some cases 5 MPag and in still other cases 7 MPag.

Referring to the embodiments shown in FIGS. 5 and 6, prior to entering the first V/L separator, deactivated solution A, deactivated solution B or the passivated solution may have a maximum temperature in some cases of 300° C., in other cases 290° C. and in still other cases 280° C.; the minimum temperature may be in some cases 150° C., in other cases 200° C. and in still other cases 220° C. Immediately prior to entering the first V/L separator, deactivated solution A, deactivated solution B or the passivated solution in some cases may have a maximum pressure of 40 MPag, in other cases 25 MPag and in still cases 15 MPag; the minimum pressure in some cases may be 1.5 MPag, in other cases 5 MPag and in still other cases 6 MPag.

The first V/L separator (vessels 25 and 125 in FIGS. 5 and 6, respectively) may be operated over a relatively broad range of temperatures and pressures. For example, the maximum operating temperature of the first V/L separator in some cases may be 300° C., in other cases 285° C. and in still other cases 270° C.; the minimum operating temperature in some cases may be 100° C., in other cases 140° C. and in still other cases 170° C. The maximum operating pressure of the first V/L separator in some cases may be 20 MPag, in other cases 10 MPag and in still other cases 5 MPag; the minimum operating pressure in some cases may be 1 MPag, in other cases 2 MPag and in still other cases 3 MPag.

The second V/L separator may be operated over a relatively broad range of temperatures and pressures. For example, the maximum operating temperature of the second V/L separator in some cases may be 300° C., in other cases 250° C. and in still other cases 200° C.; the minimum operating temperature in some cases may be 100° C., in other cases 125° C. and in still other cases 150° C. The maximum operating pressure of the second V/L separator in some cases may be 1000 kPag, in other cases 900 kPag and in still other cases 800 kPag; the minimum operating pressure in some cases may be 10 kPag, in other cases 20 kPag and in still other cases 30 kPag.

The third V/L separator (vessels 31 and 131 in FIGS. 5 and 6, respectively) may be operated over a relatively broad range of temperatures and pressures. For example, the maximum operating temperature of the third V/L separator in some cases may be 300° C., in other cases 250° C., and in still other cases 200° C.; the minimum operating temperature in some cases may be 100° C., in other cases 125° C. and in still other cases 150° C. The maximum operating pressure of the third V/L separator in some cases may be 500 kPag, in other cases 150 kPag and in still other cases 100 kPag; the minimum operating pressure in some cases may be 1 kPag, in other cases 10 kPag and in still other cases 25 kPag.

Embodiments of the continuous solution polymerization process shown in FIGS. 5 and 6 show three V/L separators. However, continuous solution polymerization embodiments may include configurations comprising at least one V/L separator.

The ethylene interpolymer product produced in the continuous solution polymerization process may be recovered using conventional devolatilization systems that are well known to persons skilled in the art, non-limiting examples include flash devolatilization systems and devolatilizing extruders.

Any reactor shape or design may be used for reactor 111*a* (R1) and reactor 112*a* (R2) in FIG. 6; non-limiting examples include unstirred or stirred spherical, cylindrical or tank-like vessels, as well as tubular reactors or recirculating loop reactors. At commercial scale the maximum volume of R1 in some cases may be about 20,000 gallons (about 75,710 L), in other cases about 10,000 gallons (about 37,850 L) and in still other cases about 5,000 gallons (about 18,930 L). At commercial scale the minimum volume of R1 in some cases may be about 100 gallons (about 379 L), in other cases about 500 gallons (about 1,893 L) and in still other cases about 1,000 gallons (about 3,785 L). At pilot plant scales reactor volumes are typically much smaller, for example the volume of R1 at pilot scale could be less than about 2 gallons (less than about 7.6 L). In this disclosure the volume of reactor R2 is expressed as a percent of the volume of reactor R1. The upper limit on the volume of R2 in some cases may be about 600% of R1, in other cases about 400% of R1 and in still other cases about 200% of R1. For clarity, if the volume of R1 is 5,000 gallons and R2 is 200% the volume of R1, then R2 has a volume of 10,000 gallons. The lower limit on the volume of R2 in some cases may be about 50% of R1, in other cases about 100% of R1 and in still other cases about 150% of R1. In the case of continuously stirred tank reactors the stirring rate can vary over a wide range; in some cases from about 10 rpm to about 2000 rpm, in other cases from about 100 to about 1500 rpm and in still other cases from about 200 to about 1300 rpm. In this disclosure the volume of R3, the tubular reactor, is expressed as a percent of the volume of reactor R2. The upper limit on the volume of R3 in some cases may be about 500% of R2, in other cases about 300% of R2 and in still other cases about 100% of R2. The lower limit on the volume of R3 in some cases may be about 3% of R2, in other cases about 10% of R2 and in still other cases about 50% of R2.

The "average reactor residence time", a commonly used parameter in the chemical engineering art, is defined by the first moment of the reactor residence time distribution; the reactor residence time distribution is a probability distribution function that describes the amount of time that a fluid element spends inside the reactor. The average reactor residence time can vary widely depending on process flow rates and reactor mixing, design and capacity. The upper limit on the average reactor residence time of the solution in R1 in some cases may be 600 seconds, in other cases 360 seconds and in still other cases 180 seconds. The lower limit on the average reactor residence time of the solution in R1 in some cases may be 10 seconds, in other cases 20 seconds and in still other cases 40 seconds. The upper limit on the average reactor residence time of the solution in R2 in some cases may be 720 seconds, in other cases 480 seconds and in still other cases 240 seconds. The lower limit on the average reactor residence time of the solution in R2 in some cases may be 10 seconds, in other cases 30 seconds and in still other cases 60 seconds. The upper limit on the average reactor residence time of the solution in R3 in some cases may be 600 seconds, in other cases 360 seconds and in still other cases 180 seconds. The lower limit on the average reactor residence time of the solution in R3 in some cases may be 1 second, in other cases 5 seconds and in still other cases 10 seconds.

Optionally, additional reactors (e.g. CSTRs, loops or tubes, etc.) could be added to the continuous solution polymerization process embodiments shown in FIG. 6. In this disclosure, the number of reactors is not particularly important.

In operating the continuous solution polymerization process embodiments shown in FIG. 6 the total amount of ethylene supplied to the process can be portioned or split between the three reactors R1, R2 and R3. This operational variable is referred to as the Ethylene Split (ES), i.e. "$ES^{R1}$", "$ES^{R2}$" and "$ES^{R3}$" refer to the weight percent of ethylene injected in R1, R2 and R3, respectively; with the proviso that $ES^{R1}+ES^{R2}+ES^{R3}=100\%$. This is accomplished by adjusting the ethylene flow rates in the following streams: stream 102 (R1), stream 107 (R2) and stream 114 (R3). The upper limit on $ES^{R1}$ in some cases is about 60%, in other cases about 55% and in still other cases about 50%; the lower limit on $ES^{R1}$ in some cases is about 10%, in other cases about 15% and in still other cases about 20%. The upper limit on $ES^{R2}$ in some cases is about 90%, in other cases about 80% and in still other cases about 70%; the lower limit on $ES^{R2}$ in some cases is about 20%, in other cases about 30% and in still other cases about 40%. The upper limit on $ES^{R3}$ in some cases is about 30%, in other cases about 25% and in still other cases about 20%; the lower limit on $ES^{R3}$ in some cases is 0%, in other cases about 5% and in still other cases about 10%.

In operating the continuous solution polymerization process embodiments shown in FIG. 6 the ethylene concentration in each reactor is also controlled. The ethylene concentration in reactor 1, hereafter $EC^{R1}$, is defined as the weight of ethylene in reactor 1 divided by the total weight of everything added to reactor 1; $EC^{R2}$ and $EC^{R3}$ are defined similarly. Ethylene concentrations in the reactors ($EC^{R1}$ or $EC^{R2}$ or $EC^{R3}$) in some cases may vary from about 7 weight percent (wt. %) to about 25 wt. %, in other cases from about 8 wt. % to about 20 wt. % and in still other cases from about 9 wt. % to about 17 wt. %.

In operating the continuous solution polymerization process embodiments shown in FIG. 6 the total amount of ethylene converted in each reactor is monitored. The term "$Q^{R1}$" refers to the percent of the ethylene added to R1 that is converted into an ethylene interpolymer by the catalyst formulation. Similarly, $Q^{R2}$ and $Q^{R3}$ represent the percent of the ethylene added to R2 and R3 that was converted into ethylene interpolymer, in the respective reactor. Ethylene conversions can vary significantly depending on a variety of process conditions, e.g. catalyst concentration, catalyst formulation, impurities and poisons. The upper limit on both $Q^{R1}$ and $Q^{R2}$ in some cases is about 99%, in other cases about 95% and in still other cases about 90%; the lower limit on both $Q^{R1}$ and $Q^{R2}$ in some cases is about 65%, in other cases about 70% and in still other cases about 75%. The upper limit on $Q^{R3}$ in some cases is about 99%, in other cases about 95% and in still other cases about 90%; the lower limit on $Q^{R3}$ in some cases is 0%, in other cases about 5% and in still other cases about 10%. The term "$Q^T$" represents the total or overall ethylene conversion across the entire continuous solution polymerization plant; i.e. $Q^T$=100×[weight of ethylene in the interpolymer product]/([weight of ethylene in the interpolymer product]+[weight of unreacted ethylene]). The upper limit on $Q^T$ in some cases is about 99%, in other cases about 95% and in still other cases about 90%; the lower limit on $Q^T$ in some cases is about 75%, in other cases about 80% and in still other cases about 85%.

Referring to FIG. 6, optionally, α-olefin may be added to the continuous solution polymerization process. If added, α-olefin may be proportioned or split between R1, R2 and R3. This operational variable is referred to as the Comonomer (α-olefin) Split (CS), i.e. "$CS^{R1}$", "$CS^{R2}$" and "$CS^{R3}$" refer to the weight percent of α-olefin comonomer that is injected in R1, R2 and R3, respectively; with the proviso that $CS^{R1}+CS^{R2}+CS^{R3}$=100%. This is accomplished by adjusting α-olefin flow rates in the following streams: stream 103 (R1), stream 108 (R2) and stream 115 (R3). The upper limit on $CS^{R1}$ in some cases is 100% (i.e. 100% of the α-olefin is injected into R1), in other cases about 95% and in still other cases about 90%. The lower limit on $CS^{R1}$ in some cases is 0% (ethylene homopolymer produced in R1), in other cases about 5% and in still other cases about 10%. The upper limit on $CS^{R2}$ in some cases is about 100% (i.e. 100% of the α-olefin is injected into reactor 2), in other cases about 95% and in still other cases about 90%. The lower limit on $CS^{R2}$ in some cases is 0%, in other cases about 5% and in still other cases about 10%. The upper limit on $CS^{R3}$ in some cases is 100%, in other cases about 95% and in still other cases about 90%. The lower limit on $CS^{R3}$ in some cases is 0%, in other cases about 5% and in still other cases about 10%.

In the continuous polymerization processes described in this disclosure, polymerization is terminated by adding a catalyst deactivator. Embodiments in FIG. 6 show catalyst deactivation occurring either: (a) upstream of the tubular reactor by adding a catalyst deactivator A from catalyst deactivator tank 118A, or; (b) downstream of the tubular reactor by adding a catalyst deactivator B from catalyst deactivator tank 118B. Catalyst deactivator tanks 118A and 118B may contain neat (100%) catalyst deactivator, a solution of catalyst deactivator in a solvent, or a slurry of catalyst deactivator in a solvent. The chemical composition of catalyst deactivator A and B may be the same, or different. Non-limiting examples of suitable solvents include linear or branched $C_5$ to $C_{12}$ alkanes. In this disclosure, how the catalyst deactivator is added is not particularly important. Once added, the catalyst deactivator substantially stops the polymerization reaction by changing active catalyst species to inactive forms. Suitable deactivators are well known in the art, non-limiting examples include: amines (e.g. U.S. Pat. No. 4,803,259 to Zboril et al.); alkali or alkaline earth metal salts of carboxylic acid (e.g. U.S. Pat. No. 4,105,609 to Machan et al.); water (e.g. U.S. Pat. No. 4,731,438 to Bernier et al.); hydrotalcites, alcohols and carboxylic acids (e.g. U.S. Pat. No. 4,379,882 to Miyata); or a combination thereof (U.S. Pat. No. 6,180,730 to Sibtain et al.). In this disclosure the quantify of catalyst deactivator added was determined by the following catalyst deactivator molar ratio: 0.3≤(catalyst deactivator)/((total catalytic metal)+(alkyl aluminum co-catalyst)+(aluminum alkyl)) ≤2.0; where the total catalytic metal is the total moles of catalytic metal added to the solution process. The upper limit on the catalyst deactivator molar ratio may be 2, in some cases 1.5 and in other cases 0.75. The lower limit on the catalyst deactivator molar ratio may be 0.3, in some cases 0.35 and in still other cases 0.4. In general, the catalyst deactivator is added in a minimal amount such that the catalyst is deactivated and the polymerization reaction is quenched.

A passivator or acid scavenger may be added to deactivated solution A or B to form a passivated solution, i.e. passivated solution stream 123 as shown in FIG. 6. Optional passivator tank 122 may contain neat (100%) passivator, a solution of passivator in a solvent, or a slurry of passivator in a solvent. Non-limiting examples of suitable solvents include linear or branched $C_5$ to $C_{12}$ alkanes. In this disclosure, how the passivator is added is not particularly important. Suitable passivators are well known in the art, non-limiting examples include alkali or alkaline earth metal salts of carboxylic acids or hydrotalcites. The quantity of passivator added can vary over a wide range.

In this disclosure, an unbridged single site catalyst formulation was employed in the comparative solution process and comparative ethylene interpolymer products were produced. A highly active unbridged single site catalyst formulation was produced by optimizing the proportion of each of the four catalyst components: Component C, Component $M^C$ (where the superscript '$^C$' denotes the unbridged single site catalyst formulation), Component $B^C$ and Component $P^C$.

In the case of one CSTR, the quantity of the bulky ligand metal complex, Component C, added to the first reactor (R1) was expressed as the parts per million (ppm) of Component C in the total mass of the solution in R1, i.e. "R1 catalyst (ppm)". In the case of two CSTRs, the quantity of Component C added to R1 and R2 was controlled and expressed as the parts per million (ppm) of Component C in R1 and R2; optionally the quantity of Component C added to R3 was controlled and expressed as the parts per million (ppm) of Component C in R3. The upper limit on the ppm of Component C in any reactor may be 5, in some cases 3 and is other cases 2. The lower limit on the ppm of Component C in any reactor may be 0.02, in some cases 0.05 and in other cases 0.1.

The proportion of catalyst Component $B^C$ was optimized by controlling the (ionic activator)/(bulky ligand-metal complex) molar ratio, ($[B^C]/[C]$), in a reactor. The upper limit on reactor ($[B^C]/[C]$) may be 10, in some cases 5 and in other cases 2. The lower limit on reactor ($[B^C]/[C]$) may be 0.3, in some cases 0.5 and in other cases 1.0. The proportion of catalyst Component $M^C$ was optimized by controlling the (alumoxane)/(bulky ligand-metal complex) molar ratio, ($[M^C]/[C]$), in a reactor. The alumoxane co-catalyst was generally added in a molar excess relative to the bulky ligand-metal complex. The upper limit on reactor ($[M^C]/[C]$) molar ratio may be 1000, in some cases 500 and is other cases 200. The lower limit on reactor ($[M^C]/[C]$) molar ratio may be 1, in some cases 10 and in other cases 30. The addition of catalyst Component $P^C$ is optional. If added, the proportion of Component $P^C$ was optimized by controlling the (hindered phenol)/(alumoxane) molar ratio, ($[P^C]/[M^C]$), in any reactor. The upper limit on reactor ($[P^C]/[M^C]$) molar ratio may be 1.0, in some cases 0.75 and in other cases 0.5. The lower limit on reactor ($[P^C]/[M^C]$) molar ratio may be 0.0, in some cases 0.1 and in other cases 0.2.

Interpolymers

The first ethylene interpolymer was synthesized using a bridged metallocene catalyst formulation. Referring to the embodiment shown in FIG. 6, if the optional α-olefin is not added to reactor 11*a* (R1), then the first ethylene interpolymer is an ethylene homopolymer. If an α-olefin is added, the following weight ratio is one parameter to control the density of the first ethylene interpolymer: $((\alpha\text{-olefin})/(\text{ethylene}))^{R1}$. The upper limit on $((\alpha\text{-olefin})/(\text{ethylene}))^{R1}$ may be about 3; in other cases about 2 and in still other cases about 1. The lower limit on $((\alpha\text{-olefin})/(\text{ethylene}))^{R1}$ may be 0; in other cases about 0.25 and in still other cases about 0.5. Hereafter, the symbol "$\sigma^1$" refers to the density of the first ethylene interpolymer produced in R1, i.e. reactor 11*a* in FIG. 5 or reactor 111*a* in FIG. 6. The upper limit on $\sigma^1$ may be 0.975 g/cc; in some cases 0.965 g/cc and; in other cases 0.955 g/cc. The lower limit on $\sigma^1$ may be 0.855 g/cc, in some cases 0.865 g/cc; and in other cases 0.875 g/cc. Density decreases as the content of one or more α-olefins in the first ethylene interpolymer increases.

The α-olefin content in the first ethylene interpolymer may be expressed as a mole percent (mol. %) of α-olefin. The first ethylene interpolymer may have an α-olefin content from 0.01 mol. % to 1.0 mol. %, as measured by FTIR. In some embodiments, the first ethylene interpolymer may have an α-olefin content from 0.2 mol. % to 0.8 mol. %, as measured by FTIR. For example, the first ethylene interpolymer may have an α-olefin content from 0.4 mol. % to 0.6 mol. %, as measured by FTIR. The first ethylene interpolymer may have an α-olefin content from 0.01 mol. % to 1.0 mol. %, as measured by $^{13}C$ NMR. In some embodiments, the first ethylene interpolymer may have an α-olefin content from 0.2 mol. % to 0.8 mol. %, as measured by $^{13}C$ NMR. For example, the first ethylene interpolymer may have an α-olefin content from 0.4 mol. % to 0.6 mol. %, as measured by $^{13}C$ NMR.

The α-olefin content in the first ethylene interpolymer may also be expressed as a weight percent (wt. %) of α-olefin. The first ethylene interpolymer may have an α-olefin content from 1.0 wt. % to 5.0 wt. %, as measured by FTIR. In some embodiments, the first ethylene interpolymer may have an α-olefin content from 1.6 wt. % to 2.6 wt. %, as measured by FTIR. For example, the first ethylene interpolymer may have an α-olefin content from 1.9 wt. % to 2.3 wt. %, as measured by FTIR. The first ethylene interpolymer may have an α-olefin content from 1.0 wt. % to 5.0 wt. %, as measured by $^{13}C$ NMR. In some embodiments, the first ethylene interpolymer may have an α-olefin content from 1.6 wt. % to 2.6 wt. %, as measured by $^{13}C$ NMR. For example, the first ethylene interpolymer may have an α-olefin content from 1.9 wt. % to 2.3 wt. %, as measured by $^{13}C$ NMR.

The upper limit on the mole percent of α-olefin(s) in the first ethylene interpolymer may be 25%; in some cases 23% and in other cases 20%. The lower limit on the mole percent of α-olefin in the first ethylene interpolymer was 0%, i.e. no α-olefin was added to the solution polymerization process and the first ethylene interpolymer was an ethylene homopolymer.

Methods to determine the $CDBI_{50}$ (Composition Distribution Branching Index) of an ethylene interpolymer are well known to those skilled in the art. The $CDBI_{50}$, expressed as a percent, was defined as the percent of the ethylene interpolymer whose comonomer (α-olefin) composition is within 50% of the median comonomer composition. The upper limit on the $CDBI_{50}$ of the first ethylene interpolymer may be 98%, in other cases 95% and in still other cases 90%. The lower limit on the $CDBI_{50}$ of the first ethylene interpolymer may be 70%, in other cases 75% and in still other cases 80%.

The upper limit on the $M_w/M_n$ of the first ethylene interpolymer may be 2.4, in other cases 2.3 and in still other cases 2.2. The lower limit on the $M_w/M_n$ the first ethylene interpolymer may be 1.7, in other cases 1.8 and in still other cases 1.9.

The first ethylene interpolymer contains long chain branching as characterized by the Melt Flow-Intrinsic Viscosity Index value, MFIVI, as fully described above (Eq.1). The upper limit on the MFIVI of the first ethylene interpolymer may be 0.80, in other cases 0.70 and in still other cases 0.60 (dimensionless). The lower limit on the MFIVI of the first ethylene interpolymer is ≥0.05.

The first ethylene interpolymer has an Unsaturation Ratio, UR, defined by Eq.(UR) discussed above. The upper limit on the UR of the first ethylene interpolymer may be ≤0.60, in other cases ≤0.55 and in still other cases ≤0.50 (dimensionless). The lower limit on the UR of the first ethylene interpolymer may be >0.06, in other cases ≥0.062 and in still other cases ≥0.065.

The first ethylene interpolymer contains a catalytic metal that reflects the chemical composition of the bridged metallocene catalyst formulation injected into the first reactor. This catalytic metal originates from the metal in Component A (Formula (I)); in this disclosure this metal was called "metal $A^{R1}$". Catalytic metal $A^{R1}$ was a Group 4 metal, i.e. titanium, zirconium or hafnium. The upper limit on the ppm of metal $A^{R1}$ in the first ethylene interpolymer may be 5.0 ppm, in other cases 4.0 ppm and in still other cases 3.0 ppm. The lower limit on the ppm of metal $A^{R1}$ in the first ethylene interpolymer may be 0.03 ppm, in other cases 0.09 ppm and in still other cases 0.15 ppm.

The amount of hydrogen added to R1 can vary over a wide range allowing the continuous solution process to produce first ethylene interpolymers that differ in melt index, hereafter $I_2^1$ (melt index is measured at 190° C. using a 2.16 kg load following the procedures outlined in ASTM D1238). This is accomplished by adjusting the hydrogen flow rate in stream 4 (FIG. 5) or stream 104 (FIG. 6). The quantity of hydrogen added to the reactor is expressed as the parts-per-million (ppm) of hydrogen in R1 relative to the total mass in reactor R1; hereinafter $H_2^{R1}$ (ppm). In some cases $H_2^{R1}$ (ppm) ranges from 100 ppm to 0 ppm, in other cases from 50 ppm to 0 ppm, in alternative cases from 20 to 0 and in still other cases from 2 ppm to 0 ppm. The upper limit on $I_2^1$ may be 200 dg/min, in some cases 100 dg/min; in other cases 50 dg/min; and in still other cases 1 dg/min. The lower limit on $I_2^1$ may be 0.01 dg/min, in some cases 0.05 dg/min; in other cases 0.1 dg/min; and in still other cases 0.5 dg/min.

The upper limit on the weight percent (wt. %) of the first ethylene interpolymer in the ethylene interpolymer product may be 95% wt. %, in some cases 85 wt. %, in other cases 75 wt. % and in still other cases 65 wt. %. The lower limit on the wt % of the first ethylene interpolymer in the ethylene interpolymer product may be 5 wt. %; in other cases 8 wt. % and in still other cases 10 wt. %.

Turning to FIG. 6, a second ethylene interpolymer was synthesized by injecting a bridged metallocene catalyst formulation into the second solution polymerization reactor 112*a* (or R2). If optional α-olefin is not added to reactor 112*a* (R2) either through fresh α-olefin stream 108 or carried over from reactor 111*a* (R1) in stream 111*e* (series mode), then the second ethylene interpolymer was an ethylene homopolymer. If α-olefin was present in R2, the following weight ratio was one parameter to control the density of the second ethylene interpolymer: $((\alpha\text{-olefin})/(\text{ethylene}))^{R2}$. The upper limit on $((\alpha\text{-olefin})/(\text{ethylene}))^{R2}$ may be 3; in other cases 2 and in still other cases 1. The lower limit on $((\alpha\text{-olefin})/(\text{ethylene}))^{R2}$ may be 0; in other cases 0.25 and in still other cases 0.5. Hereafter, the symbol "$\sigma^2$" refers to the density of the second ethylene interpolymer. The upper limit on 62 may be 0.975 g/cc; in some cases 0.965 g/cc and; in other cases 0.955 g/cc. The lower limit on $\sigma^2$ may be 0.855 g/cc, in some cases 0.865 g/cc; and in other cases 0.875 g/cc.

The α-olefin content in the second ethylene interpolymer may be expressed as a mole percent (mol. %) of α-olefin. The second ethylene interpolymer may have an α-olefin content from 0.01 mol. % to 1.0 mol. %, as measured by FTIR. In some embodiments, the second ethylene interpolymer may have an α-olefin content from 0.2 mol. % to 0.8 mol. %, as measured by FTIR. For example, the second ethylene interpolymer may have an α-olefin content from 0.4 mol. % to 0.6 mol. %, as measured by FTIR. The second ethylene interpolymer may have an α-olefin content from 0.01 mol. % to 1.0 mol. %, as measured by $^{13}$C NMR. In some embodiments, the second ethylene interpolymer may have an α-olefin content from 0.2 mol. % to 0.8 mol. %, as measured by $^{13}$C NMR. For example, the second ethylene interpolymer may have an α-olefin content from 0.4 mol. % to 0.6 mol. %, as measured by $^{13}$C NMR.

The α-olefin content in the second ethylene interpolymer may also be expressed as a weight percent (wt. %) of α-olefin. The second ethylene interpolymer may have an α-olefin content from 1.0 wt. % to 5.0 wt. %, as measured by FTIR. In some embodiments, the second ethylene interpolymer may have an α-olefin content from 1.6 wt. % to 2.6 wt. %, as measured by FTIR. For example, the second ethylene interpolymer may have an α-olefin content from 1.9 wt. % to 2.3 wt. %, as measured by FTIR. The second ethylene interpolymer may have an α-olefin content from 1.0 wt. % to 5.0 wt. %, as measured by $^{13}$C NMR. In some embodiments, the second ethylene interpolymer may have an α-olefin content from 1.6 wt. % to 2.6 wt. %, as measured by $^{13}$C NMR. For example, the second ethylene interpolymer may have an α-olefin content from 1.9 wt. % to 2.3 wt. %, as measured by $^{13}$C NMR.

The upper limit on the mole percent of one or more α-olefins in the second ethylene interpolymer may be 25%; in some cases 23% and in other cases 20%. The lower limit on the mole percent of α-olefin in the second ethylene interpolymer was 0%, i.e. no α-olefin was added to the solution polymerization process and the second ethylene interpolymer was an ethylene homopolymer.

The upper limit on the $CDBI_{50}$ of the second ethylene interpolymer may be 98%, in other cases 95% and in still other cases 90%. The lower limit on the $CDBI_{50}$ of the second ethylene interpolymer may be 70%, in other cases 75% and in still other cases 80%.

The upper limit on the $M_w/M_n$ of the second ethylene interpolymer may be 2.4, in other cases 2.3 and in still other cases 2.2. The lower limit on the $M_w/M_n$ the second ethylene interpolymer may be 1.7, in other cases 1.8 and in still other cases 1.9.

The second ethylene interpolymer contains long chain branching as characterized by the Melt Flow-Intrinsic Viscosity Index value, MFIVI, as fully described above (Eq.1). The upper limit on the MFIVI of the second ethylene interpolymer may be 0.80, in other cases 0.70 and in still other cases 0.60 (dimensionless). The lower limit on the MFIVI of the second ethylene interpolymer is ≥0.05.

The second ethylene interpolymer has an Unsaturation Ratio, UR, defined by Eq.(UR) discussed above. The upper limit on the UR of the second ethylene interpolymer may be ≤0.60, in other cases ≤0.55 and in still other cases ≤0.50 (dimensionless). The lower limit on the UR of the second ethylene interpolymer may be >0.06, in other cases ≥0.062 and in still other cases ≥0.065.

The second ethylene interpolymer contains a catalytic metal that reflects the chemical composition of the bridged metallocene catalyst formulation injected into the second reactor. The catalytic metal in the second ethylene interpolymer, hereinafter metal $A^{R2}$, originates from the metal in Component A (Formula (I)). Catalytic metal $A^{R2}$ was a Group 4 metal, i.e. titanium, zirconium or hafnium. The upper limit on the ppm of metal $A^{R2}$ in the second ethylene interpolymer may be 5.0 ppm, in other cases 4.0 ppm and in still other cases 3.0 ppm. The lower limit on the ppm of metal $A^{R2}$ in the first second interpolymer may be 0.03 ppm, in other cases 0.09 ppm and in still other cases 0.15 ppm. The catalytic metal $A^{R2}$ used to synthesize the second ethylene interpolymer may be the same, or different, relative to the catalytic metal $A^{R1}$ used to synthesize the first ethylene interpolymer.

Referring to the embodiments shown in FIG. 6, the amount of hydrogen added to R2, vessel 112*a*, can vary over a wide range which allows the continuous solution polymerization process to produce second ethylene interpolymers that differ in melt index, hereinafter $I_2^2$. This is accomplished by adjusting the hydrogen flow rate in stream 109. The quantity of hydrogen added was expressed as the parts-per-million (ppm) of hydrogen in R2 relative to the total mass in reactor R2; hereinafter $H_2^{R2}$ (ppm). In some cases $H_2^{R2}$ (ppm) ranges from 100 ppm to 0 ppm, in some cases from 50 ppm to 0 ppm, in other cases from 20 to 0 and in still other cases from 2 ppm to 0 ppm. The upper limit on $I_2^2$ may be 1000 dg/min; in some cases 750 dg/min; in other cases 500 dg/min, and; in still other cases 200 dg/min. The lower limit on $I_2^2$ may be 0.3 dg/min, in some cases 0.4 dg/min, in other cases 0.5 dg/min; and in still other cases 0.6 dg/min.

The upper limit on the weight percent (wt. %) of the second ethylene interpolymer in the ethylene interpolymer product may be 95 wt. %, in other cases 92 wt. % and in still other cases 90 wt. %. The lower limit on the wt. % of the second ethylene interpolymer in the ethylene interpolymer product may be 0 wt. %, in some cases 20 wt. %, in other cases 30 wt. % and in still other cases 40 wt. %.

Referring to FIG. 5, a third ethylene interpolymer was produced in reactor 17. Referring to FIG. 6, a third ethylene interpolymer was produced in reactor 117 if catalyst deactivator was not added upstream of reactor 117. If α-olefin was not added to reactor 17 or reactor 117, the third ethylene interpolymer was an ethylene homopolymer. If α-olefin was present in R3, the following weight ratio was one parameter that determined the density of the third ethylene interpolymer: $((\alpha\text{-olefin})/(\text{ethylene}))^{R3}$. The upper limit on $((\alpha\text{-olefin})/(\text{ethylene}))^{R3}$ may be 3; in other cases 2 and in still other cases 1. The lower limit on $((\alpha\text{-olefin})/(\text{ethylene}))^{R3}$ may be 0; in other cases 0.25 and in still other cases 0.5. Hereinafter, the symbol "$\sigma^3$" refers to the density of the third ethylene interpolymer. The upper limit on $\sigma^3$ may be 0.975 g/cc; in some cases 0.965 g/cc and; in other cases 0.955 g/cc. The lower limit on $\sigma^3$ may be 0.855 g/cc, in some cases 0.865 g/cc; and in other cases 0.875 g/cc.

The α-olefin content in the third ethylene interpolymer may be expressed as a mole percent (mol. %) of α-olefin. The third ethylene interpolymer may have an α-olefin content from 0.01 mol. % to 1.0 mol. %, as measured by FTIR. In some embodiments, the third ethylene interpolymer may have an α-olefin content from 0.2 mol. % to 0.8 mol. %, as measured by FTIR. For example, the third ethylene interpolymer may have an α-olefin content from 0.4 mol. % to 0.6 mol. %, as measured by FTIR. The third ethylene interpolymer may have an α-olefin content from 0.01 mol. % to 1.0 mol. %, as measured by $^{13}C$ NMR. In some embodiments, the third ethylene interpolymer may have an α-olefin content from 0.2 mol. % to 0.8 mol. %, as measured by $^{13}C$ NMR. For example, the third ethylene interpolymer may have an α-olefin content from 0.4 mol. % to 0.6 mol. %, as measured by $^{13}C$ NMR.

The α-olefin content in the third ethylene interpolymer may also be expressed as a weight percent (wt. %) of α-olefin. The third ethylene interpolymer may have an α-olefin content from 1.0 wt. % to 5.0 wt. %, as measured by FTIR. In some embodiments, the third ethylene interpolymer may have an α-olefin content from 1.6 wt. % to 2.6 wt. %, as measured by FTIR. For example, the third ethylene interpolymer may have an α-olefin content from 1.9 wt. % to 2.3 wt. %, as measured by FTIR. The third ethylene interpolymer may have an α-olefin content from 1.0 wt. % to 5.0 wt. %, as measured by $^{13}C$ NMR. In some embodiments, the third ethylene interpolymer may have an α-olefin content from 1.6 wt. % to 2.6 wt. %, as measured by $^{13}C$ NMR. For example, the third ethylene interpolymer may have an α-olefin content from 1.9 wt. % to 2.3 wt. %, as measured by $^{13}C$ NMR.

The upper limit on the mole percent of one or more α-olefins in the third ethylene interpolymer may be 25%; in some cases 23% and in other cases 20%. The lower limit on the mole percent of α-olefin in the third ethylene interpolymer was 0%, i.e. no α-olefin was added to the solution polymerization process and the third ethylene interpolymer was an ethylene homopolymer.

The upper limit on the $CDBI_{50}$ of the third ethylene interpolymer may be 98%, in other cases 95% and in still other cases 90%. The lower limit on the $CDBI_{50}$ of the third ethylene interpolymer may be 70%, in other cases 75% and in still other cases 80%.

The upper limit on the $M_w/M_n$ of the third ethylene interpolymer may be 2.4, in other cases 2.3 and in still other cases 2.2. The lower limit on the $M_w/M_n$ the third ethylene interpolymer may be 1.7, in other cases 1.8 and in still other cases 1.9.

The third ethylene interpolymer contains long chain branching as characterized by the Melt Flow-Intrinsic Viscosity Index value, MFIVI (Eq.1), ranging from ≥0.05 to ≤0.80; the upper limit on the MFIVI of the third ethylene interpolymer may be 0.80, in other cases 0.7 and in still other cases 0.6, and the lower limit on the MFIVI of the third ethylene interpolymer is ≥0.05.

The third ethylene interpolymer was characterized by an Unsaturation Ratio, UR; where the upper limit on UR was ≤0.60, in other cases ≤0.55 and in still other cases ≤0.50 (dimensionless) and the lower limit on UR was >0.06, in other cases ≥0.062 and in still other cases ≥0.065.

The third ethylene interpolymer contains a catalytic metal that reflects the chemical composition of the bridged metallocene catalyst formulation injected into the third reactor. The catalytic metal in the third ethylene interpolymer, hereinafter metal $A^{R3}$, originates from the metal in Component A (Formula (I)). Catalytic metal $A^{R3}$ was a Group 4 metal, i.e. titanium, zirconium or hafnium. The upper limit on the ppm of metal $A^{R3}$ in the third ethylene interpolymer may be 5.0 ppm, in other cases 4.0 ppm and in still other cases 3.0 ppm. The lower limit on the ppm of metal $A^{R3}$ in the third interpolymer may be 0.03 ppm, in other cases 0.09 ppm and in still other cases 0.15 ppm. The catalytic metal $A^{R3}$ used to synthesize the third ethylene interpolymer may be the same, or different, relative to the catalytic metals used to synthesize the first and the second ethylene interpolymers. A third ethylene interpolymer may also be produced by carry over catalyst, i.e. active R1 catalyst, active R2 catalyst, or active R1 and R2 catalyst that enters R3. A third ethylene interpolymer is produced if a catalyst deactivator is not added upstream of reactor R3.

Referring to the embodiments shown in FIG. 5 and FIG. 6, optional hydrogen may be injected into the tubular reactor 17 or 117, respectively, through stream 16 or stream 116, respectively. The amount of hydrogen added to R3 may vary over a wide range. Adjusting the amount of hydrogen in R3, hereinafter $H_2^{R3}$ (ppm), allows the continuous solution process to produce third ethylene interpolymers that differ widely in melt index, hereinafter $I_2^3$. The amount of optional hydrogen added to R3 ranges from 100 ppm to 0 ppm, in some cases from 50 ppm to 0 ppm, in other cases from 20 to 0 and in still other cases from 2 ppm to 0 ppm. The upper limit on $I_2^3$ may be 2,000 dg/min; in some cases 1,500 dg/min; in other cases 1,000 dg/min, and; in still other cases 500 dg/min. The lower limit on $I_2^3$ may be 0.4 dg/min, in some cases 0.6 dg/min, in other cases 0.8 dg/min; and in still other cases 1.0 dg/min.

The upper limit on the weight percent (wt. %) of the third ethylene interpolymer in the ethylene interpolymer product may be 30 wt. %, in other cases 25 wt. % and in still other cases 20 wt. %. The lower limit on the wt. % of the third ethylene interpolymer in the ethylene interpolymer product may be 0 wt. %; in other cases 5 wt. % and in still other cases 10 wt. %.

Turning to the ethylene interpolymer products of this disclosure. Embodiments of the ethylene interpolymer products disclosed herein may comprise: (i) a first and a second ethylene interpolymer; (ii) a first and a third ethylene interpolymer; or (iii) a first, a second and a third ethylene interpolymer.

The upper limit on the density of the ethylene interpolymer product ($\rho^f$) may be 0.975 g/cc; in some cases 0.965 g/cc and; in other cases 0.955 g/cc. The lower limit on the density of the ethylene interpolymer product may be 0.855 g/cc, in some cases 0.865 g/cc; and in other cases 0.875 g/cc.

The α-olefin content in the ethylene interpolymer product may be expressed as a mole percent (mol. %) of α-olefin. The ethylene interpolymer product may have an α-olefin content from 0.01 mol. % to 1.0 mol. %, as measured by FTIR. In some embodiments, the ethylene interpolymer product may have an α-olefin content from 0.2 mol. % to 0.8 mol. %, as measured by FTIR. For example, the ethylene interpolymer product may have an α-olefin content from 0.4 mol. % to 0.6 mol. %, as measured by FTIR. The ethylene interpolymer product may have an α-olefin content from 0.01 mol. % to 1.0 mol. %, as measured by $^{13}C$ NMR. In some embodiments, the ethylene interpolymer product may have an α-olefin content from 0.2 mol. % to 0.8 mol. %, as measured by $^{13}C$ NMR. For example, the ethylene interpolymer product may have an α-olefin content from 0.4 mol. % to 0.6 mol. %, as measured by $^{13}C$ NMR.

The α-olefin content in the ethylene interpolymer product may also be expressed as a weight percent (wt. %) of α-olefin. The ethylene interpolymer product may have an α-olefin content from 1.0 wt. % to 5.0 wt. %, as measured by FTIR. In some embodiments, the ethylene interpolymer product may have an α-olefin content from 1.6 wt. % to 2.6 wt. %, as measured by FTIR. For example, the ethylene interpolymer product may have an α-olefin content from 1.9 wt. % to 2.3 wt. %, as measured by FTIR. The ethylene interpolymer product may have an α-olefin content from 1.0 wt. % to 5.0 wt. %, as measured by $^{13}C$ NMR. In some embodiments, the ethylene interpolymer product may have an α-olefin content from 1.6 wt. % to 2.6 wt. %, as measured by $^{13}C$ NMR. For example, the ethylene interpolymer product may have an α-olefin content from 1.9 wt. % to 2.3 wt. %, as measured by $^{13}C$ NMR.

The upper limit on the mole percent of one or more α-olefins in the ethylene interpolymer product may be 25%; in some cases 23% and in other cases 20%.

The lower limit on the mole percent of α-olefin in the ethylene interpolymer product was 0%, i.e. no α-olefin was added to the solution polymerization process and the ethylene interpolymer product was an ethylene homopolymer.

The upper limit on the $CDBI_{50}$ of the ethylene interpolymer product may be 98%, in other cases 90% and in still other cases 85%. An ethylene interpolymer product with a $CDBI_{50}$ of 97% may result if an α-olefin is not added to the continuous solution polymerization process; in this case, the ethylene interpolymer product is an ethylene homopolymer. The lower limit on the $CDBI_{50}$ of an ethylene interpolymer product may be 1%, in other cases 2% and in still other cases 3%; in these cases the two or three ethylene interpolymers differ significantly in comonomer content (or density).

The upper and lower limits on the $M_w/M_n$ of the ethylene interpolymer product depends on the process conditions used. The upper limit on the $M_w/M_n$ of the ethylene interpolymer product may be 25, in other cases 20 and in still other cases 15; while the lower limit on the $M_w/M_n$ of the ethylene interpolymer product may be 1.8, in other cases 1.9 and in still other cases 2.0. High $M_w/M_n$ result if the two or three ethylene interpolymer differ significantly in weight average molecular weight (or melt index).

The ethylene interpolymer products of this disclosure contain long chain branching as characterized by the Melt Flow-Intrinsic Viscosity Index, MFIVI (Eq.1), as fully described above. The upper limit on the MFIVI of the ethylene interpolymer product may be ≤0.80, in other cases ≤0.70 and in still other cases ≤0.60 (dimensionless). The lower limit on the MFIVI of the ethylene interpolymer product is ≥0.05 (dimensionless).

The ethylene interpolymer product is further characterized by a first derivative of the melt flow distribution function $$\frac{d\text{Log}(1/I_n)}{d\text{Log(loading)}}$$

at a loading of 4000 g having values from ≥−1.85 to ≤−1.51. The calculation of the melt flow distribution function and $$\frac{d\text{Log}(1/I_n)}{d\text{Log(loading)}}$$

at a loading of 4000 g is fully described above and values are disclosed in Table 2. The lower limit on $$\frac{d\text{Log}(1/I_n)}{d\text{Log(loading)}}$$

at a loading of 4000 g value of the ethylene interpolymer product may be ≥−1.85, in other cases ≥−1.80 and in still other cases ≥−1.75. The upper limit on $$\frac{d\text{Log}(1/I_n)}{d\text{Log(loading)}}$$

at a loading of 4000 g value of the ethylene interpolymer product may be ≤−1.510, in other cases ≤−1.515 and in still other cases ≤−1.520.

The ethylene interpolymer product of this disclosure was characterized by an Unsaturation Ratio, UR; where the upper limit on UR was ≤0.60, in other cases ≤0.55 and in still other cases ≤0.50 (dimensionless) and the lower limit on the UR of the ethylene interpolymer product was >0.06, in other cases ≥0.062 and in still other cases ≥0.065.

Table 4 discloses the 'residual catalytic metal' in ethylene interpolymer product Examples 21, 23 and 26; specifically, 1.57, 1.32 and 1.49 ppm hafnium, respectively (the acronym n.d. refers to not detected, e.g. titanium was not detected). Residual catalytic metal was determined by Neutron Activation Analysis (NAA). In Example 21, 23 and 26 the same bridged metallocene catalyst formulation was injected into reactors 111*a* and 112*a* (FIG. 6), no catalyst was injected in reactor 117. Comparatives Q1-Q4 were manufactured using a Hf-based catalyst formulation and contained from 0.24-0.34 ppm Hf and undetectable Ti. Comparative 2 and Comparative 3 were manufactured using a Hf-based and a Ti-based catalyst formulation. The remaining comparatives in Table 4 were produced with various Ti-based catalyst formulations, i.e. Comparatives R, S, U, V, 1, 4 and 5 where the Ti content ranged from 0.14 to 7.14 ppm Ti. Comparative Example 1 and Comparative Example 2 contained 1.76 and 1.98 ppm Hf, respectively.

Embodiments of the ethylene interpolymer products disclosed herein may comprise: (i) a first and second ethylene interpolymer; (ii) a first and third ethylene interpolymer; or (iii) a first, second and third ethylene interpolymer; wherein, the first, second and third ethylene interpolymers are synthesized using one or more bridged metallocene catalyst formulations comprising a species of component A (defined by Formula (I)); with the proviso that at least one of the component A species employed contains hafnium. As defined above, the M group in component A (Formula (I)), is a Group 4 metal; thus, embodiments of the ethylene interpolymer products disclosed herein may contain titanium and/or zirconium. The upper limit on the residual catalytic metal in the ethylene interpolymer product may be 5.0 ppm, in other cases 4.0 ppm and in still other cases 3.0 ppm of hafnium; and the lower limit on the residual catalytic metal in the ethylene interpolymer product may be 0.03 ppm, in other cases 0.09 ppm and in still other cases 0.15 ppm of hafnium.

Embodiments of ethylene interpolymer products may comprise a first and a second ethylene interpolymer, wherein different species of Component A having different Group 4 metals are employed, i.e. $A^{R1}$ and $A^{R2}$. In these embodiments: the upper limit on the ppm of metal $A^{R1}$ in the ethylene interpolymer product may be 4.8 ppm, in other cases 4.0 ppm and in still other cases 3.0 ppm of a Group 4 metal; while the lower limit on the ppm of metal $A^{R1}$ in the ethylene interpolymer product may be 0.0015 ppm, in other cases 0.005 ppm and in still other cases 0.01 ppm of a Group 4 metal; and the upper limit on the ppm of metal $A^{R2}$ in the ethylene interpolymer product may be 4.8 ppm, in other cases 4.0 ppm and in still other cases 3.0 ppm of Group 4 metal; while the lower limit on the ppm of metal $A^{R2}$ in the ethylene interpolymer product may be 0.0015 ppm, in other cases 0.005 ppm and in still other cases 0.01 ppm of Group 4 metal. In these embodiments, the ethylene interpolymer product does not contain metal $A^{R3}$.

Embodiments of ethylene interpolymer products may comprise a first and a third ethylene interpolymer, wherein different species of Component A having different Group 4 metals are employed, i.e. $A^{R1}$ and $A^{R3}$. In these embodiments: the upper limit on the ppm of metal $A^{R1}$ in the ethylene interpolymer product may be 4.8 ppm, in other cases 4.0 ppm and in still other cases 3.0 ppm of a Group 4 metal; while the lower limit on the ppm of metal $A^{R1}$ in the ethylene interpolymer product may be 0.02 ppm, in other cases 0.03 ppm and in still other cases 0.04 ppm of a Group 4 metal; and the upper limit on the ppm of metal $A^{R3}$ in the ethylene interpolymer product may be 1.5 ppm, in other cases 1.0 ppm and in still other cases 0.5 ppm of Group 4 metal; while the lower limit on the ppm of metal $A^{R3}$ in the ethylene interpolymer product may be 0.0015 ppm, in other cases 0.005 ppm and in still other cases 0.01 ppm of Group 4 metal. In these embodiments, the ethylene interpolymer product does not contain metal $A^{R2}$.

Embodiments of ethylene interpolymer products may comprise a first, a second and third ethylene interpolymer, wherein different species of Component A having different Group 4 metals are employed, i.e. $A^{R1}$, $A^{R2}$ and $A^{R3}$. In these embodiments: the upper limit on the ppm of metal $A^{R1}$ in the ethylene interpolymer product may be 4.5 ppm, in other cases 4.0 ppm and in still other cases 3.5 ppm of a Group 4 metal; while the lower limit on the ppm of metal $A^{R1}$ in the ethylene interpolymer product may be 0.0015 ppm, in other cases 0.005 ppm and in still other cases 0.01 ppm of a Group 4 metal; the upper limit on the ppm of metal $A^{R2}$ in the ethylene interpolymer product may be 4.5 ppm, in other cases 4.0 ppm and in still other cases 3.5 ppm of Group 4 metal; while the lower limit on the ppm of metal $A^{R2}$ in the ethylene interpolymer product may be 0.0015 ppm, in other cases 0.005 ppm and in still other cases 0.01 ppm of Group 4 metal; and the upper limit on the ppm of metal $A^{R3}$ in the ethylene interpolymer product may be 1.5 ppm, in other cases 1.0 ppm and in still other cases 0.5 ppm of Group 4 metal; while the lower limit on the ppm of metal $A^{R3}$ in the ethylene interpolymer product may be 0.0015 ppm, in other cases 0.005 ppm and in still other cases 0.01 ppm of Group 4 metal.

In this disclosure the term 'total catalytic metal', in the ethylene interpolymer product, was also employed; wherein total catalytic metal is defined as ($A^{R1}$+$A^{R2}$) or ($A^{R1}$+$A^{R3}$) or ($A^{R1}$+$A^{R2}$+$A^{R3}$); wherein $A^{R1}$ and $A^{R2}$ and $A^{R3}$ are as defined above and may be the same or different Group 4 metals. The amount of catalyst deactivator added to the solution process was determined by the total catalytic metal value.

The upper limit on melt index of the ethylene interpolymer product may be 500 dg/min, in some cases 400 dg/min; in other cases 300 dg/min; and in still other cases 200 dg/min. The lower limit on the melt index of the ethylene interpolymer product may be 0.3 dg/min, in some cases 0.4 dg/min; in other cases 0.5 dg/min, and; in still other cases 0.6 dg/min.

Manufactured Articles

The ethylene interpolymer products disclosed herein may be converted into flexible manufactured articles such as monolayer or multilayer films. Non-limiting examples of processes to prepare such films include blown film processes, double bubble processes, triple bubble processes, cast film processes, tenter frame processes and machine direction orientation (MDO) processes.

In the blown film extrusion process an extruder heats, melts, mixes and conveys a thermoplastic, or a thermoplastic blend. Once molten, the thermoplastic is forced through an annular die to produce a thermoplastic tube. In the case of co-extrusion, multiple extruders are employed to produce a multilayer thermoplastic tube. The temperature of the extrusion process is primarily determined by the thermoplastic or thermoplastic blend being processed, for example the melting temperature or glass transition temperature of the thermoplastic and the desired viscosity of the melt. In the case of polyolefins, typical extrusion temperatures are from 330° F. to 550° F. (166° C. to 288° C.). Upon exit from the annular die, the thermoplastic tube is inflated with air, cooled, solidified and pulled through a pair of nip rollers. Due to air inflation, the tube increases in diameter forming a bubble of desired size. Due to the pulling action of the nip rollers the bubble is stretched in the machine direction. Thus, the bubble is stretched in two directions: the transverse direction (TD) where the inflating air increases the diameter of the bubble; and the machine direction (MD) where the nip rollers stretch the bubble. As a result, the physical properties of blown films are typically anisotropic, i.e. the physical properties differ in the MD and TD directions; for example, film tear strength and tensile properties typically differ in the MD and TD. In some prior art documents, the terms "cross direction" or "CD" is used; these terms are equivalent to the terms "transverse direction" or "TD" used in this disclosure. In the blown film process, air is also blown on the external bubble circumference to cool the thermoplastic as it exits the annular die. The final width of the film is determined by controlling the inflating air or the internal bubble pressure; in other words, increasing or decreasing bubble diameter. Film thickness is controlled primarily by increasing or decreasing the speed of the nip rollers to control the draw-down rate. After exiting the nip rollers, the bubble or tube is collapsed and may be slit in the machine direction thus creating sheeting. Each sheet may be wound into a roll of film. Each roll may be further slit to create film of the desired width. Each roll of film is further processed into a variety of consumer products as described below.

The cast film process is similar in that a single or multiple extruder(s) may be used; however the various thermoplastic materials are metered into a flat die and extruded into a monolayer or multilayer sheet, rather than a tube. In the cast film process the extruded sheet is solidified on a chill roll.

In the double bubble process a first blown film bubble is formed and cooled, then the first bubble is heated and re-inflated forming a second blown film bubble, which is subsequently cooled. The ethylene interpolymer products, disclosed herein, are also suitable for the triple bubble blown process. Additional film converting processes, suitable for the disclosed ethylene interpolymer products, include processes that involve a Machine Direction Orientation (MDO) step; for example, blowing a film or casting a film, quenching the film and then subjecting the film tube or film sheet to a MDO process at any stretch ratio. Additionally, the ethylene interpolymer product films disclosed herein are suitable for use in tenter frame processes as well as other processes that introduce biaxial orientation.

Depending on the end-use application, the disclosed ethylene interpolymer products may be converted into films that span a wide range of thicknesses. Non-limiting examples include, food packaging films where thicknesses may range from 0.5 mil (13 μm) to 4 mil (102 μm), and; in heavy duty sack applications film thickness may range from 2 mil (51 μm) to 10 mil (254 μm).

The monolayer, in monolayer films, may contain more than one ethylene interpolymer product and/or one or more additional polymer; non-limiting examples of additional polymers include ethylene polymers and propylene polymers. The lower limit on the weight percent of the ethylene interpolymer product in a monolayer film may be 3 wt. %, in other cases 10 wt. % and in still other cases 30 wt. %. The upper limit on the weight percent of the ethylene interpolymer product in the monolayer film may be 100 wt. %, in other cases 90 wt. % and in still other cases 70 wt. %.

The ethylene interpolymer products disclosed herein may also be used in one or more layers of a multilayer film; non-limiting examples of multilayer films include three, five, seven, nine, eleven or more layers. The disclosed ethylene interpolymer products are also suitable for use in processes that employ micro-layering dies and/or feed-blocks, such processes can produce films having many layers, non-limiting examples include from 10 to 10,000 layers.

The thickness of a specific layer (containing the ethylene interpolymer product) within a multilayer film may be 5%, in other cases 15% and in still other cases 30% of the total multilayer film thickness. In other embodiments, the thickness of a specific layer (containing the ethylene interpolymer product) within a multilayer film may be 95%, in other cases 80% and in still other cases 65% of the total multilayer film thickness. Each individual layer of a multilayer film may contain more than one ethylene interpolymer product and/or additional thermoplastics.

Additional embodiments include laminations and coatings, wherein mono or multilayer films containing the disclosed ethylene interpolymer products are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those experienced in the art. Frequently, adhesive lamination or extrusion lamination are used to bond dissimilar materials, non-limiting examples include the bonding of a paper web to a thermoplastic web, or the bonding of an aluminum foil containing web to a thermoplastic web, or the bonding of two thermoplastic webs that are chemically incompatible, e.g. the bonding of an ethylene interpolymer product containing web to a polyester or polyamide web. Prior to lamination, the web containing the disclosed ethylene interpolymer product(s) may be monolayer or multilayer. Prior to lamination the individual webs may be surface treated to improve the bonding, a non-limiting example of a surface treatment is corona treating. A primary web or film may be laminated on its upper surface, its lower surface, or both its upper and lower surfaces with a secondary web. A secondary web and a tertiary web could be laminated to the primary web; wherein the secondary and tertiary webs differ in chemical composition. As non-limiting examples, secondary or tertiary webs may include: polyamide, polyester and polypropylene, or webs containing barrier resin layers such as EVOH. Such webs may also contain a vapor deposited barrier layer; for example a thin silicon oxide ($SiO_x$) or aluminum oxide ($AlO_x$) layer. Multilayer webs (or films) may contain three, five, seven, nine, eleven or more layers.

The ethylene interpolymer products disclosed herein can be used in a wide range of manufactured articles comprising one or more films (monolayer or multilayer). Non-limiting examples of such manufactured articles include: food packaging films (fresh and frozen foods, liquids and granular foods), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction oriented (MDO) films, biaxially oriented films and functional film layers in oriented polypropylene (OPP) films, e.g. sealant and/or toughness layers. Additional manufactured articles comprising one or more films containing at least one ethylene interpolymer product include laminates and/or multilayer films; sealants and tie layers in multilayer films and composites; laminations with paper; aluminum foil laminates or laminates containing vacuum deposited aluminum; polyamide laminates; polyester laminates; extrusion coated laminates; and hot-melt adhesive formulations. The manufactured articles summarized in this paragraph contain at least one film (monolayer or multilayer) comprising at least one embodiment of the disclosed ethylene interpolymer products.

Desired film physical properties (monolayer or multilayer) typically depend on the application of interest. Non-limiting examples of desirable film properties include: optical properties (gloss, haze and clarity), dart impact, Elmendorf tear, modulus (1% and 2% secant modulus), tensile properties (yield strength, break strength, elongation at break, toughness, etc.), heat sealing properties (heat seal initiation temperature, SIT, and hot tack). Specific hot tack and heat sealing properties are desired in high speed vertical and horizontal form-fill-seal processes that load and seal a commercial product (liquid, solid, paste, part, etc.) inside a pouch-like package.

In addition to desired film physical properties, it is desired that the disclosed ethylene interpolymer products are easy to process on film lines. Those skilled in the art frequently use the term "processability" to differentiate polymers with improved processability, relative to polymers with inferior processability. A commonly used measure to quantify processability is extrusion pressure; more specifically, a polymer with improved processability has a lower extrusion pressure (on a blown film or a cast film extrusion line) relative to a polymer with inferior processability.

The films used in the manufactured articles described in this section may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof.

The processes disclosed herein are also capable of making ethylene interpolymer products that have a useful combination of desirable physical properties for use in rigid applications or rigid articles. Non-limiting examples of rigid articles include: deli containers, margarine tubs, drink cups and produce trays; household and industrial containers, cups, bottles, pails, crates, tanks, drums, bumpers, lids, industrial bulk containers, industrial vessels, material handling containers, bottle cap liners, bottle caps, living hinge closures; toys, playground equipment, recreational equipment, boats, marine and safety equipment; wire and cable applications such as power cables, communication cables and conduits; flexible tubing and hoses; pipe applications including both pressure pipe and non-pressure pipe markets, e.g. natural gas distribution, water mains, interior plumbing, storm sewer, sanitary sewer, corrugated pipes and conduit; foamed articles manufactured from foamed sheet or bun foam; military packaging (equipment and ready meals); personal care packaging, diapers and sanitary products; cosmetic, pharmaceutical and medical packaging; and truck bed liners, pallets and automotive dunnage. The rigid manufactured articles summarized in this paragraph contain one or more of the ethylene interpolymer products disclosed herein or a blend of at least one of the ethylene interpolymer products disclosed herein with at least one other thermoplastic.

Such rigid manufactured articles may be fabricated using the following non-limiting processes: injection molding, compression molding, blow molding, rotomolding, profile extrusion, pipe extrusion, sheet thermoforming and foaming processes employing chemical or physical blowing agents.

The desired physical properties of rigid manufactured articles depend on the application of interest. Non-limiting examples of desired properties include: flexural modulus (1% and 2% secant modulus); tensile toughness; environmental stress crack resistance (ESCR); slow crack growth resistance (PENT); abrasion resistance; shore hardness; deflection temperature under load; VICAT softening point; IZOD impact strength; ARM impact resistance; Charpy impact resistance; and color (whiteness and/or yellowness index).

The rigid manufactured articles described in this section may optionally include, depending on its intended use, additives and adjuvants. Non-limiting examples of additives and adjuvants include, antioxidants, slip agents, processing aids, anti-static additives, colorants, dyes, filler materials, heat stabilizers, light stabilizers, light absorbers, lubricants, pigments, plasticizers, nucleating agents and combinations thereof.

ADDITIONAL EMBODIMENTS

Other embodiments include: a continuous solution polymerization process comprising: i) injecting ethylene, a process solvent, a bridged metallocene catalyst formulation, optionally one or more α-olefins and optionally hydrogen into a first reactor to produce a first exit stream containing a first ethylene interpolymer in said process solvent; ii) passing said first exit stream into a second reactor and injecting into said second reactor, ethylene, said process solvent, said bridged metallocene catalyst formulation, optionally one or more α-olefins and optionally hydrogen to produce a second exit stream containing a second ethylene interpolymer and said first ethylene interpolymer in said process solvent; iii) passing said second exit stream into a third reactor and optionally injecting into said third reactor, ethylene, process solvent, one or more α-olefins, hydrogen and said bridged metallocene catalyst formulation to produce a third exit stream containing an third ethylene interpolymer, said second ethylene interpolymer and said first ethylene interpolymer in said process solvent; iv) phase separating said third exit stream to recover an ethylene interpolymer product comprising said first ethylene interpolymer, said second ethylene interpolymer and said optional third ethylene interpolymer; where said continuous solution polymerization process is improved by having (a) and/or (b):

(a) at least a 70% reduced [α-olefin/ethylene] weight ratio as defined by the following formula:

$$\%\text{ Reduced}\left[\frac{\alpha-\text{olefin}}{\text{ethylene}}\right]= 100\times\left\{\frac{\left(\frac{\alpha-\text{olefin}}{\text{ethylene}}\right)^A-\left(\frac{\alpha-\text{olefin}}{\text{ethylene}}\right)^C}{\left(\frac{\alpha-\text{olefin}}{\text{ethylene}}\right)^C}\right\}\leq -70\%$$

wherein $(\alpha\text{-olefin/ethylene})^A$ is calculated by dividing the weight of said α-olefin added to said first reactor by the weight of said ethylene added to said first reactor, wherein said first ethylene interpolymer having a target density is produced by said bridged metallocene catalyst formulation; and $(\alpha\text{-olefin/ethylene})^C$ is calculated by dividing the weight of said α-olefin added to said first reactor by the weight of said ethylene added to said first reactor, wherein a control ethylene interpolymer having said target density is produced by replacing said bridged metallocene catalyst formulation with an unbridged single site catalyst formulation;

(b) at least a 5% improved weight average molecular weight as defined by the following formula:

$$\%\text{ Improved } M_w=100\%\times(M_w^A-M_w^C)/M_w^C\geq 10\%$$

wherein $M_w^A$ is a weight average molecular weight of said first ethylene interpolymer and $M_w^C$ is a weight average molecular weight of a comparative ethylene interpolymer; wherein said comparative ethylene interpolymer is produced in said first reactor by replacing said bridged metallocene catalyst formulation with said unbridged single site catalyst formulation. Additional steps of this process may comprise: a) optionally adding a catalyst deactivator A to said second exit stream, downstream of said second reactor, forming a deactivated solution A; b) adding a catalyst deactivator B to said third exit stream, downstream of said third reactor, forming a deactivated solution B; with the proviso that step b) is skipped if said catalyst deactivator A is added in step a); c) phase separating said deactivated solution A or B to recover said ethylene interpolymer product. Optionally process step d) may be conducted wherein a passivator is added to said deactivated solution A or B forming a passivated solution. Finally in step e) phase separating said deactivated solution A or B, or said passivated solution, to recover said ethylene interpolymer product.

The bridged metallocene catalyst formulation may comprise: a bulky ligand-metal complex 'Component A'; a component M, comprising an alumoxane co-catalyst; a component B, comprising a boron ionic activator; and optionally, a component P, comprising a hindered phenol; wherein the following mole ratios may be employed: a molar ratio of said component B to said component A from about 0.3:1 to about 10:1; a molar ratio of said component M to said component A from about 1:1 to about 300:1, and; a molar ratio of said optional component P to said component $M^A$ from 0.0:1 to about 1:1. Non-limiting examples of components M, B and P include: methylalumoxane (MMAO-7); trityl tetrakis (pentafluoro-phenyl) borate; and 2,6-di-tert-butyl-4-ethylphenol, respectively. The process may further comprise the injection of said bridged metallocene catalyst formulation into said first reactor and optionally said second reactor at a catalyst inlet temperature from about 20° C. to about 70° C.; optionally, said component M and said component P may be deleted from said bridged metallocene catalyst formulation and replaced with a component J defined by the formula $Al(R^1)_n(OR^2)_o$, wherein the $(R^1)$ groups may be the same or different hydrocarbyl groups having from 1 to 10 carbon atoms; the $(OR^2)$ groups may be the same or different, alkoxy or aryloxy groups, wherein $R^2$ is a hydrocarbyl group having from 1 to 10 carbon atoms bonded to oxygen; and (n+o)=3, with the proviso that n is greater than 0. Optionally, said bridged metallocene catalyst formulation may be injected into said reactors at a catalyst inlet temperature from 80° C. to 180° C. In the process embodiment described in this paragraph: the process solvent may be one or more $C_5$ to $C_{12}$ alkanes; said first, second and third reactors may operate at temperatures from 80° C. to 300° C.; and pressures from 3 MPag to 45 MPag. The process solvent in said first reactor has an average reactor residence time from about 10 seconds to about 600 seconds and said process solvent in said second reactor has an average reactor residence time from about 10 seconds to about 720 seconds. The process may also have a reactor temperature difference $(T^{R2}-T^{R1})$ ranging from 1° C. to 120° C.; wherein $T^{R2}$ is the temperature of the solution in said second reactor and $T^{R1}$ is the temperature of the solution in said first reactor. Said optional α-olefins may be one or more of $C_3$ to $C_{10}$ α-olefins; preferred α-olefins are 1-hexene, or 1-octene, or a mixture of 1-hexene and 1-octene. Ethylene interpolymer products may be produced employing embodiments of the solution polymerization process disclosed in this paragraph.

Other embodiments include: a continuous solution polymerization process comprising: i) injecting ethylene, a process solvent, a bridged metallocene catalyst formulation, optionally one or more α-olefins and optionally hydrogen into a first reactor to produce a first exit stream containing a first ethylene interpolymer in said process solvent; ii) injecting ethylene, said process solvent, said bridged metallocene catalyst formulation, optionally one or more α-olefins and optionally hydrogen into a second reactor to produce a second exit stream containing a second ethylene interpolymer in said process solvent; iii) combining said first and said second exit streams to form a third exit stream; iv) passing said third exit stream into a third reactor and optionally injecting into said third reactor, ethylene, process solvent, one or more α-olefins, hydrogen and said bridged metallocene catalyst formulation to produce a fourth exit stream containing an optional third ethylene interpolymer, said second ethylene interpolymer and said first ethylene interpolymer in said process solvent; v) phase separating said fourth exit stream to recover an ethylene interpolymer product comprising said first ethylene interpolymer, said second ethylene interpolymer and said optional third ethylene interpolymer; wherein, said continuous solution polymerization process is improved by having one or more of the following, i.e. (a) and/or (b):

(a) at least an 70% reduced [α-olefin/ethylene] weight ratio as defined by the following formula $$\%\ \text{Reduced}\left[\frac{\alpha-\text{olefin}}{\text{ethylene}}\right]=100\times\left\{\frac{\left(\frac{\alpha-\text{olefin}}{\text{ethylene}}\right)^A-\left(\frac{\alpha-\text{olefin}}{\text{ethylene}}\right)^C}{\left(\frac{\alpha-\text{olefin}}{\text{ethylene}}\right)^C}\right\}\le-70\%$$

wherein (α-olefin/ethylene)$^A$ is calculated by dividing the weight of said α-olefin added to said first reactor by the weight of said ethylene added to said first reactor, wherein said first ethylene interpolymer having a target density is produced by said bridged metallocene catalyst formulation; and (α-olefin/ethylene)$^C$ is calculated by dividing the weight of said α-olefin added to said first reactor by the weight of said ethylene added to said first reactor, wherein a control ethylene interpolymer having said target density is produced by replacing said bridged metallocene catalyst formulation with an unbridged single site catalyst formulation;

(b) at least a 5% improved weight average molecular weight as defined by the following formula:

$$\%\ \text{Improved}\ M_w=100\%\times(M_w^A-M_w^C)/M_w^C\ge5\%$$

wherein $M_w^A$ is a weight average molecular weight of said first ethylene interpolymer and $M_w^C$ is a weight average molecular weight of a comparative ethylene interpolymer; wherein said comparative ethylene interpolymer is produced in said first reactor by replacing said bridged metallocene catalyst formulation with said unbridged single site catalyst formulation. Additional steps of this process may comprise: a) optionally adding a catalyst deactivator A to said third exit stream, downstream of said second reactor, forming a deactivated solution A; b) adding a catalyst deactivator B to said fourth exit stream, downstream of said third reactor, forming a deactivated solution B; with the proviso that step b) is skipped if said catalyst deactivator A is added in step a); c) phase separating said deactivated solution A or B to recover said ethylene interpolymer product. Optionally process step d) may be conducted wherein a passivator is added to said deactivated solution A or B forming a passivated solution. Finally in step e) phase separating said deactivated solution A or B, or said passivated solution, to recover said ethylene interpolymer product. Ethylene interpolymer products may be produced employing embodiments of the solution polymerization process disclosed in this paragraph.

Testing Methods

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Ethylene interpolymer product densities were determined using ASTM D792-13 (Nov. 1, 2013).

Melt Index

Ethylene interpolymer product melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship:

$$S.\text{Ex.}=\log(I_6/I_2)/\log(6480/2160)$$

wherein $I_6$ and $I_2$ are the melt flow rates measured at 190° C. using 6.48 kg and 2.16 kg loads, respectively.

Conventional Size Exclusion Chromatography (SEC)

Ethylene interpolymer product samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Polymer solutions were chromatographed at 140° C. on a PL 220 high-temperature chromatography unit equipped with four SHODEX® columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect SEC columns from oxidative degradation. The sample injection volume was 200 PL. The SEC columns were calibrated with narrow distribution polystyrene standards. The polystyrene molecular weights were converted to polyethylene molecular weights using the Mark-Houwink equation, as described in the ASTM standard test method D6474-12 (December 2012). The SEC raw data were processed with the CIRRUS® GPC software, to produce molar mass averages ($M_n$, $M_w$, $M_z$) and molar mass distribution (e.g. Polydispersity, $M_w/M_n$). In the polyethylene art, a commonly used term that is equivalent to SEC is GPC, i.e. Gel Permeation Chromatography. In this disclosure the terms SEC and GPC are both used and are equivalent.

Triple Detection Size Exclusion Chromatography (3D-SEC)

Ethylene interpolymer product samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Sample solutions were chromatographed at 140° C. on a PL 220 high-temperature chromatography unit equipped with a differential refractive index (DRI) detector, a dual-angle light scattering detector (15 and 90 degree) and a differential viscometer. The SEC columns used were either four SHODEX columns (HT803, HT804, HT805 and HT806), or four PL Mixed ALS or BLS columns. TCB was the mobile phase with a flow rate of 1.0 mL/minute, BHT was added to the mobile phase at a concentration of 250 ppm to protect SEC columns from oxidative degradation. The sample injection volume was 200 μL. The SEC raw data were processed with the CIRRUS GPC software, to produce absolute molar masses and intrinsic viscosity ([η]). The term "absolute" molar mass was used to distinguish 3D-SEC determined absolute molar masses from the molar masses determined by conventional SEC. The viscosity average molar mass ($M_v$) determined by 3D-SEC was used in the calculations to determine the Long Chain Branching Factor (LCBF).

GPC-FTIR

Ethylene interpolymer product (polymer) solutions (2 to 4 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a Waters GPC 150C chromatography unit equipped with four SHODEX columns (HT803, HT804, HT805 and HT806) using TCB as the mobile phase with a flow rate of 1.0 mL/minute, with a FTIR spectrometer and a heated FTIR flow through cell coupled with the chromatography unit through a heated transfer line as the detection system. BHT was added to the mobile phase at a concentration of 250 ppm to protect SEC columns from oxidative degradation. The sample injection volume was 300 μL. The raw FTIR spectra were processed with OPUS FTIR software and the polymer concentration and methyl content were calculated in real time with the Chemometric Software (PLS technique) associated with the OPUS. Then the polymer concentration and methyl content were acquired and baseline-corrected with the CIRRUS GPC software. The SEC columns were calibrated with narrow distribution polystyrene standards. The polystyrene molecular weights were converted to polyethylene molecular weights using the Mark-Houwink equation, as described in the ASTM standard test method D6474. The comonomer content was calculated based on the polymer concentration and methyl content predicted by the PLS technique as described in Paul J. DesLauriers, Polymer 43, pages 159-170 (2002); herein incorporated by reference.

The GPC-FTIR method measures total methyl content, which includes the methyl groups located at the ends of each macromolecular chain, i.e. methyl end groups. Thus, the raw GPC-FTIR data must be corrected by subtracting the contribution from methyl end groups. To be more clear, the raw GPC-FTIR data overestimates the amount of short chain branching (SCB) and this overestimation increases as molecular weight (M) decreases. In this disclosure, raw GPC-FTIR data was corrected using the 2-methyl correction. At a given molecular weight (M), the number of methyl end groups (NE) was calculated using the following equation: $N_E$=28000/M, and $N_E$ (M dependent) was subtracted from the raw GPC-FTIR data to produce the SCB/1000C (2-Methyl Corrected) GPC-FTIR data.

Composition Distribution Branching Index (CDBI)

The "Composition Distribution Branching Index", hereinafter CDBI, of the disclosed Examples and Comparative Examples were measured using a CRYSTAF/TREF 200+ unit equipped with an IR detector, hereinafter the CTREF. The acronym "TREF" refers to Temperature Rising Elution Fractionation. The CTREF was supplied by Polymer Char S.A. (Valencia Technology Park, Gustave Eiffel, 8, Paterna, E-46980 Valencia, Spain). The CTREF was operated in the TREF mode, which generates the chemical composition of the polymer sample as a function of elution temperature, the Co/Ho ratio (Copolymer/Homopolymer ratio) and the CDBI (the Composition Distribution Breadth Index), i.e. $CDBI_{50}$ and $CDBI_{25}$. A polymer sample (80 to 100 mg) was placed into the reactor vessel of the CTREF. The reactor vessel was filled with 35 ml of 1,2,4-trichlorobenzene (TCB) and the polymer was dissolved by heating the solution to 150° C. for 2 hours. An aliquot (1.5 mL) of the solution was then loaded into the CTREF column which was packed with stainless steel beads. The column, loaded with sample, was allowed to stabilize at 110° C. for 45 minutes. The polymer was then crystallized from solution, within the column, by dropping the temperature to 30° C. at a cooling rate of 0.09° C./minute. The column was then equilibrated for 30 minutes at 30° C. The crystallized polymer was then eluted from the column with TCB flowing through the column at 0.75 mL/minute, while the column was slowly heated from 30° C. to 120° C. at a heating rate of 0.25° C./minute. The raw CTREF data were processed using Polymer Char software, an EXCEL spreadsheet and CTREF software developed in-house. $CDBI_{50}$ was defined as the percent of polymer whose composition is within 50% of the median comonomer (α-olefin) composition; $CDBI_{50}$ was calculated from the composition distribution cure and the normalized cumulative integral of the composition distribution curve, as described in U.S. Pat. No. 5,376,439. Those skilled in the art will understand that a calibration curve is required to convert a CTREF elution temperature to comonomer content, i.e. the amount of comonomer in the ethylene/α-olefin polymer fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference. $CDBI_{25}$ as calculated in a similar manner; $CDBI_{25}$ is defined as the percent of polymer whose composition is with 25% of the median comonomer composition. At the end of each sample run, the CTREF column was cleaned for 30 minutes; specifically, with the CTREF column temperature at 160° C., TCB flowed (0.75 mL/minute) through the column for 30 minutes. CTREF deconvolutions were performed to determine the amount of branching (BrF (#C6/1000C)) and density of the first ethylene interpolymer using the following equations: BrF ($\#C_6$/1000C)=74.29-0.7598 ($T^P_{CTREF}$), where $T^P_{CTREF}$ is the peak elution temperature of the first ethylene interpolymer in the CTREF chromatogram, and BrF ($\#C_6$/1000C)=9341.8 $(\rho^1)^2$−17766 $(\rho^1)$+8446.8, where $\rho^1$ was the density of the first ethylene interpolymer. The BrF ($\#C_6$/1000C) and density of the second ethylene interpolymer was determined using blending rules, given the overall BrF ($\#C_6$/1000C) and density of the ethylene interpolymer product. The BrF ($\#C_6$/1000C) and density of the second and third ethylene interpolymer was assumed to be the same.

Neutron Activation (Elemental Analysis)

Neutron Activation Analysis, hereinafter N.A.A., was used to determine catalyst residues in ethylene interpolymer products as follows. A radiation vial (composed of ultrapure polyethylene, 7 mL internal volume) was filled with an ethylene interpolymer product sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g. Zr, Hf, Cr, Fe and Ni). The average thermal neutron flux within the reactor was $5\times10^{11}$/$cm^2$/s. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (ORTEC model GEM55185, Advanced Measurement Technology Inc., Oak Ridge, TN, USA) and a multichannel analyzer (ORTEC model DSPEC Pro). The amount of each element in the sample was calculated from the gamma-ray spectrum and recorded in parts per million relative to the total weight of the ethylene interpolymer product sample. The N.A.A. system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/μg).

Unsaturation

The quantity of unsaturated groups, i.e. double bonds, in an ethylene interpolymer product was determined according to ASTM D3124-98 (published March 2011) and ASTM D6248-98 (published July 2012). An ethylene interpolymer product sample was: a) first subjected to an overnight carbon disulfide extraction to remove additives that may interfere with the analysis; b) the sample (pellet, film or granular form) was pressed into a plaque of uniform thickness (0.5 mm); c) the plaque was analyzed by FTIR to quantify the amount of terminal (vinyl) and internal unsaturation (trans-vinylene); and d) the sample plaque was brominated and reanalyzed by FTIR to quantify the amount of side chain unsaturation (vinylidene). The IR resonances of these groups appear at 908 $cm^{-1}$, 965 $cm^{-1}$ and 888 $cm^{-1}$, respectively. The procedure is based on Beer's Law: A=abdc, where a is the extinction coefficient for the specific unsaturation being measured, b is the plaque thickness, d the plaque density and c the selected unsaturation. Experimentally, the weight and area of the plaque are measured rather than the density and the thickness.

Comonomer (α-Olefin) Content: Fourier Transform Infrared (FTIR) Spectroscopy

The quantity of comonomer in an ethylene interpolymer product was determine by FTIR and reported as the Short Chain Branching (SCB) content having dimensions of $CH_3$ #/1000C (number of methyl branches per 1000 carbon atoms). This test was completed according to ASTM D6645-01 (2001), employing a compression molded polymer plaque and a Thermo-Nicolet 750 Magna-IR Spectrophotometer. The polymer plaque was prepared using a compression molding device (Wabash-Genesis Series press) according to ASTM D4703-16 (April 2016).

Dynamic Mechanical Analysis (DMA)

Oscillatory shear measurements under small strain amplitudes were carried out to obtain linear viscoelastic functions at 190° C. under $N_2$ atmosphere, at a strain amplitude of 10% and over a frequency range of 0.02-126 rad/s at 5 points per decade. Frequency sweep experiments were performed with a TA Instruments DHR3 stress-controlled rheometer using cone-plate geometry with a cone angle of 5°, a truncation of 137 μm and a diameter of 25 mm. In this experiment a sinusoidal strain wave was applied and the stress response was analyzed in terms of linear viscoelastic functions. The zero shear rate viscosity (no) based on the DMA frequency sweep results was predicted by Ellis model (see R. B. Bird et al. "Dynamics of Polymer Liquids. Volume 1: Fluid Mechanics" Wiley-Interscience Publications (1987) p. 228) or Carreau-Yasuda model (see K. Yasuda (1979) PhD Thesis, IT Cambridge). In this disclosure, the LCBF (Long Chain Branching Factor) was determined using the DMA determined $\eta_0$.

In this disclosure the onset of shear thinning, $\tau$ ($s^{-1}$), was determined by fitting the three parameter Ellis model ($\eta_0$, $\tau$ and $\eta$) to the 190° C. DMA data (complex viscosity ($\eta^*$) versus frequency ($\omega$)): i.e. ($\eta^*=\eta_0/(1+(\omega/\tau)^{(n-1)})$).

The Flow Activation Energy (FAE) having dimensions of J/mol was also determined. The Rheometrics RDSII was used to generate the data from which the FAE was calculated; specifically, the melt viscosity flow curves (from 0.05 to 100 rad/s at 7 data points per decade) at four different temperatures (160, 175, 190 and 205° C.) were measured. Using 190° C. as the reference temperature, a time-temperature-superposition shift was carried out to obtain the shift factors. The FAE of each sample was calculated using TTS (time-temperature superposition (see Markovitz, H., "Superposition in Rheology", J. Polym. Sci., Polymer Symposium Series 50, 431-456 (1975)) shifting of the flow curves and Arrhenius equation fitting on zero shear viscosity of each temperature with RheoPlus and Orchestrator software.

Creep Test

Creep measurements were performed by an Anton Paar MCR 501 rheometer at 190° C. using 25 mm parallel plate geometry under $N_2$ atmosphere. In this experiment, a compression molded circular plaque with a thickness of 1.8 mm was placed between the pre-heated upper and lower measurement fixtures and allowed to come to thermal equilibrium. The upper plate was then lowered to 50 μm above the testing gap size of 1.5 mm. At this point, the excess material was trimmed off and the upper fixture was lowered to the measurement gap size. A waiting time of 10 min after sample loading and trimming was applied to avoid residual stresses causing the strain to drift. In the creep experiment, the shear stress was increased instantly from 0 to 20 Pa and the strain was recorded versus time. The sample continued to deform under the constant shear stress and eventually reached a steady rate of straining. Creep data was reported in terms of creep compliance (J(t)) which has the units of reciprocal modulus. The inverse of J(t) slope in the steady creeping regime was used to calculate the zero shear rate viscosity based on the linear regression of the data points in the last 10% time window of the creep experiment.

In order to determine if the sample was degraded during the creep test, frequency sweep experiments under small strain amplitude (10%) were performed before and after creep stage over a frequency range of 0.1-100 rad/s. The difference between the magnitude of complex viscosity at 0.1 rad/s before and after the creep stage was used as an indicator of thermal degradation. The difference should be less than 5% to consider the creep determined zero shear rate viscosity acceptable.

Melt Strength

The Accelerated-Haul-Off (AHO) Melt Strength (MS), having dimensions of centi-Newtons (cN), was measured on a Rosand RH-7 capillary rheometer (available from Malvern Instruments Ltd, Worcestershire, UK) having a barrel diameter of 15 mm, a flat die of 2-mm diameter and L/D ratio of 10:1 and equipped with a pressure transducer of 10,000 psi (68.95 MPa). The polymer melt was extruded through a capillary die under a constant rate (constant piston speed of 5.33 mm/min at 190° C.) which formed an extruded polymer filament. The polymer filament was then passed through a set of rollers and stretched at an ever increasing haul-off speed until rupture. More specifically, the initial polymer filament speed was increased from 0 m/min at a constant acceleration rate from 50 to 80 m/min$^2$ until the polymer filament ruptured. During this experiment, the force on the rollers was constantly measured, initially the force rises quickly and then plateaus prior to filament rupture. The maximum value of the force in the plateau region of the force versus time curve was defined as the melt strength for the polymer, measured in centi-Newtons (cN).

Vicat Softening Point (Temperature)

The Vicat softening point of an ethylene interpolymer product was determined according to ASTM D1525-07 (published December 2009). This test determines the temperature at which a specified needle penetration occurs when samples are subjected to ASTM D1525-07 test conditions, i.e. heating Rate B (120±10° C./hr and 938 gram load (10±0.2N load).

Heat Deflection Temperature

The heat deflection temperature of an ethylene interpolymer product was determined using ASTM D648-07 (approved Mar. 1, 2007). The heat deflection temperature is the temperature at which a deflection tool applying 0.455 MPa (66 PSI) stress on the center of a molded ethylene interpolymer plaque (3.175 mm (0.125 in) thick) causes it to deflect 0.25 mm (0.010 in) as the plaque is heated in a medium at a constant rate.

Flexural Properties

The flexural properties, i.e. flexural secant and tangent modulus and flexural strength were determined using ASTM D790-10 (published in April 2010).

Film Dart Impact

Film dart impact strength was determined using ASTM D1709-09 Method A (May 1, 2009). In this disclosure the dart impact test employed a 1.5 inch (38 mm) diameter hemispherical headed dart.

Film Puncture

Film "puncture", the energy (J/mm) required to break the film was determined using ASTM D5748-95 (originally adopted in 1995, reapproved in 2012).

Film Lub-Tef Puncture

The 'Lub-Tef Puncture' test was performed using a specifically designed Teflon probe at a 20 in/min. puncture rate, the purpose of this test was to determine the puncture resistance of monolayer ethylene interpolymer product films. An MTS Insight/Instron Model 5 SL Universal Testing Machine equipped with MTS Testworks 4 software was used; MTS 1000 N or 5000 N load cells were used. Film samples were ASTM conditioned for at least 24 hours prior to testing. Given a roll of blown film, 4.25 inch sample were cut in the transverse direction, having a length of the film roll layflat dimension and the outside of the film is labelled (the probe impacts the outside of the film). Mount the Teflon coated puncture probe and set the testing speed to 20 inch/min. Mount the film sample into the clamp and deposit 1 cm$^3$ of lube onto the center of the film. When the crosshead is in the starting test position, set the limit switches on the Load Cell frame to 10 inch below and above the crosshead. Measure and record film sample thickness and begin (start) the puncture test. Prior to the next test thoroughly clean the probe head. Repeat until at least 5 consistent puncture results are obtained, i.e. standard deviation less than 10%. The lubricant used was Muko Lubricating Jelly; a water-soluble personal lubricant available from Cardinal Health Inc., 1000 Tesma Way, Vaughan, ON L4K 5R8 Canada. The probe head was machined Teflon having a 1.4 inch cone shape with a flat tip.

Film Tensile Properties

The following film tensile properties were determined using ASTM D882-12 (Aug. 1, 2012): tensile break strength (MPa), elongation at break (%), tensile yield strength (MPa) and tensile elongation at yield (%). Tensile properties were measured in the both the machine direction (MD) and the transverse direction (TD) of the blown films.

Film Secant Modulus

The secant modulus is a measure of film stiffness. Secant moduli were determined according to ASTM D882. The secant modulus is the slope of a line drawn between two points on the stress-strain curve, i.e. the secant line. The first point on the stress-strain curve is the origin, i.e. the point that corresponds to the origin (the point of zero percent strain and zero stress), and; the second point on the stress-strain curve is the point that corresponds to a strain of 1%; given these two points the 1% secant modulus is calculated and is expressed in terms of force per unit area (MPa). The 2% secant modulus is calculated similarly. This method is used to calculated film modulus because the stress-strain relationship of polyethylene does not follow Hook's law; i.e. the stress-strain behavior of polyethylene is non-linear due to its viscoelastic nature. Secant moduli were measured using a conventional Instron tensile tester equipped with a 200 lbf load cell. Strips of monolayer film samples were cut for testing with following dimensions: 14 inch long, 1 inch wide and 1 mil thick; ensuring that there were no nicks or cuts on the edges of the samples. Film samples were cut in both the machine direction (MD) and the transverse direction (TD) and tested. ASTM conditions were used to condition the samples. The thickness of each film was accurately measured with a hand-held micrometer and entered along with the sample name into the Instron software. Samples were loaded in the Instron with a grip separation of 10 inch and pulled at a rate of 1 inch/min generating the strain-strain curve. The 1% and 2% secant modulus were calculated using the Instron software.

Film Elmendorf Tear

Film tear performance was determined by ASTM D1922-09 (May 1, 2009); an equivalent term for tear is "Elmendorf tear". Film tear was measured in both the machine direction (MD) and the transverse direction (TD) of the blown films.

Film Puncture-Propagation Tear

Puncture-propagation tear resistance of blown film was determined using ASTM D2582-09 (May 1, 2009). This test measures the resistance of a blown film to snagging, or more precisely, to dynamic puncture and propagation of that puncture resulting in a tear. Puncture-propagation tear resistance was measured in the machine direction (MD) and the transverse direction (TD) of the blown films.

Film Opticals

Film optical properties were measured as follows: Haze, ASTM D1003-13 (Nov. 15, 2013); and Gloss ASTM D2457-13 (Apr. 1, 2013).

Film Dynatup Impact

Instrumented impact testing was carried out on a machine called a Dynatup Impact Tester purchased from Illinois Test Works Inc., Santa Barbara, CA, USA; those skilled in the art frequently call this test the Dynatup impact test. Testing was completed according to the following procedure. Test samples are prepared by cutting 5 inch (12.7 cm) wide and 6 inch (15.2 cm) long strips from a roll of blown film; film was 1 mil thick. Prior to testing, the thickness of each sample was accurately measured with a handheld micrometer and recorded. ASTM conditions were employed. Test samples were mounted in the 9250 Dynatup Impact drop tower/test machine using the pneumatic clamp. Dynatup tup #1, 0.5 inch (1.3 cm) diameter, was attached to the crosshead using the Allen bolt supplied. Prior to testing, the crosshead is raised to a height such that the film impact velocity is 10.9±0.1 ft/s. A weight was added to the crosshead such that: 1) the crosshead slowdown, or tup slowdown, was no more than 20% from the beginning of the test to the point of peak load and 2) the tup must penetrate through the specimen. If the tup does not penetrate through the film, additional weight is added to the crosshead to increase the striking velocity. During each test the Dynatup Impulse Data Acquisition System Software collected the experimental data (load (lb) versus time). At least 5 film samples are tested and the software reports the following average values: "Dynatup Maximum (Max) Load (lb)", the highest load measured during the impact test; "Dynatup Total Energy (ft·lb)", the area under the load curve from the start of the test to the end of the test (puncture of the sample), and; "Dynatup Total Energy at Max Load (ft·lb)", the area under the load curve from the start of the test to the maximum load point.

Film Hexane Extractables

Hexane extractables was determined according to the Code of Federal Registration 21 CFR § 177.1520 Para (c) 3.1 and 3.2; wherein the quantity of hexane extractable material in a film is determined gravimetrically. Elaborating, 2.5 grams of 3.5 mil (89 μm) monolayer film was placed in a stainless steel basket, the film and basket were weighed ($w^i$). While in the basket the film was: extracted with n-hexane at 49.5° C. for two hours; dried at 80° C. in a vacuum oven for 2 hours; cooled in a desiccator for 30 minutes; and weighed ($w^f$). The percent loss in weight is the percent hexane extractables ($w^{C6}$): $w^{C6}=100\times(w^i-w^f)/w^i$.

EXAMPLES

Polymerizations

The following examples are presented for the purpose of illustrating selected embodiments of this disclosure, it being understood that, the examples presented hereinafter do not limit the claims presented.

Examples 6 and Comparative 8 were prepared in a continuous solution process pilot plant and process conditions are summarized in Table 8A and Table 8B. Two CSTR reactors (R1 and R2), configured in series, were employed, followed by a tubular reactor. R1 pressure varied from 14 MPa to 18 MPa; R2 was operated at a lower pressure to facilitate continuous flow from R1 to R2. CSTR's were agitated to give conditions in which the reactor contents were well mixed. The process was operated continuously by feeding fresh process solvent, ethylene, 1-octene and hydrogen to the reactors. Methylpentane was used as the process solvent (a commercial blend of methylpentane isomers). The volume of the first CSTR reactor (R1) was 3.2 gallons (12 L), the volume of the second CSTR reactor (R2) was 5.8 gallons (22 L) and the volume of the tubular reactor (R3) was 0.58 gallons (2.2 L).

The following components were used to prepare the bridged metallocene catalyst formulation: component A, diphenylmethylene(cyclopentadienyl)(2,7-di-t-butylfluorenyl)hafnium dimethyl, $[(2,7\text{-}tBu_2Flu)Ph_2C(Cp)HfMe_2]$ (abbreviated CpF-2); component M, methylaluminoxane (MMAO-07); component B, trityl tetrakis(pentafluoro-phenyl)borate; and component P, 2,6-di-tert-butyl-4-ethylphenol. The following catalyst component solvents were used:

methylpentane for components M and P; and xylene for component A and B. As shown in Table 8A Example 6 the quantity of CpF-2 in reactor 1 (R1) was 0.36 ppm, i.e. 'R1 catalyst (ppm)'. The efficiency of the bridged metallocene catalyst formulation was optimized by adjusting the mole ratios of the catalyst components and the R1 catalyst inlet temperature. The mole ratios optimized were: ([M]/[A]), i.e. [(MMAO-07)/(CpF-2)]; ([P]/]M]), i.e. [(2,6-di-tert-butyl-4-ethylphenol)/(MMAO-07)]; and ([B]/[A]), i.e. [(trityl tetrakis(pentafluoro-phenyl)borate)/(CpF-2)]. To be more clear, in Example 6 (Table 8A), the mole ratios in R1 were: R1 ([M]/[A])=31; R1 ([P]/[M])=0.40; and R1 ([B]/[A])=1.2. The same bridged metallocene catalyst formulation was also injected into the second reactor (R2), i.e. 0.76 ppm R2 catalyst (ppm). Additional process parameters, e.g. ethylene and 1-octene splits between the reactors, reactor temperatures and ethylene conversions, etc. are shown in Table 8A and Table 8B.

Comparative ethylene interpolymer products were manufactured using the unbridged single site catalyst formulation comprising: component C, cyclopentadienyl tri(tertiary butyl)phosphinimine titanium dichloride [Cp[(t-Bu)3PN]TiCl2] (abbreviated PIC-1); component M, methylaluminoxane (MMAO-07); component B, trityl tetrakis(pentafluoro-phenyl)borate, and; component P, 2,6-di-tert-butyl-4-ethylphenol. The following catalyst component solvents were used: methylpentane for components M and P; and xylene for component A and B. As shown in Table 8A Comparative 8 the quantity of PIC-1 in reactor 1 (R1) was 0.10 ppm, i.e. 'R1 catalyst (ppm)'. The efficiency of the unbridged single site catalyst formulation was optimized by adjusting the mole ratios of the catalyst components. As shown in Table 8A Comparative 8 the optimized mole ratios were: R1 ([M]/[C])=100; R1 ([P]/[M])=0.30; and R1 ([B]/[C])=1.2. The same unbridged single site catalyst formulation was also injected into the second reactor (R2), 0.22 ppm R2 catalyst (ppm). Additional process parameters, e.g. ethylene and 1-octene splits between the reactors, reactor temperatures and ethylene conversions, etc. are shown in Table 8A and Table 8B.

Polymerization in the continuous solution polymerization process was terminated by adding a catalyst deactivator to the third exit stream exiting the tubular reactor (R3). The catalyst deactivator used was octanoic acid (caprylic acid), commercially available from P&G Chemicals, Cincinnati, OH, U.S.A. The catalyst deactivator was added such that the moles of fatty acid added were 50% of the total molar amount of catalytic metal and aluminum added to the polymerization process. A two-stage devolatilization process was employed to recover the ethylene interpolymer product from the process solvent, i.e. two vapor/liquid separators were used and the second bottom stream (from the second V/L separator) was passed through a gear pump/pelletizer combination. Prior to pelletization the ethylene interpolymer product was stabilized by adding 500 ppm of IRGANOX® 1076 (a primary antioxidant) and 500 ppm of IRGAFOS® 168 (a secondary antioxidant), based on weight of the ethylene interpolymer product. Antioxidants were dissolved in process solvent and added between the first and second V/L separators.

Ethylene interpolymer products, Examples 20-27, were prepared in a commercial continuous solution polymerization plant. Solution process conditions for Examples 20, 22 and 26 are summarized in Table 5A and Table 5B. Examples 21, 23-25 and 27 were manufactured in similar manner. Two CSTR reactors (R1 and R2), configured in series, were employed, followed by a tubular reactor. CSTR's were agitated to give conditions in which the reactor contents were well mixed. The process was operated continuously by feeding fresh process solvent, ethylene, 1-octene and hydrogen to the reactors. Methylpentane was used as the process solvent (a commercial blend of methylpentane isomers).

As shown in Table 5A, for Example 20, the quantity of CpF-2 in reactor 1 (R1) was 0.43 ppm; the optimized mole ratios were: R1 ([M]/[A])=75; R1 ([P]/[M])=0.4, and; R1 ([B]/[A])=1.2. In Examples 20, 22 and 26 the bridged metallocene catalyst formulation was also injected into the second reactor (R2). Additional process parameters, e.g. ethylene and 1-octene splits between the reactors, reactor temperatures and ethylene conversions, etc. are shown in Table 5A and Table 5B. Polymerization was terminated by adding a catalyst deactivator to the third exit stream exiting the tubular reactor (R3), i.e. octanoic acid. A two-stage devolatilization process was employed to recover the ethylene interpolymer product from the process solvent, i.e. two vapor/liquid separators were used and the second bottom stream (from the second V/L separator) was passed through a gear pump/pelletizer combination. Prior to pelletization the ethylene interpolymer product was stabilized by adding 500 ppm of IRGANOX 1076 (a primary antioxidant) and 500 ppm of IRGAFOS 168 (a secondary antioxidant), based on weight of the ethylene interpolymer product. Antioxidants were dissolved in process solvent and added between the first and second V/L separators.

The physical properties of ethylene interpolymer products Examples 20-27 are reported in Table 6A; these examples had densities ranging from 0.9043 to 0.9105 g/cc and melt indices ranging from 0.76 to 0.87 dg/min. The term 'FAE (kJ/mol)' was the Flow Activation Energy, measured as described in the test methods section; and '$\tau$ ($s^{-1}$)' was the rheological onset of shear thinning as described in the test methods section.

Figure 7:
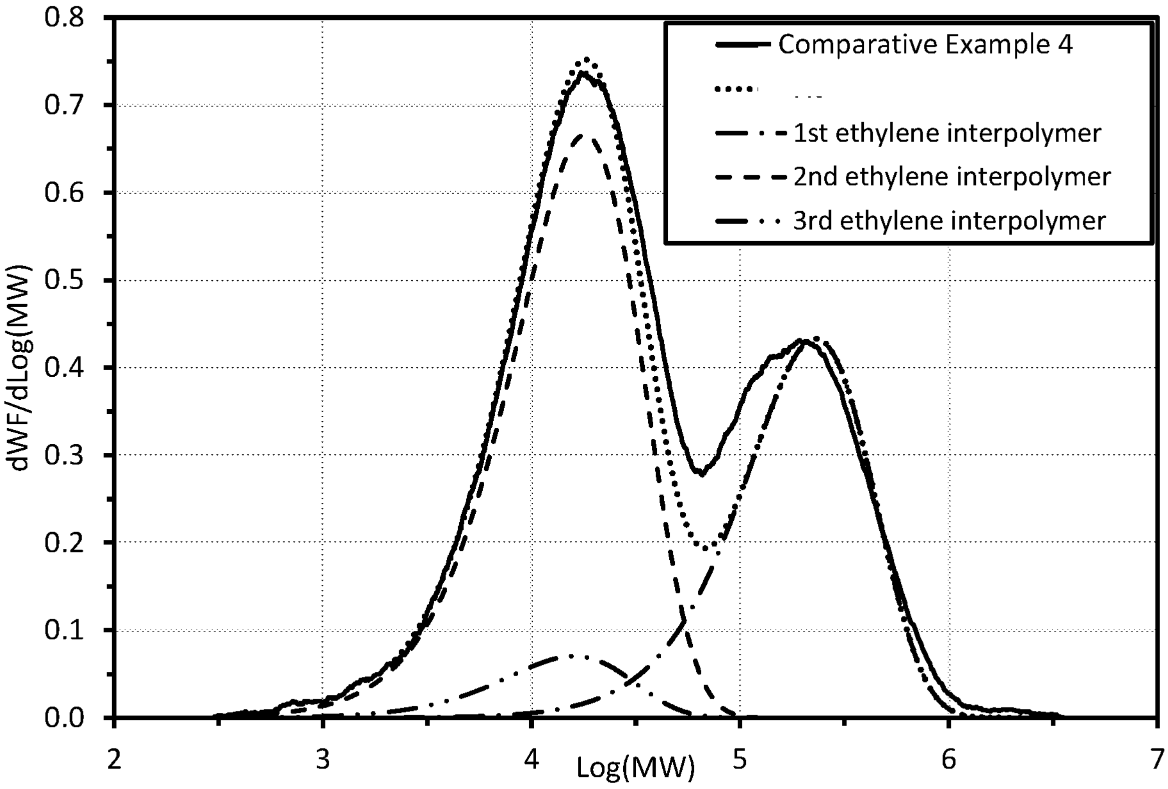
FIG. 7 illustrates the deconvolution of an ethylene interpolymer product Comparative Example 4 into a first, second and third ethylene interpolymer.

The ethylene interpolymer products of this disclosure comprise at least two ethylene interpolymers. An ethylene interpolymer product containing three ethylene interpolymers is shown in Table 7; wherein the experimentally measured SEC chromatogram was mathematically deconvoluted into three components assuming Flory-Schultz distributions ($M_w/M_n$=2.0) for each component and reactor kinetic models. As produced the ethylene interpolymer product had the following overall values: an $I_2$ of 0.87 dg/min, a density of 0.9112 g/cc and a $M_w$ of 105449 (7.53 $M_w/M_n$) as measured by SEC. SEC deconvolution evidenced the presence of: 37 wt. % of a first ethylene interpolymer having a $M_w$ value of 230,042, 57 wt. % of a second ethylene interpolymer having a $M_w$ value of 22,418; and 6 wt. % of a third ethylene interpolymer having a $M_w$ value of 22,418; these three components are shown graphically in FIG. 7. Comparative Example 4 was manufactured in a solution pilot plant by injecting a bridged metallocene catalyst formulation into reactors 1 and 2; catalyst carried over into reactor 3 to produce the third ethylene interpolymer in reactor 3. This reactor configuration was used to produce Examples 20-27.

Table 6B characterizes comparative ethylene interpolymer products. Comparative 1a was SURPASS FPs117-C, Comparative 2a was produced in the solution pilot plant using a bridged metallocene catalyst formulation in the first reactor and an unbridged single site catalyst formulation in the second reactor, Comparative 3a was produced in the solution pilot plant using a bridged metallocene catalyst formulation in the first reactor and an in-line Ziegler-Natta catalyst formulation in the second reactor, Comparative 4a was SURPASS VPsK914, Comparative 5a was SCLAIR FP120 and Comparative Examples 1 and 2 were produced in a solution pilot plant wherein a bridged metallocene catalyst formulation was injected into the first and second reactor. Table 6C characterizes additional comparative ethylene interpolymer products. Comparatives Q1-Q4 were QUEO products, specifically QUEO 0201, QUEO 8201, QUEO 0203 and QUEO 1001, respectively. The remaining comparative samples were: Comparative R1 was AFFINITY PL1880; Comparative S1 was ENABLE 20-05HH; Comparative T1 was EXCEED 1018CA; Comparative U1 was ELITE AT 6202; and Comparative V1 was ELITE 5401G.

As shown in FIG. 4, the ethylene interpolymer products of this disclosure, Examples 20-27, are characterized by a unique combination of physical properties; relative to Comparatives Q1-Q4, Comparatives W1 and W2 and Comparative Example 1 and Comparative Example 2. FIG. 4 plots the unsaturation ratio, UR, values (ordinate) as a function of the first derivative of the melt flow distribution function $$\frac{d\text{Log}(1/I_n)}{d\text{Log(loading)}}$$

at a loading of 4000 g (abscissa) for various ethylene interpolymers.

The ethylene interpolymer products of this disclosure are characterized by a first derivative of the melt flow distribution function $$\frac{d\text{Log}(1/I_n)}{d\text{Log(loading)}}$$

at a loading of 4000 g having values from ≥−1.85 to ≤−1.51 and an unsaturation ratio, UR, of from >0.06 to ≤0.60. Comparative Examples 1 and 2 are located in the lower left quadrant, having negative UR values; Comparative Q1-Q4 are located in the upper right quadrant; and Comparatives W1 and W2 have $$\frac{d\text{Log}(1/I_n)}{d\text{Log(loading)}}$$

at a loading of 4000 g values greater than −1.51. The ethylene interpolymers of this disclosure are also characterized by a Melt Flow-Intrinsic Visclosity Index, MFIVI, of from 0.05 to ≤0.80 and a residual catalytic metal of from ≥0.03 to ≤5 ppm of hafnium.

There is a need to improve the continuous solution polymerization process, e.g. to increase the production rate, where production rate is the kilograms of ethylene interpolymer product produced per hour. Table 8A and Table 8B disclose series dual reactor solution polymerization process conditions that produced products having melt indexes ($I_2$) of about 1.0 dg/min and densities of about 0.9175 g/cc. An improved continuous solution polymerization process is represented by Example 6 in Table 8A and Table 8B. Example 6 was an ethylene interpolymer product produced on the solution pilot plant (described above) by injecting the bridged metallocene catalyst formulation (CpF-2) into reactors 1 and 2.

A comparative continuous solution polymerization process is represented by Comparative 8 in Table 8A and Table 8B. Comparative 8 was a comparative ethylene interpolymer product produced on the same solution pilot plant by injecting the unbridged single site catalyst formulation (PIC-1) into reactors 1 and 2. The improved process had a production rate, $PR^A$, of 93.0 kg/hr; in contrast the comparative process had a comparative production rate, $PR^C$, of 81.3 kg/hr. The improved process had an increased production rate, $PR^C$, of 14.5%, i.e.:

$$PR'=100\times(PR^A-PR^C)/PR^C=100\times((93.0-81.3)/81.3)=14.5\%.$$

There is a need to improve the continuous solution polymerization process, e.g. to increase the molecular weight of the ethylene interpolymer product produced at a specific reactor temperature. In addition, in solution polymerization there is a need for catalyst formulations that efficiently incorporate α-olefins into the propagating macromolecular chain. Expressed alternatively, there is a need for catalyst formulations that produce an ethylene interpolymer product, having a specific density, at a lower (α-olefin/ethylene) ratio in the reactor.

Table 9 compares the solution polymerization conditions of Example 10 manufactured using a bridged metallocene catalyst formulation (CpF-2) and Comparative 10s simulated using an unbridged single site catalyst formulation (PIC-1). Example 10 was produced on the continuous solution process pilot plant employing one CSTR reactor. Relative to Example 10, Comparative 10s was computer simulated using the same reactor configuration, same reactor temperature (165° C.), same hydrogen concentration (4 ppm), same ethylene conversion (90% ($Q^T$)) and the [α-olefin/ethylene] ratio was adjusted to produce an ethylene interpolymer product having the same branch frequency as Example 10 (about 16 $C_6$/1000C). Given Table 9 it is evident that Example 10 characterizes an improved solution polymerization process, relative to Comparative 10s, i.e. an improved '% Reduced [α-olefin/ethylene]' ratio results. Elaborating, the [α-olefin/ethylene]$^A$ weight ratio of Example 10 was 83.8% lower (improved) relative to the [α-olefin/ethylene]$^C$ weight ratio of Comparative 10s, i.e.:

$$\%\ \text{Reduced}\left[\frac{\alpha-\text{olefin}}{\text{ethylene}}\right]=100\times\left\{\frac{\left(\frac{\alpha-\text{olefin}}{\text{ethylene}}\right)^A-\left(\frac{\alpha-\text{olefin}}{\text{ethylene}}\right)^C}{\left(\frac{\alpha-\text{olefin}}{\text{ethylene}}\right)^C}\right\}$$

$$\%\ \text{Reduced}\left[\frac{\alpha-\text{olefin}}{\text{ethylene}}\right]=100\times\left\{\frac{0.17-1.05}{1.05}\right\}=-83.8\%$$

where the superscript$^A$ represents catalyst Component A (Formula (I)) and the superscript c represents catalyst Component C (Formula (II)). In addition, the bridged metallocene catalyst formulation produced a '% Improved $M_w$'. Elaborating, the weight average molecular weight of Example 10 ($M_w^A$) was 73.6% higher (improved), relative to the weight average molecular weight of Comparative 10s ($M_w^C$), i.e.:

$$\%\ \text{Improved}\ M_w=100\times(M_w^A-M_w^C)/M_w^C$$

$$\%\ \text{Improved}\ M_w=100\times(82720-47655)/47655=73.6\%.$$

Similarly, Table 9 also compares the solution polymerization conditions of Example 11 manufactured using the bridged metallocene catalyst formulation (CpF-2) with simulated Comparative 11 s using the unbridged single site catalyst formulation (PIC-1). Example 11 and Comparative 11s were manufactured or simulated, respectively, using the same reactor configuration, same reactor temperature (165° C.), same hydrogen concentration (6 ppm), same ethylene conversion (85% ($Q^T$)) and the respective [α-olefin/ethylene] ratio was adjusted to produce ethylene interpolymer products having about the same branch frequency (about 21.5 $C_6$/1000C). The [α-olefin/ethylene]$^A$ weight ratio of Example 11 was 72.7% lower (improved) relative to the [α-olefin/ethylene]$^C$ of Comparative 11s. In addition, the weight average molecular weight of Example 11 ($M_w{}^A$) was 199% higher (improved), relative to the weight average molecular weight of Comparative 11s ($M_w{}^C$), as shown in Table 9.

Table 10 summarizes solution polymerization process data at higher and lower reactor temperatures, relative to Table 9. For example, at 190° C. reactor temperature, Example 12 can be compared with simulated Comparative 12s. The [α-olefin/ethylene]$^A$ weight ratio of Example 12 was 90.8% lower (improved) relative to the [α-olefin/ethylene]$^C$ weight ratio of Comparative 12s. In addition, the weight average molecular weight of Example 12 ($M_w{}^A$) was 70.4% higher (improved), relative to the weight average molecular weight of Comparative 12s ($M_w{}^C$), as shown in Table 10.

In Table 10, Example 13 can be compared with simulated Comparative 13s, both at reactor temperatures of 143° C. The [α-olefin/ethylene]$^A$ weight ratio of Example 13 was 88.9% lower (improved) relative to the [α-olefin/ethylene]$^C$ of Comparative 13s and the weight average molecular weight of Example 13 ($M_w{}^A$) was 182% higher (improved) relative to the weight average molecular weight of Comparative 13s ($M_w$c).

Continuous Polymerization Unit (CPU)

Small scale continuous solution polymerizations were conducted on a Continuous Polymerization Unit, hereinafter CPU. These experiments compare the performance of the bridged metallocene catalyst formulation (containing component A, CpF-1) with the unbridged single site catalyst formulation (containing component C, PIC-1) in one reactor.

The single reactor of the CPU was a 71.5 mL continuously stirred CSTR, polymerizations were conducted at 160° C. and the reactor pressure was about 10.5 MPa. The CPU included a 20 mL upstream mixing chamber that was operated at a temperature that was 5° C. lower than the downstream polymerization reactor. The upstream mixing chamber was used to pre-heat the ethylene, optional α-olefin and a portion of the process solvent. Catalyst feeds and the remaining solvent were added directly to the polymerization reactor as a continuous process. The total flow rate to the polymerization reactor was held constant at 27 mL/minute. The components of the bridged metallocene catalyst formulation (component A, component M, component B and component P) were added directly to the polymerization reactor to maintain the continuous polymerization process. More specifically: component A and component B were premixed in xylene and injected directly into the reactor; and component M and optionally component P were premixed in process solvent and injected directly into the reactor. In the comparative experiments, the components of the unbridged single site catalyst formulation (component C, component M, component B and component P) were added directly to the polymerization reactor to maintain the continuous polymerization process. More specifically: component C and component B were premixed in xylene and injected directly into the reactor; and component M and optionally component P were premixed in process solvent and injected directly into the reactor. In the examples, the component A employed was CpF-1 [$(2,7\text{-}tBu_2Flu)Ph_2C(Cp)HfCl_2$]. In the comparatives, the component C employed was PIC-1 ([$Cp[(t\text{-}Bu)_3PN]TiCl_2$]). Components M, B and P were methylaluminoxane (MMAO-07), trityl tetrakis(pentafluoro-phenyl)borate, and 2,6-di-tert-butyl-4-ethylphenol, respectively. Upon injection, the catalyst was activated in situ (in the polymerization reactor) in the presence of ethylene and optional α-olefin comonomer. Component M was added such that the mole ratio of ([M]/[A]) or ([M]/[C]) was about 80; component B was added such that the mole ratio of ([M]/[A]) or ([M]/[C]) was about 1.0; and component P was added such that the mole ratio of ([P]/[M]) was about 0.4.

Ethylene was supplied to the reactor by a calibrated thermal mass flow meter and was dissolved in the reaction solvent prior to the polymerization reactor. Optional α-olefin (comonomer, i.e. 1-octene) was premixed with ethylene before entering the polymerization reactor, the (1-octene)/(ethylene) weight ratio varied from 0 to about 6.0. Ethylene was fed to the reactor such that the ethylene concentration in the reactor varied from about 7 to about 15 weight %; where weight % is the weight of ethylene divided by the total weight of the reactor contents. The internal reaction temperature was monitored by a thermocouple in the polymerization medium and was controlled at the target set point to ±0.5° C. Solvent, monomer, and comonomer streams were all purified by the CPU systems prior to entering the reactor.

The ethylene conversion, $Q^{CPU}$, i.e. the fraction of ethylene converted was determined by an online gas chromatograph (GC) and polymerization activity, $K_p{}^{CPU}$, having dimensions of [L/(mmol-min)] was defined as:

$$K_p^{CPU} = Q^{CPU}\left(\frac{1 - Q^{CPU}}{[\text{catalyst}] \times HUT^{CPU}}\right)$$

where $HUT^{CPU}$ was a reciprocal space velocity (Hold Up Time) in the polymerization reactor having dimensions of minutes (min); and [catalyst] was the concentration of catalyst in the polymerization reactor expressed in mmol/L of titanium or hafnium. In CPU experiments, $Q^{CPU}$ was held constant at about 90% and the $HUT^{CPU}$ was held constant at about 2.5 minutes. Downstream of the reactor the pressure was reduced to atmospheric pressure. The ethylene interpolymer product was recovered as a slurry in the process solvent and subsequently dried by evaporation in a vacuum oven prior to characterization.

CPU conditions were adjusted to synthesize ethylene interpolymer products at approximately constant melt index and density; more specifically, an ethylene interpolymer product was synthesized using the bridged metallocene catalyst formulation and a comparative ethylene interpolymer product was synthesized using the unbridged single site catalyst formulation. As shown by each row in Table 11, the '% Improved $M_w$' was at least 10% when one compares the $M_w{}^A$ of the ethylene interpolymer product produced with the bridged metallocene catalyst formulation and the $M_w{}^C$ of the comparative ethylene interpolymer product produced with the unbridged single site catalyst formulation.

As shown in Table 12, the reactor's (α-olefin/ethylene) weight ratio had to be adjusted such that ethylene interpolymer products were produced at target density. To be more clear, using the bridged metallocene catalyst formulation an (α-olefin/ethylene)$^A$ was required to synthesize an ethylene interpolymer product at target density; and using the unbridged single site catalyst formulation an (α-olefin/ethylene)$^C$ was required to synthesize a comparative ethylene interpolymer product at target density. As shown by each row in Table 12 the bridged metallocene catalyst formulation allows the operation of the continuous solution polymerization process at an improved (reduced) (α-olefin/ethylene) weight ratio relative to the control unbridged single site catalyst formulation, i.e. the % Reduced [α-olefin/ethylene] weight ratio was at least −70%.

Ethylene interpolymer product Example 20 was also produced on the CPU described above. Example 20 demonstrates the ability of the bridged metallocene catalyst formulation containing CpF-2 ((2,7-$tBu_2$Flu)$Ph_2$C(Cp)$HfMe_2$) to produce a low density product that was elastomeric in nature, i.e. Example 20 was characterized as follows: 0.8567 g/cc, 72.9 BrF $C_6$/1000C, 14.6 mole percent 1-octene and 40.6 weight percent 1-octene.

Monolayer Films

Monolayer blown film samples of ethylene interpolymer product Examples 20 through 27 were prepared and the average film properties of these eight films are shown in Table 13. A monolayer blown film was also prepared from Comparative Example 1, having the same density (0.905 g/cc) as Examples 20-27. Table 13 demonstrates an advantage of Example 20-27 films relative to the film prepared from Comparative Example 1; specifically a 15% improvement in Elmendorf machine direction (MD) tear strength, i.e. 162 relative to 137 g/mil, respectively, and a 13% improvement in transverse direction (TD) tear, i.e. 311 relative to 270 g/mil, respectively. It is well-known in the packaging industry that there is a need for films having higher tear strength, e.g. to maintain the integrity of the package.

Table 13 monolayer blown films were produced on a Gloucester extruder, 2.5 inch (6.45 cm) barrel diameter, 24/1 L/D (barrel Length/barrel Diameter) equipped with: a barrier screw; a low pressure 4 inch (10.16 cm) diameter die with a 35 mil (0.089 cm) die gap, and; a Western Polymer Air ring. The extruder was equipped with the following screen pack: 20/40/60/80/20 mesh. Blown films having a thickness of 1.0 mil (25.4 μm) were produced at a constant output rate of 100 lb/hr (45.4 kg/hr) by adjusting extruder screw speed; and the frost line height (FLH) was maintained from 16 to 18 inch (40.64 to 45.72 cm) by adjusting the cooling air. At 100 lb/hr the average Gloucester extrusion pressure of Examples 20-27 was 3205 psi; advantageously, this extrusion pressure (3205 psi) was lower relative to Comparative 3 (4585 psi) and Comparative R (3465 psi). At 100 lb/hr the average amperage required to extrude Examples 20-27 on the Gloucester extruder was 30.9 Amp; which was lower relative to Comparative 3 (43.2 Amp) and Comparative R (35.4 Amp).

Desirable film physical properties include film optical properties, e.g. low film haze. Optical properties are important when a consumer purchases an item packaged in a polyethylene film. Elaborating, a film's optical properties correlate with the consumer's perception of product quality. Given Table 13, it was evident that the average haze of Examples 20-27 films were 19% lower (improved), relative to Comparative Example 1.

Additional blown film physical properties are summarized in Table 13.

TABLE 1

FTIR Unsaturation in Ethylene Interpolymer Product Examples 20-27, Relative to Comparatives and the Unsaturation Ratio UR

| Sample | Internal Unsat/ 100 C | Side Chain Unsat/ 100 C | Term Unsat/ 100 C | Total Unsat/ 100 C | UR = $(SC^U - T^U)/T^U$ |
|---|---|---|---|---|---|
| Example 20 | 0.014 | 0.010 | 0.009 | 0.033 | 0.111 |
| Example 21 | 0.013 | 0.010 | 0.009 | 0.032 | 0.111 |
| Example 22 | 0.014 | 0.011 | 0.008 | 0.033 | 0.375 |
| Example 23 | 0.013 | 0.009 | 0.008 | 0.030 | 0.125 |
| Example 24 | 0.013 | 0.010 | 0.009 | 0.032 | 0.111 |
| Example 25 | 0.013 | 0.010 | 0.009 | 0.032 | 0.111 |
| Example 26 | 0.013 | 0.009 | 0.008 | 0.030 | 0.125 |
| Example 27 | 0.012 | 0.009 | 0.008 | 0.029 | 0.125 |
| Comp Q1 | 0.014 | 0.012 | 0.011 | 0.037 | 0.091 |
| Comp Q2 | 0.017 | 0.016 | 0.015 | 0.048 | 0.067 |
| Comp Q3 | 0.015 | 0.013 | 0.012 | 0.040 | 0.083 |
| Comp Q4 | 0.013 | 0.011 | 0.010 | 0.034 | 0.100 |
| Comp R[a] | 0.0133 | 0.0140 | 0.0057 | 0.0330 | 1.349 |
| Comp S[b] | 0.0056 | 0.0034 | 0.0028 | 0.0118 | 0.1833 |
| Comp. 1[c] | 0.0209 | 0.0031 | 0.0056 | 0.0296 | −0.4374 |
| Comp 2[d] | 0.0133 | 0.0027 | 0.0053 | 0.0213 | −0.5000 |
| Comp T[e] | 0.0029 | 0.0031 | 0.0091 | 0.0152 | −0.6600 |
| Comp U | 0.003 | 0.002 | 0.006 | 0.011 | −0.667 |
| Comp 3[f] | 0.0050 | 0.0045 | 0.0333 | 0.0428 | −0.8548 |
| Comp 4[g] | 0.0071 | 0.0043 | 0.0320 | 0.0434 | −0.8633 |
| Comp 5[h] | 0.0050 | 0.0065 | 0.0492 | 0.0607 | −0.8687 |
| Comp V[i] | 0.0046 | 0.0032 | 0.0254 | 0.0332 | −0.8737 |
| Comp. Example 1 | 0.011 | 0.006 | 0.008 | 0.025 | −0.25 |
| Comp. Example 2 | 0.011 | 0.006 | 0.007 | 0.024 | −0.14 |
| Comp. Example 4 | 0.025 | 0.018 | 0.019 | 0.062 | −0.05 |

[a]Average of 7 samples of Comparative R (AFFINITY)
[b]Average of 9 samples of Comparative S (ENABLE)
[c]Average of 61 samples of Comparative 1
[d]Average of 3 samples of Comparative 2
[e]Average of 48 samples of Comparative T (EXCEED)
[f]Average of 4 samples of Comparative 3
[g]Average of 21 samples of Comparative 4
[h]Average of 137 samples of Comparative 5
[i]Average of 25 samples of Comparative V (ELITE)

TABLE 2

Melt Flow Distribution Function of Ethylene Interpolymer Product Examples 20-27, Relative to Comparatives Q1-Q4, W1 and W2 and Comparative Examples 1 and 2; as well as the First Derivate of the Melt Flow Distribution at a Loading of 4000 g.

| Sample | $\beta_2$ | $\beta_1$ | $\beta_0$ | $\frac{d\text{Log}(1/I_n)}{d\text{Log(loading)}}$ at loading of 4000 g |
|---|---|---|---|---|
| Example 20 | −3.52201E−01 | 1.00550E+00 | 6.47766E−01 | −1.532 |
| Example 21 | −3.50732E−01 | 9.92965E−01 | 6.94986E−01 | −1.534 |
| Example 22 | −3.67294E−01 | 1.11661E+00 | 4.74673E−01 | −1.529 |
| Example 23 | −3.07243E−01 | 6.82761E−01 | 1.20881E+00 | −1.531 |
| Example 24 | −3.40202E−01 | 9.05414E−01 | 8.59063E−01 | −1.545 |
| Example 25 | −3.68023E−01 | 1.11728E+00 | 4.55541E−01 | −1.534 |
| Example 26 | −3.27055E−01 | 8.05477E−01 | 1.06864E+00 | −1.551 |
| Example 27 | −3.33431E−01 | 8.89650E−01 | 8.27696E−01 | −1.512 |

TABLE 2-continued

Melt Flow Distribution Function of Ethylene Interpolymer Product Examples 20-27, Relative to Comparatives Q1-Q4, W1 and W2 and Comparative Examples 1 and 2; as well as the First Derivate of the Melt Flow Distribution at a Loading of 4000 g.

| Sample | $\beta_2$ | $\beta_1$ | $\beta_0$ | $\frac{d\text{Log}(1/I_n)}{d\text{Log(loading)}}$ at loading of 4000 g |
|---|---|---|---|---|
| Comp Q1 | −1.90851E−01 | −5.67000E−02 | 2.26191E+00 | −1.432 |
| Comp Q2 | −2.28791E−01 | 1.86069E−01 | 1.86579E+00 | −1.462 |
| Comp Q3 | −1.90378E−01 | −2.57007E−02 | 1.70688E+00 | −1.397 |
| Comp Q4 | −1.97818E−01 | −4.05339E−02 | 2.28127E+00 | −1.466 |
| Comp W1 | −1.89139E−01 | −1.39178E−01 | 2.53413E+00 | −1.502 |
| Comp W2 | −1.99323E−01 | −4.14422E−03 | 2.16980E+00 | −1.440 |
| Comp. Example 1 | −3.51283E−01 | 9.30829E−01 | 8.43714E−01 | −1.600 |
| Comp. Example 2 | −2.55568E−01 | 3.20894E−01 | 1.72510E+00 | −1.520 |

TABLE 3A

Melt Flow-Intrinsic Viscosity Index (MFIVI) Values of Reference Resins (Linear Ethylene Polymers) Having Undetectable Levels of Long Chain Branching (LCB).

| Reference Resins | Mv (g/mole) | IV (dL/g) | $M_w/M_n$ | Comonomer wt. % | $I_f$ (dg/min) | $C_f$ | MFIVI (—)* |
|---|---|---|---|---|---|---|---|
| Resin 1 | 1.02E+05 | 1.596 | 2.03 | 7.91 | 1.898 | −1.105 | 0.015 |
| Resin 2 | 1.06E+05 | 1.659 | 2.29 | 7.10 | 1.795 | −1.105 | −0.029 |
| Resin 3 | 9.32E+04 | 1.503 | 2.05 | 6.50 | 2.609 | −1.107 | 0.017 |
| Resin 4 | 6.36E+04 | 1.141 | 2.11 | 5.79 | 9.659 | −1.120 | 0.014 |
| Resin 5 | 6.44E+04 | 1.134 | 2.17 | 7.70 | 9.164 | −1.100 | 0.001 |
| Resin 6 | 6.50E+04 | 1.116 | 2.12 | 9.61 | 9.384 | −1.107 | 0.004 |
| Resin 7 | 6.61E+04 | 1.097 | 2.08 | 12.58 | 9.771 | −1.121 | −0.003 |
| Resin 8 | 6.72E+04 | 1.089 | 2.09 | 15.12 | 9.318 | −1.124 | −0.005 |
| Resin 9 | 1.01E+05 | 1.577 | 2.22 | 8.26 | 2.103 | −1.129 | −0.004 |
| Resin 10 | 1.04E+05 | 1.590 | 2.26 | 10.26 | 1.944 | −1.128 | −0.016 |
| Resin 11 | 6.40E+04 | 1.194 | 2.11 | 0.35 | 10.464 | −1.137 | 0.003 |
| Resin 12 | 6.59E+04 | 1.212 | 2.19 | 0.00 | 9.677 | −1.157 | 0.009 |
| Resin 13 | 9.47E+04 | 1.493 | 2.20 | 8.13 | 2.623 | −1.137 | 0.008 |
| Resin 14 | 6.26E+04 | 1.151 | 2.16 | 2.97 | 10.670 | −1.134 | 0.008 |
| Resin 15 | 7.33E+04 | 1.297 | 2.87 | 2.97 | 5.773 | −1.202 | −0.005 |
| Resin 16 | 1.14E+05 | 1.639 | 3.08 | 9.54 | 1.651 | −1.217 | −0.029 |
| Resin 17 | 6.34E+04 | 1.151 | 2.65 | 3.32 | 10.366 | −1.230 | 0.015 |
| Resin 18 | 6.69E+04 | 1.128 | 2.74 | 10.39 | 8.980 | −1.219 | −0.004 |
| Resin 19 | 1.14E+05 | 1.598 | 3.21 | 12.22 | 1.693 | −1.240 | −0.030 |
| Resin 20 | 6.87E+04 | 1.155 | 2.76 | 10.46 | 8.230 | −1.226 | −0.007 |
| Resin 21 | 1.06E+05 | 1.516 | 3.65 | 10.95 | 1.928 | −1.233 | −0.025 |
| Resin 22 | 9.03E+04 | 1.333 | 3.41 | 7.28 | 4.313 | −1.268 | −0.012 |
| Resin 23 | 6.91E+04 | 1.236 | 3.00 | 2.47 | 7.306 | −1.283 | 0.026 |
| Resin 24 | 8.83E+04 | 1.281 | 3.54 | 9.68 | 4.722 | −1.274 | −0.018 |
| Resin 25 | 1.09E+05 | 1.657 | 3.59 | 5.94 | 1.595 | −1.302 | 0.006 |
| Resin 26 | 1.11E+05 | 1.667 | 3.26 | 9.33 | 1.277 | −1.269 | 0.026 |
| Resin 27 | 1.10E+05 | 1.656 | 3.35 | 9.61 | 1.283 | −1.270 | 0.024 |
| Resin 28 | 1.01E+05 | 1.545 | 3.78 | 9.33 | 2.112 | −1.321 | −0.014 |
| Resin 29 | 1.06E+05 | 1.546 | 3.85 | 9.11 | 2.093 | 1.324 | −0.016 |
| Resin 30 | 8.61E+04 | 1.420 | 3.72 | 7.28 | 2.819 | −1.288 | 0.014 |
| Resin 31 | 1.10E+05 | 1.561 | 4.11 | 13.42 | 1.821 | −1.349 | −0.031 |
| Resin 32 | 1.11E+05 | 1.629 | 3.93 | 7.98 | 1.511 | −1.384 | 0.038 |
| Resin 33 | 9.45E+04 | 1.468 | 3.83 | 10.60 | 2.067 | −1.290 | 0.015 |
| Resin 34 | 9.50E+04 | 1.485 | 3.84 | 10.32 | 2.033 | −1.282 | 0.006 |
| Resin 35 | 8.02E+04 | 1.393 | 3.82 | 1.91 | 3.793 | −1.366 | 0.043 |
| Resin 36 | 1.16E+05 | 1.846 | 10.72 | 0.46 | 1.362 | −1.786 | −0.021 |
| Resin 37 | 1.08E+05 | 1.737 | 13.47 | 0.00 | 1.760 | −1.929 | 0.008 |
| Resin 38 | 5.42E+04 | 1.059 | 5.91 | 0.64 | 11.365 | −1.279 | −0.042 |
| Resin 39 | 5.32E+04 | 1.026 | 5.00 | 1.13 | 13.851 | −1.326 | −0.001 |
| Resin 40 | 7.61E+04 | 1.349 | 8.06 | 0.57 | 2.618 | −1.384 | 0.020 |
| Resin 41 | 7.89E+04 | 1.394 | 7.98 | 1.48 | 2.224 | −1.343 | −0.002 |
| Resin 42 | 6.79E+04 | 1.065 | 2.14 | 18.72 | 9.852 | −1.119 | 0.001 |
| Resin 43 | 6.59E+04 | 0.995 | 1.97 | 24.43 | 14.174 | −1.118 | 0.008 |
| Resin 44 | 5.64E+04 | 0.819 | 1.97 | 31.94 | 35.208 | −1.149 | 0.016 |
| Resin 45 | 5.04E+04 | 0.692 | 1.97 | 39.79 | 92.253 | −1.210 | −0.008 |

*dimensionless

TABLE 3B

Melt Flow-Intrinsic Viscosity Index (MFIVI) Values of Ethylene Interpolymer Product Examples 20-27, Relative to Comparatives 1a, Q1, Q3, Q4, W1 andW2 and Comparative Examples 1 and 2.

| Sample | $M_v$ (g/mole) | IV (dL/g) | $M_w/M_n$ | Comonomer (wt. %) | $I_f$ (dg/min) | $C_f$ | MFIVI (—)* |
|---|---|---|---|---|---|---|---|
| Example 20 | 93600 | 1.270 | 3.17 | 16.75 | 1.996 | 1.532 | 0.315 |
| Example 21 | 92000 | 1.260 | 3.22 | 16.53 | 1.901 | −1.534 | 0.336 |
| Example 22 | 92400 | 1.270 | 3.19 | 16.53 | 1.857 | −1.529 | 0.333 |
| Example 23 | 90300 | 1.260 | 3.07 | 14.84 | 2.081 | −1.531 | 0.322 |
| Example 24 | 91600 | 1.260 | 3.29 | 15.47 | 1.966 | −1.545 | 0.327 |
| Example 25 | 90900 | 1.260 | 3.25 | 15.69 | 1.972 | −1.534 | 0.324 |
| Example 26 | 91400 | 1.270 | 3.26 | 14.84 | 1.877 | −1.551 | 0.338 |
| Example 27 | 87700 | 1.260 | 3.12 | 13.35 | 1.968 | −1.512 | 0.342 |
| Comp 1a | 99100 | 1.539 | 3.09 | 9.89 | 1.887 | 1.287 | 0.037 |
| Comp. Q1 | 83916 | 1.234 | 2.00 | 17.17 | 2.622 | −1.432 | 0.348 |
| Comp. Q3 | 65795 | 1.035 | 2.13 | 17.38 | 7.175 | −1.439 | 0.255 |
| Comp Q4 | 78793 | 1.207 | 2.16 | 13.14 | 2.700 | −1.466 | 0.387 |
| Comp W1 | n/a | n/a | n/a | 16.11 | 2.638 | 1.502 | n/a |
| Comp W2 | n/a | n/a | n/a | 17.38 | 2.700 | −1.440 | n/a |
| Comp R1 | 89431 | 1.314 | 1.8 | 16.46 | 2.387 | −1.396 | 0.298 |
| Comp S1 | 93207 | 1.464 | 2.6 | 7.04 | 1.319 | 1.536 | 0.403 |
| Comp S2 | 103339 | 1.588 | 2.85 | 4.2 | 0.791 | −1.72 | 0.582 |
| Comp U | 98451 | 1.405 | 2.18 | 10.39 | 1.867 | −1.354 | 0.249 |
| Comp V2a | 101762 | 1.488 | 2.85 | 9.68 | 1.995 | −1.339 | 0.102 |
| Comp V2b | 10425 | 1.507 | 2.79 | 9.96 | 1.983 | −1.354 | 0.099 |
| Comp T | 107101 | 1.681 | 1.91 | 7.1 | 1.795 | −1.105 | −0.005 |
| Comp. Example 1 | 91070 | 1.286 | 3.32 | 16.53 | 2.297 | −1.6 | 0.293 |
| Comp. Example 2 | 86540 | 1.245 | 2.51 | 14.77 | 2.723 | −1.52 | 0.313 |

*dimensionless

TABLE 4

Neutron Activation Analysis (NAA), Catalyst Residues in Ethylene Interpolymer Product Examples 21, 23 and 26, relative to Comparatives.

| Sample | Hf (ppm) | Ti (ppm) |
|---|---|---|
| Example 21 | 1.57 | n.d. |
| Example 23 | 1.32 | n.d. |
| Example 26 | 1.49 | n.d. |
| Comparative Q1 | 0.28 | n.d. |
| Comparative Q2 | 0.34 | n.d. |
| Comparative Q3 | 0.24 | n.d. |
| Comparative Q4 | 0.24 | n.d. |
| Comparative R[a] | n.d. | 0.33 ± 0.01 |
| Comparative S[b] | n.d. | 0.14 |
| Comparative U[e] | n.d. | 0.73 |
| Comparative V[i] | n.d. | 1.5 ± 0.06 |
| Comparative 1[c] | n.d. | 0.30 ± 0.06 |
| Comparative 2[d] | 0.58 ± 0.07 | 0.17 ± 0.06 |
| Comparative 3[f] | 0.52 ± 0.03 | 6.34 ± 2.98 |

TABLE 4-continued

Neutron Activation Analysis (NAA), Catalyst Residues in Ethylene Interpolymer Product Examples 21, 23 and 26, relative to Comparatives.

| Sample | Hf (ppm) | Ti (ppm) |
|---|---|---|
| Comparative 4[g] | n.d. | 6.78 ± 1.26 |
| Comparative 5[h] | n.d. | 7.14 ± 1.22 |
| Comp. Example 1 | 1.76 | n.d. |
| Comp. Example 2 | 1.98 | n.d. |

[a]Comparative R, averages of AFFINITY
[b]Comparative S (ENABLE B120)
[c]Comparative 1, NOVA Chemicals database average
[d]Comparative 2, NOVA Chemicals database average
[e]Comparative U (ELITE AT 6202)
[f]Comparative 3, NOVA Chemicals database average
[g]Comparative 4, NOVA Chemicals database average
[h]Comparative 5, NOVA Chemicals database average
[i]Comparative V, average (ELITE)

TABLE 5A

Continuous Solution Process Parameters: Example 20, 22 and 26; Relative to Comparatives Examples 1 and 2.

| Sample | Example 20 | Example 22 | Example 26 | Comp. Example 1 | Comp. Example 2 |
|---|---|---|---|---|---|
| Reactor Mode | Series | Series | Series | Series | Series |
| R1 Catalyst[a] | CpF-2 | CpF-2 | CpF-2 | CpF-2 | CpF-2 |
| R2 Catalyst | CpF-2 | CpF-2 | CpF-2 | CpF-2 | CpF-2 |
| R1 catalyst (ppm) | 0.43 | 0.42 | 0.40 | 0.85 | 1.02 |
| R1 ([M[b]]/[A]) mole ratio | 75 | 75 | 75 | 50 | 50 |
| R1 ([P[c]]/[M]) mole ratio | 0.4 | 0.4 | 0.4 | 0.4 | 0.4 |
| R1 ([B[d]]/[A]) mole ratio | 1.2 | 1.2 | 1.2 | 1.2 | 1.2 |
| R2 catalyst (ppm) | 0.57 | 0.58 | 0.52 | 0.60 | 0.57 |
| R2 ([M]/[A]) mole ratio | 50 | 50 | 50 | 31 | 31 |
| R2 ([P]/[M]) mole ratio | 0.4 | 0.4 | 0.4 | 0.4 | 0.4 |
| R2 ([B]/[A]) mole ratio | 1.20 | 1.20 | 1.20 | 1.2 | 1.2 |
| R3 volume (L) | 1131 | 1131 | 1131 | 2.1 | 2.1 |
| $ES^{R1}$ (%) | 38 | 38 | 38 | 38 | 38 |

TABLE 5A-continued

Continuous Solution Process Parameters: Example 20, 22 and 26; Relative to Comparatives Examples 1 and 2.

| Sample | Example 20 | Example 22 | Example 26 | Comp. Example 1 | Comp. Example 2 |
|---|---|---|---|---|---|
| $ES^{R2}$ (%) | 62 | 62 | 62 | 62 | 62 |
| $ES^{R3}$ (%) | 0 | 0 | 0 | 0 | 0 |
| R1 ethylene concentration (wt. %) | 9.8 | 9.8 | 10.3 | 9.9 | 10.8 |
| R2 ethylene concentration (wt. %) | 12.9 | 12.9 | 13.2 | 12.6 | 12.3 |
| $((1\text{-octene})/(\text{ethylene}))^{R1}$ (wt. fraction) | 0.33 | 0.33 | 0.32 | 0.30 | 0.37 |
| $((1\text{-octene})/(\text{ethylene}))^{R2}$ (wt. fraction) Fresh Feed | 0.32 | 0.31 | 0.31 | 0.46 | 0.37 |
| (1-octene/ethylene) (wt. fraction, total) | 0.324 | 0.316 | 0.280 | 0.324 | 0.263 |
| Prod. Rate (Mg/h) | 47.9 | 47.8 | 47.8 | 0.072 | 0.070 |

[a] $[(2,7\text{-}tBu_2Flu)Ph_2C(Cp)HfMe_2]$
[b] methylaluminoxane (MMAO-7)
[c] 2,6-di-tert-butyl-4-ethylphenol
[d] trityl tetrakis(pentafluoro-phenyl)borate

TABLE 5B

Continuous Solution Process Parameters: Example 20, 22 and 26; Relative to Comparatives Examples 1 and 2.

| Sample | Example 20 | Example 22 | Example 26 | Comp. Example 1 | Comp. Example 2 |
|---|---|---|---|---|---|
| R1 total solution rate (Mg/h) | 170.7 | 171.4 | 167.3 | 0.266 | 0.238 |
| R2 total solution rate (Mg/h) | 344.7 | 344.7 | 344.6 | 0.284 | 0.312 |
| R3 solution rate (Mg/h) | 349.9 | 350.1 | 349.9 | 0.015 | 0.015 |
| Total solution rate (Mg/h)[a] | 349.9 | 350.1 | 349.9 | 0.550 | 0.550 |
| $OS^{R1}$ (%) | 39 | 39 | 39 | 74.8 | 71.3 |
| $OS^{R2}$ (%) | 61 | 61 | 61 | 25.2 | 28.7 |
| $OS^{R3}$ (%) | 0 | 0 | 0 | 0 | 0 |
| $H_2^{R1}$ (ppm) | 4.00 | 4.00 | 4.00 | 2.75 | 2.75 |
| $H_2^{R2}$ (ppm) | 6.33 | 6.01 | 7.49 | 16.0 | 12.0 |
| $H_2^{R3}$ (ppm) | 0.00 | 0.00 | 0.00 | 0 | 0 |
| R1 feed inlet temp (° C.) | 30.0 | 30.0 | 30.0 | 30 | 30 |
| R2 feed inlet temp (° C.) | 30.0 | 30.0 | 30.0 | 30 | 30 |
| R3 feed inlet temp(° C.) | 213.6 | 213.7 | 213.4 | 130 | 130 |
| R1 catalyst inlet temp (° C.) | 20-40 | 20-40 | 20-40 | 21 | 25 |
| R2 catalyst inlet temp (° C.) | 20-40 | 20-40 | 20-40 | 36 | 39 |
| R1 Mean temp (° C.) | 141.2 | 140.9 | 144.9 | 140 | 150 |
| R2 Mean temp (° C.) | 184.0 | 183.9 | 186.0 | 180 | 180 |
| R3 exit temp (° C.) | 193.3 | 193.3 | 195.3 | 182 | 183 |
| $Q^{R1}$ (%) | 79.1 | 79.0 | 79.0 | 80 | 80 |
| $Q^{R2}$ (%) | 84.9 | 84.9 | 85.0 | 80 | 80 |
| $Q^{T}$ (%) | 91.7 | 91.6 | 91.7 | n/a | n/a |

[a] Total solution rate (Mg/h) = (R1 (Mg/hr) + R2 (Mg/hr) + R3 (Mg/h))

TABLE 6A

Characterization of Ethylene Interpolymer Products Examples 20-27.

| Sample | Ex. 20 | Ex. 21 | Ex. 22 | Ex. 23 | Ex. 24 | Ex. 25 | Ex. 26 | Ex. 27 |
|---|---|---|---|---|---|---|---|---|
| Density (g/cc) | 0.9043 | 0.9044 | 0.9046 | 0.9076 | 0.9065 | 0.9060 | 0.9077 | 0.9105 |
| $I_2$ (dg/min) | 0.84 | 0.79 | 0.78 | 0.87 | 0.82 | 0.83 | 0.76 | 0.84 |
| S. Ex. | 1.52 | 1.53 | 1.53 | 1.52 | 1.53 | 1.53 | 1.55 | 1.50 |
| $I_{21}/I_2$ | 49.2 | 49.6 | 49.9 | 46.7 | 49.7 | 50.0 | 51.0 | 45.9 |
| $M_w$ | 95513 | 95257 | 95989 | 93720 | 98937 | 94237 | 96188 | 93963 |
| $M_w/M_n$ | 2.86 | 2.73 | 2.86 | 2.76 | 3.19 | 3.21 | 3.04 | 2.92 |
| $M_z/M_w$ | 2.39 | 2.38 | 2.38 | 2.26 | 2.55 | 2.46 | 2.56 | 2.40 |
| BrF $C_6$/1000 C. | 23.70 | 23.40 | 23.40 | 21.00 | 21.90 | 22.20 | 21.00 | 18.90 |

TABLE 6A-continued

Characterization of Ethylene Interpolymer Products Examples 20-27.

| Sample | Ex. 20 | Ex. 21 | Ex. 22 | Ex. 23 | Ex. 24 | Ex. 25 | Ex. 26 | Ex. 27 |
|---|---|---|---|---|---|---|---|---|
| Mol % α-olefin | 4.7 | 4.7 | 4.7 | 4.2 | 4.4 | 4.4 | 4.2 | 3.8 |
| $CDBI_{50}$ | 89.8 | 90.0 | 89.4 | 90.7 | 90.5 | 90.1 | 89.3 | 87.1 |
| FAE (kJ/mol) | 48.0 | 48.0 | 47.9 | 49.5 | 47.8 | 47.7 | 48.3 | 48.4 |
| τ ($s^{-1}$) | 0.393 | 0.374 | 0.376 | 0.413 | 0.359 | 0.367 | 0.297 | 0.357 |

TABLE 6B

Characterization of Comparative Ethylene Interpolymer Products.

| Sample | Comp 1a | Comp 2a | Comp 3a | Comp 4a | Comp 5a | Comp Ex. 1 | Comp. Ex. 2 |
|---|---|---|---|---|---|---|---|
| Density (g/cc) | 0.9162 | 0.9172 | 0.917 | 0.9124 | 0.9188 | 0.9045 | 0.9069 |
| $I_2$ (dg/min) | 0.99 | 1.06 | 0.7 | 0.92 | 0.96 | 0.93 | 1.1 |
| S. Ex. | 1.27 | 1.45 | 1.4 | 1.24 | 1.34 | 1.58 | 1.52 |
| $I_{21}/I_2$ | 30.8 | 41.9 | 34.8 | 23.3 | 32.4 | 57 | 43.5 |
| $M_w$ | 102603 | 96238 | 106261 | 107517 | 110365 | 91509 | 90425 |
| $M_w/M_n$ | 3.08 | 2.65 | 2.99 | 2.51 | 3.65 | 3.32 | 2.51 |
| $M_z/M_w$ | 2.32 | 2.14 | 2.05 | 2.14 | 3.16 | 2.69 | 2.44 |
| BrF $C_6$/1000 C. | 14.6 | 15.8 | 16.7 | 18.1 | 12.9 | 23.4 | 20.9 |
| Mol % α-olefin | 2.9 | 3.2 | 3.3 | 3.6 | 2.6 | 4.7 | 4.2 |
| $CDBI_{50}$ | 77.5 | 6.6 | 49.8 | 59.7 | 56.1 | 89.3 | 92.4 |
| FAE (kJ/mol) | 32.85 | n/a | n/a | 32.46 | 30.46 | 48.34 | 54.38 |
| MS (cN) | 2.78 | 3.29 | 5.26 | 7.7 | 6.46 | 4.56 | 3.82 |
| τ ($s^{-1}$) | 12.9 | n/a | 0.467 | 8.37 | 3.09 | 0.245 | 0.387 |

TABLE 6C

Characterization of Comparative Ethylene Interpolymer Products.

| Sample | Comp Q1 | Comp Q2 | Comp Q3 | Comp Q4 | Comp R1 | Comp S1 |
|---|---|---|---|---|---|---|
| Density (g/cc) | 0.9006 | 0.8827 | 0.9013 | 0.9093 | 0.9012 | 0.9205 |
| $I_2$ (dg/min) | 1.12 | 1.13 | 3.04 | 1.14 | 1.03 | 0.52 |
| S. Ex. | 1.45 | 1.47 | 1.4 | 1.48 | 1.41 | 1.56 |
| $I_{21}/I_2$ | 33.4 | 37.5 | 31.4 | 36.1 | 30 | 39.6 |
| $M_w$ | 83303 | 93355 | 68628 | 82272 | 83474 | 93531 |
| $M_w/M_n$ | 2 | 1.93 | 2.13 | 2.16 | 1.79 | 2.74 |
| $M_z/M_w$ | 1.71 | 1.7 | 1.77 | 1.82 | 1.63 | 1.91 |
| BrF $C_6$/1000 C. | 24.3 | 38.5 | 24.6 | 18.6 | 23.3 | 10.9 |
| Mol % α-olefin | 4.9 | 7.7 | 4.9 | 3.7 | 4.7 | 2.2 |
| $CDBI_{50}$ | 92.1 | 97.6 | 89.4 | 86.7 | 89.2 | 88 |
| FAE (kJ/mol) | 57.12 | 54.68 | 50.67 | 60.64 | 56.60 | 56.82 |
| MS (cN) | 3.64 | 3.69 | 1.75 | 3.71 | n/a | n/a |
| τ ($s^{-1}$) | 0.745 | 0.714 | 6.89 | 0.565 | 0.340 | 0.020 |

TABLE 6C

| Continued: Characterization of Comparative Ethylene Interpolymer Products. | | | |
|---|---|---|---|
| Sample | Comp T1 | Comp U1 | Comp V1 |
| Density (g/cc) | 0.9187 | 0.9081 | 0.9179 |
| $I_2$ (dg/min) | 0.94 | 0.86 | 1.02 |
| S. Ex. | 1.11 | 1.34 | 1.33 |
| $I_{21}/I_2$ | 15.8 | 30 | 30.2 |
| $M_w$ | 110641 | 94385 | 98469 |
| $M_w/M_n$ | 2.18 | 2.18 | 2.74 |
| $M_z/M_w$ | 1.71 | 1.86 | 2.17 |
| BrF $C_6$/1000 C | 13.4 | 16.1 | 14.2 |
| Mol % α-olefin | 2.7 | 3.2 | 2.8 |
| $CDBI_{50}$ | 70.8 | 86.5 | 57.1 |
| FAE (kJ/mol) | 29.59 | n/a | 39.50 |
| MS (cN) | 2.04 | n/a | 7.06 |
| τ ($s^{-1}$) | 42.5 | n/a | 1.10 |

TABLE 7

Deconvolution of Ethylene Interpolymer Product Comparative Examples 4 into a First, a Second and a Third Ethylene Interpolymer.

| | Sample Ethylene Interpolymer Product Comparative Example 4 |
|---|---|
| R3 vol. (L) | 2.2 |
| $I_2$ (dg/min) | 0.87 |
| Density (g/cc) | 0.9112 |
| MFR, $I_{21}/I_2$ | 106 |
| SEC $M_w$ | 105449 |
| SEC $M_w/M_n$ | 7.53 |
| BrF $C_6$/1000 C | 18.1 |
| $CDBI_{50}$ | 75.2 |
| Mol % α-olefin | 4.4 |
| FAE (kJ/mol) | 44.3 |
| MS (cN) | 4.63 |
| τ ($s^{-1}$) | 0.127 |

| | SEC Deconvolution Results | | |
|---|---|---|---|
| | First Ethylene Interpolymer | Second Ethylene Interpolymer | Third Ethylene Interpolymer |
| Wt. Frac. | 0.37 | 0.57 | 0.06 |
| $M_n$ | 115000 | 11209 | 11209 |
| $M_w$ | 230042 | 22418 | 22418 |
| $M_w/M_n$) | 2.00 | 2.00 | 2.00 |
| BrF ($C_6$/1000 C) | 16.3 | 21.3 | 21.3 |

TABLE 8A

Continuous Solution Process Parameters for Example 6 and Comparative 8, at about 1 $I_2$ and 0.9175 g/cc.

| Sample | Example 6 | Comparative 8 |
|---|---|---|
| Reactor Mode | Series | Series |
| R1 Catalyst (i) | CpF-2 | PIC-1 |
| R2 Catalyst (ii) | CpF-2 | PIC-1 |
| Density (g/cc) | 0.9180 | 0.9170 |
| Melt Index, $I_2$ (dg/min) | 0.92 | 1.00 |
| Stress Exponent, S. Ex. | 1.75 | 1.29 |
| MFR, $I_{21}/I_2$ | 107 | 31.3 |
| Branch Freq. ($C_6$/1000 C) | 18.3 | 14.4 |
| R1 Catalyst, (i) (ppm) | 0.36 | 0.10 |
| R1 ([M]/[(i)]) (mole ratio) | 31 | 100 |
| R1 ([P]/[M]) (mole ratio) | 0.40 | 0.30 |
| R1 ([B]/[(i)]) (mole ratio) | 1.20 | 1.20 |
| R2 Catalyst, (ii) (ppm) | 0.76 | 0.22 |
| R2 ([M]/[(ii)]) (mole ratio) | 31 | 25 |
| R2 ([P]/[M]) (mole ratio) | 0.4 | 0.30 |
| R2 ([B]/[(ii)]) (mole ratio) | 1.2 | 1.30 |

TABLE 8A-continued

Continuous Solution Process Parameters for Example 6 and Comparative 8, at about 1 $I_2$ and 0.9175 g/cc.

| Sample | Example 6 | Comparative 8 |
|---|---|---|
| $ES^{R1}$ (%) | 45 | 50 |
| $ES^{R2}$ (%) | 55 | 50 |
| $ES^{R3}$ (%) | 0 | 0 |
| R1 ethylene concentration (wt. fr.) | 10.5 | 9.8 |
| R2 ethylene concentration (wt. fr.) | 13.8 | 12.6 |
| R3 ethylene concentration (wt. fr.) | 13.8 | 12.6 |
| $((1\text{-octene})/(\text{ethylene}))^{R1}$ (wt. fr.) | 0.19 | 1.40 |
| $((1\text{-octene})/(\text{ethylene}))^{R2}$ (wt. fr.) | 0.30 | 0.0 |
| ((1-octene)/(ethylene)) Overall (wt. fr.) | 0.25 | 0.71 |
| $OS^{R1}$ (%) | 33.5 | 100 |
| $OS^{R2}$ (%) | 66.5 | 0 |
| $OS^{R3}$ (%) | 0.0 | 0 |
| $H_2^{R1}$ (ppm) | 2.75 | 0.4 |
| $H_2^{R2}$ (ppm) | 10.0 | 0.8 |
| $H_2^{R3}$ (ppm) | 0.0 | 0.0 |
| Prod. Rate (kg/h) | 93.0 | 81.3 |

TABLE 8B

Continuous Solution Process Parameters for Example 6 and Comparative 8, at about 1 $I_2$ and 0.9175 g/cc.

| Sample | Example 6 | Comparative 8 |
|---|---|---|
| Reactor Mode | Series | Series |
| R1 Catalyst (i) | CpF-2 | PIC-1 |
| R2 Catalyst (ii) | CpF-2 | PIC-1 |
| Density (g/cc) | 0.9180 | 0.9170 |
| Melt Index, $I_2$ (dg/min) | 0.92 | 1.00 |
| Stress Exponent, S. Ex. | 1.75 | 1.29 |
| MFR, $I_{21}/I_2$ | 107 | 31.3 |
| Branch Freq. ($C_6$/1000 C) | 18.3 | 14.4 |
| R3 volume (L) | 2.2 | 2.2 |
| R1 total solution rate (kg/h) | 354.0 | 387.2 |
| R2 total solution rate (kg/h) | 246.0 | 212.8 |
| R3 solution rate (kg/h) | 0.0 | 0 |
| Total solution rate (kg/h) | 600.0 | 600.0 |
| R1 inlet temp (° C.) | 35 | 30 |
| R1 catalyst inlet temp (° C.) | 27.7 | 30.3 |
| R1 Mean temp (° C.) | 148.2 | 140.1 |
| R2 inlet temp (° C.) | 45 | 30 |
| R2 catalyst inlet temp (° C.) | 27.9 | 30.6 |
| R2 Mean temp (° C.) | 209.0 | 189.1 |
| R3 exit temp (° C.) | 210.2 | 191.6 |
| $Q^{R1}$ (%) | 80.3 | 81.6 |
| $Q^{R2}$ (%) | 85.0 | 83.9 |
| $Q^{R3}$ (%) | 70.3 | 53.6 |
| $Q^T$ (%) | 97.1 | 95.6 |
| Prod. Rate (kg/h) | 93.0 | 81.3 |

TABLE 9

Comparison of Bridged Metallocene and Unbridged Single Site Catalyst Formulations in a Single Reactor Continuous Solution Polymerization Process at 165° C., Examples 10-11 and Comparatives 10s-11s, Respectively.

| Sample | Example 10 | Comparative 10s | Example 11 | Comparative 11s |
|---|---|---|---|---|
| Reactor Mode | Single | Single | Single | Single |
| R1 Catalyst[a] | CpF-2 | PIC-1 | CpF-2 | PIC-1 |
| α-olefin | 1-octene | 1-octene | 1-octene | 1-octene |
| R1 Mean temp (° C.) | 165.0 | 165.4 | 165.0 | 165.1 |
| $H_2^{R1}$ (ppm) | 4 | 4 | 6 | 6 |
| ((1-octene)/(ethylene))$^{R1}$ (wt. fraction) | 0.17 [b] | 1.05 [c] | 0.30 [b] | 1.10 [c] |
| $Q^T$ (%) | 90.0 | 90.1 | 85.0 | 85.2 |
| SEC $M_n$ | 43,397 | 23,238 | 42,776 | 14,285 |
| SEC $M_w$ | 82,720 [d] | 47,655 [e] | 86,239 [d] | 28,838 [e] |
| SEC $M_z$ | 133,489 | 72,326 | 142,459 | 43,496 |
| SEC $M_w/M_n$ | 1.91 | 2.05 | 2.02 | 2.02 |
| BrF (#$C_6$/1000 C) | 15.9 | 16.1 | 21.6 | 21.4 |
| % Reduced [α-olefin/ethylene] [f] | −83.8 | −72.7 | | |
| % Improved $M_w$ [g] | 73.6 | 199 | | |

[a]CpF-2 = $[(2,7\text{-}tBu_2Flu)Ph_2C(Cp)HfMe_2]$; PIC-1 = $[Cp[(t\text{-}Bu)_3PN]TiCl_2]$
[b] (α-olefin/ethylene)$^A$, bridged metallocene catalyst formulation
[c] (α-olefin/ethylene)$^C$, unbridged single site catalyst formulation
[d] $M_w^A$, bridged metallocene catalyst formulation
[e] $M_w^C$, unbridged single site catalyst formulation
[f] % Reduced (α-olefin/ethylene) = 100 × (((α-olefin/ethylene)$^A$ − (α-olefin/ethylene)$^C$)/(α-olefin/ethylene)$^C$)
[g] % Improved $M_w$ = 100 × (($M_w^A$ − $M_w^C$)/$M_w^C$)

TABLE 10

Comparison of Bridged Metallocene and Unbridged Single Site Catalyst Formulations in a Single Reactor Continuous Solution Polymerization Process at 190° C. and at 143° C., Examples 12-13 and Comparatives 12s-13s, Respectively.

| Sample | Example 12 | Comparative 12s | Example 13 | Comparative 13s |
|---|---|---|---|---|
| Reactor Mode | Single | Single | Single | Single |
| R1 Catalyst[a] (component A, or component C) | CpF-2 | PIC-1 | CpF-2 | PIC-1 |
| α-olefin | 1-octene | 1-octene | 1-octene | 1-octene |
| R1 Mean temp (° C.) | 190.0 | 190.1 | 143.0 | 143.0 |
| $H_2^{R1}$ (ppm) | 2 | 2 | 18 | 18 |
| ((1-octene)/(ethylene))$^{R1}$ (wt. fraction) | 0.17 [b] | 1.85 [c] | 0.05 [b] | 0.45 [c] |
| $Q^T$ (%) | 85.0 | 85.2 | 80.0 | 80.2 |
| SEC $M_n$ | 40618 | 23106 | 44718 | 13612 |
| SEC $M_w$ | 79790 [d] | 46836 [e] | 77190 [d] | 27341 [e] |
| SEC $M_z$ | 129396 | 70817 | 115557 | 41142 |
| SEC $M_w/M_n$ | 1.96 | 2.03 | 1.73 | 2.01 |
| BrF (#$C_6$/1000 C) | 13.0 | 13.0 | 4.8 | 4.5 |
| % Reduced [α-olefin/ethylene] [f] | −90.8 | | −88.9 | |
| % Improved $M_w$ [g] | 70.4 | | 182 | |

[a]CpF-2 = $[(2,7\text{-}tBu_2Flu)Ph_2C(Cp)HfMe_2]$; PIC-1 = $[Cp[(t\text{-}Bu)_3PN]TiCl_2]$
[b] (α-olefin/ethylene)$^A$, bridged metallocene catalyst formulation
[c] (α-olefin/ethylene)$^C$, unbridged single site catalyst formulation
[d] $M_w^A$, bridged metallocene catalyst formulation
[e] $M_w^C$, unbridged single site catalyst formulation
[f] % Reduced (α-olefin/ethylene) = 100 × (((α-olefin/ethylene)$^A$ − (α-olefin/ethylene)$^C$)/(α-olefin/ethylene)$^C$)
[g] % Improved $M_w$ = 100 × (($M_w^A$ − $M_w^C$)/$M_w^C$)

TABLE 11

Percent (%) Improved SEC Weight Average Molecular Weight (M$_w$) when using the Bridged Metallocene Catalyst Formulation Relative to the Unbridged Single Site Catalyst Formulation (CPU at 160° C. Reactor Temperature and about 90% Ethylene Conversion).

| Weight % 1-octene in ethylene | Bridged Metallocene Catalyst Formulation | | Unbridged Single Site Catalyst Formulation | | % Improved |
|---|---|---|---|---|---|
| inter-polymers | Compo-nent A | M$_w^A$ (see[1]) | Compo-nent C | M$_w^C$ (see[2]) | M$_w$ (see[3]) |
| 0.1 | CpF-1 | 293273 | PIC-1 | 248166 | 18 |
| 2.5 | CpF-1 | 130734 | PIC-1 | 91198 | 43 |
| 5.0 | CpF-1 | 109858 | PIC-1 | 73513 | 49 |
| 7.5 | CpF-1 | 99227 | PIC-1 | 64804 | 53 |
| 10.0 | CpF-1 | 92315 | PIC-1 | 59257 | 56 |
| 12.5 | CpF-1 | 87287 | PIC-1 | 55285 | 58 |
| 15.0 | CpF-1 | 83382 | PIC-1 | 52237 | 60 |
| 17.5 | CpF-1 | 80217 | PIC-1 | 49792 | 61 |
| 20.0 | CpF-1 | 77573 | PIC-1 | 47766 | 62 |
| 22.5 | CpF-1 | 75314 | PIC-1 | 46048 | 64 |
| 25.0 | CpF-1 | 73348 | PIC-1 | 44564 | 65 |
| 27.5 | CpF-1 | 71614 | PIC-1 | 43262 | 66 |

TABLE 11-continued

Percent (%) Improved SEC Weight Average Molecular Weight (M$_w$) when using the Bridged Metallocene Catalyst Formulation Relative to the Unbridged Single Site Catalyst Formulation (CPU at 160° C. Reactor Temperature and about 90% Ethylene Conversion).

| Weight % 1-octene in ethylene | Bridged Metallocene Catalyst Formulation | | Unbridged Single Site Catalyst Formulation | | % Improved |
|---|---|---|---|---|---|
| inter-polymers | Compo-nent A | M$_w^A$ (see[1]) | Compo-nent C | M$_w^C$ (see[2]) | M$_w$ (see[3]) |
| 30.0 | CpF-1 | 70067 | PIC-1 | 42107 | 66 |
| 32.5 | CpF-1 | 68673 | PIC-1 | 41072 | 67 |
| 35.0 | CpF-1 | 67408 | PIC-1 | 40136 | 68 |
| 37.5 | CpF-1 | 66251 | PIC-1 | 39284 | 69 |
| 40.0 | CpF-1 | 65186 | PIC-1 | 38504 | 69 |
| 42.5 | CpF-1 | 64202 | PIC-1 | 37784 | 70 |
| 45.0 | CpF-1 | 63287 | PIC-1 | 37119 | 70 |

[1]$M_w^A$ = 164540 × (Octene$^{wt\ \%}$) − 0.251; where (Octene$^{wt\ \%}$) is the weight % of octene in the ethylene/1-octene interpolymer
[2]$M_w^C$ = 121267 × (Octene$^{wt\ \%}$) − 0.311
[3]100% × (M$_w^A$ − M$_w^C$)/M$_w^C$

TABLE 12

Percent (%) Improvement (Reduction) in (α-olefin/ethylene) Weight Ratio in the Reactor Feed when using the Bridged Metallocene Catalyst Formulation Relative to the Unbridged Single Site Catalyst Formulation (CPU at 160° C. Reactor Temperature and about 90% Ethylene Conversion).

| Weight % 1-octene in ethylene interpolymers | Bridged Metallocene Catalyst Formulation | | Unbridged Single Site Catalyst Formulation | | % Reduced |
|---|---|---|---|---|---|
| | Compo-nent A | (α-olefin/ethylene)$^A$ (see[1]) | Compo-nent C | (α-olefin/ethylene)$^C$ (see[2]) | (α-olefin/ethylene) Ratio (see[3]) |
| 0.0 | CpF-1 | 0.00 | PIC-1 | 0.00 | n/a |
| 2.5 | CpF-1 | 0.0078 | PIC-1 | 0.183 | −96% |
| 5.0 | CpF-1 | 0.031 | PIC-1 | 0.407 | −92% |
| 7.5 | CpF-1 | 0.066 | PIC-1 | 0.653 | −90% |
| 10.0 | CpF-1 | 0.112 | PIC-1 | 0.920 | −88% |
| 12.5 | CpF-1 | 0.170 | PIC-1 | 1.21 | −86% |
| 15.0 | CpF-1 | 0.238 | PIC-1 | 1.52 | −84% |
| 17.5 | CpF-1 | 0.318 | PIC-1 | 1.85 | −83% |
| 20.0 | CpF-1 | 0.409 | PIC-1 | 2.20 | −81% |
| 22.5 | CpF-1 | 0.512 | PIC-1 | 2.57 | −80% |
| 25.0 | CpF-1 | 0.625 | PIC-1 | 2.97 | −79% |
| 27.5 | CpF-1 | 0.750 | PIC-1 | 3.39 | −78% |
| 30.0 | CpF-1 | 0.886 | PIC-1 | 3.82 | −77% |
| 32.5 | CpF-1 | 1.03 | PIC-1 | 4.28 | −76% |
| 35.0 | CpF-1 | 1.19 | PIC-1 | 4.76 | −75% |
| 37.5 | CpF-1 | 1.36 | PIC-1 | 5.26 | −74% |
| 40.0 | CpF-1 | 1.54 | PIC-1 | 5.78 | −73% |
| 42.5 | CpF-1 | 1.74 | PIC-1 | 6.33 | −73% |
| 45.0 | CpF-1 | 1.94 | PIC-1 | 6.89 | −72% |

[1](α-olefin/ethylene)$^A$ = 0.0009 × (Octene$^{wt\ \%}$)$^2$ + 0.0027 × (Octene$^{wt\ \%}$) − 0.0046; where (Octene$^{wt\ \%}$) is the weight % of octene in the ethylene/1-octene interpolymer
[2](α-olefin/ethylene) = 0.0017 × (Octene$^{wt\ \%}$)$^2$ + 0.0771 × (Octene$^{wt\ \%}$) − 0.0208
[3]100% × ((α-olefin/ethylene)$^1$ − (α-olefin/ethylene)$^C$/(α-olefin/ethylene)$^C$

TABLE 13

| Monolayer Film (1.0-mil thickness) Physical Properties, Examples 20-27 (average) Relative to Comparative Example 1. | | |
|---|---|---|
| Sample | Average Ex. 20-27[a] | Comp. Example 1 |
| Density (g/cc) | 0.905 | 0.905 |
| $I_2$ (dg/min) | 0.85 | 0.93 |
| Melt Flow Ratio ($I_{21}/I_2$) | 50.0 | 57.0 |
| S. Ex. | 1.53 | 1.58 |
| Melt Strength (cN) | 4.50 | 4.56 |
| Flow Act. Energy (kJ/mol) | 48.2 | 48.34 |
| Film Haze (%) | 3.2 | 3.8 |
| Film Gloss at 45° | 68 | 75.2 |
| Dart Impact (g/mil) | 539 | 641 |
| Lub-Tef Puncture (J/mm$^2$) | 116 | 81 |
| MD Tear (g/mil) | 162 | 137 |
| TD Tear (g/mil) | 311 | 270 |
| MD 1% Sec Mod. (MPa) | 89.8 | 108.0 |
| TD 1% Sec Mod. (MPa) | 92.4 | 107.0 |
| MD 2% Sec Mod. (MPa) | 83.6 | 100 |
| TD 2% Sec Mod. (MPa) | 85.8 | 99.0 |
| MD Ten. Break Str.(MPa) | 46.7 | 43.1 |
| TD Ten. Break Str.(MPa) | 43.9 | 38.8 |
| MD Elong. at Break (%) | 489 | 481 |
| TD Elong. at Break (%) | 795 | 701 |
| MD Ten. Yield Str (MPa) | 5.9 | 7.6 |
| TD Ten. Yield Str (MPa) | 5.5 | 7.5 |
| MD Elong at Yield (%) | 17 | 10 |
| TD Elong at Yield (%) | 16 | 10 |

[a]average values from 1.0-mil blown films prepared from Example 20 through Example 27

INDUSTRIAL APPLICABILITY

The ethylene interpolymer products disclosed herein have industrial applicability in a wide range of manufactured articles; non-limiting examples include flexible packaging films.

The invention claimed is:

1. An ethylene interpolymer product comprising at least two ethylene interpolymers, wherein the ethylene interpolymer product comprises:

a) a dimensionless Melt Flow-Intrinsic Viscosity Index, MFIVI, of from ≥0.05 to ≤0.80, as defined by Eq.1

$$MFIVI = \left( \frac{1.9507 \times \left( \frac{f_{bimodality} \times f_{comonomer}}{I_f} \right)^{0.21678}}{IV + 3.0122 \times 10^{-6} \times (\text{Comonomer Wt. \%}) \times M_v^{0.725}} \right) - 1 \quad \text{Eq. 1}$$

wherein, $f_{bimodality}$, is defined by Eq.2, $$f_{bimodality} = 10^{(-0.94831 \times Log(Pd) - 0.94322 x Cf - 0.71879)} \quad \text{Eq.2}$$

wherein a polydispersity of said ethylene interpolymer product, Pd (in Eq.2), is determined by Size Exclusion Chromatography (SEC), $Pd=M_w/M_n$, where $M_w$ and $M_n$ are a weight average and a number average molecular weight, respectively;

wherein, a correction factor, $C_f$, (in Eq.2) is determined according to the following two steps (i) and (ii), (i) a melt flow distribution function of said ethylene interpolymer product defined by Eq.3, $$Log(1/I_n) = \beta_0 + \beta_1 \times Log(loading) + \beta_2 \times (Log(loading))^2 \quad \text{Eq.3}$$

wherein $\beta_0$, $\beta_1$, and $\beta_2$ are regression coefficients of the melt flow distribution function, and wherein the regression coefficients are determined by fitting a polynomial to experimental data of $Log(1/I_n)$ versus Log(loading), where $I_n$ is a measured melt index, of said ethylene interpolymer product, at loadings of 21600, 10000, 6480 and 2160 grams, measured at 190° C. according to ASTM D1238, (ii) a first derivative of said melt flow distribution function is defined by Eq.4, $$\frac{d\text{Log}(1/I_n)}{d\text{Log(loading)}} = \beta_1 + 2 \times \beta_2 \times \text{Log(loading)} \quad \text{Eq. 4}$$

and said correction factor, $C_f$ (Eq.2), is the value of said first derivative (Eq.4) at a loading of 4000 g;

wherein a comonomer weight percent, Comonomer Wt % (Eq.1), is the weight percent of comonomer in said ethylene interpolymer product as measured by FTIR according to ASTM D6645, if Comonomer Wt % is >14.95%, a comonomer factor, $f_{comonomer}$ (Eq.1), is defined by Eq.5, if Comonomer Wt % is ≤14.95%, said comonomer factor is defined by Eq.6, $$f_{comonomer} = 10^{(0.018790 \times (Comonomer\ Wt\ \%) - 0.28053)} \quad \text{Eq.5}$$

$$f_{comonomer} = 1 \quad \text{Eq.6;}$$

wherein a fitted melt index, $I_f$ (Eq.1), of said ethylene interpolymer product, is determined by the value of said melt flow distribution function (Eq.3) at a loading of 4000 g;

wherein, IV and $M_v$ (Eq.1) are an intrinsic viscosity and a viscosity average molar mass, respectively, of said ethylene interpolymer product as determined by 3D-SEC;

b) said first derivative, $$\frac{d\text{Log}(1/I_n)}{d\text{Log(loading)}}$$

(Eq.4) at a loading of 4000 g, having values from ≥−1.85 to ≤−1.51;

c) a dimensionless unsaturation ratio, UR, of from >0.06 to ≤0.6, wherein UR is defined by the following relationship;

$$UR = (SC^U - T^U)/T^U$$

wherein, $SC^U$ is the amount of a side chain unsaturation per 100 carbons and $T^U$ is amount of a terminal unsaturation per 100 carbons, in said ethylene interpolymer product, as determined by ASTM D3124-98 and ASTM D6248-98; and d) a residual catalytic metal of from ≥0.03 to ≤5 ppm of hafnium, wherein the residual catalytic metal is measured using neutron activation.

2. The ethylene interpolymer product of claim 1, wherein the ethylene interpolymer product comprises a first ethylene interpolymer, a second ethylene interpolymer, and optionally a third ethylene interpolymer.

3. The ethylene interpolymer product of claim 1, wherein the ethylene interpolymer product has a melt index from 0.3 to 500 dg/minute and a density from 0.855 to 0.975 g/cc, wherein the melt index is measured according to ASTM D1238 (2.16 kg load and 190° C.) and the density is measured according to ASTM D792.

4. The ethylene interpolymer product of claim 1, wherein the ethylene interpolymer product further comprises from 0 to 25 mole percent of one or more α-olefins.

5. The ethylene interpolymer product of claim 4, wherein the one or more α-olefins comprise a $C_3$ to $C_{10}$ α-olefin.

6. The ethylene interpolymer product of claim 5, wherein the one or more α-olefins are 1-hexene, or 1-octene, or a mixture 1-hexene and 1-octene.

7. The ethylene interpolymer product of claim 1, wherein the ethylene interpolymer product has a polydispersity, $M_w/M_n$ from 1.7 to 25.

8. The ethylene interpolymer product of claim 1, wherein the ethylene interpolymer product has a $CDBI_{50}$ from 1% to 98%, wherein $CDBI_{50}$ is measured using CTREF.

9. The ethylene interpolymer product of claim 1, wherein the ethylene interpolymer product is manufactured by a solution polymerization process.

10. The ethylene interpolymer product of claim 2, wherein the said first and said second interpolymers, or said first and said third ethylene interpolymers, or said first, said second and said third ethylene interpolymers are synthesized using a bridged metallocene catalyst formulation.

11. The ethylene interpolymer product of claim 10, wherein said bridged metallocene catalyst formulation comprises a component A defined by Formula (I):

(I)

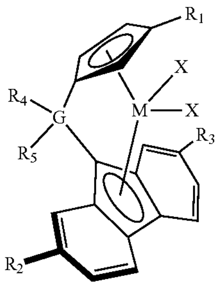

wherein:

M is Ti, Hf, or Zr;

G is C, Si, Ge, Sn, or Pb;

X, at each occurrence, is independently selected from a halogen atom, H, a $C_{1-20}$ hydrocarbyl radical, a $C_{1-20}$ alkoxy radical, or a $C_{6-10}$ aryl oxide radical, wherein these radicals may be linear, branched, or cyclic or further substituted with a halogen atom, a $C_{1-10}$ alkyl radical, a $C_{1-10}$ alkoxy radical, a $C_{6-10}$ aryl, or an aryloxy radical;

$R_1$ is H, a $C_{1-20}$ hydrocarbyl radical, a $C_{1-20}$ alkoxy radical, a $C_{6-10}$ aryl oxide radical, or an alkylsilyl radical containing at least one silicon atom and $C_{3-30}$ carbon atoms;

$R_2$ and $R_3$ are independently selected from H, a $C_{1-20}$ hydrocarbyl radical, a $C_{1-20}$ alkoxy radical, a $C_{6-10}$ aryl oxide radical, or an alkylsilyl radical containing at least one silicon atom and $C_{3-30}$ carbon atoms; and $R_4$ and $R_5$ are independently selected from H, a $C_{1-20}$ hydrocarbyl radical, a $C_{1-20}$ alkoxy radical, a $C_{6-10}$ aryl oxide radical, or an alkylsilyl radical containing at least one silicon atom and $C_{3-30}$ carbon atoms.

* * * * *